US008189923B2

(12) United States Patent
Yoshida

(10) Patent No.: US 8,189,923 B2
(45) Date of Patent: May 29, 2012

(54) INFORMATION INPUT OUTPUT METHOD USING A DOT PATTERN

(76) Inventor: Kenji Yoshida, Tokyo (JP)

( * ) Notice: Subject to any disclaimer, the term of this patent is extended or adjusted under 35 U.S.C. 154(b) by 1169 days.

(21) Appl. No.: 11/911,587

(22) PCT Filed: Apr. 15, 2005

(86) PCT No.: PCT/JP2005/007312
§ 371 (c)(1), (2), (4) Date: Oct. 15, 2007

(87) PCT Pub. No.: WO2006/112021
PCT Pub. Date: Oct. 26, 2006

(65) Prior Publication Data
US 2009/0060341 A1    Mar. 5, 2009

(51) Int. Cl.
*G06K 9/46* (2006.01)
(52) U.S. Cl. .......................................... 382/190
(58) Field of Classification Search .................. 382/181, 382/190, 321
See application file for complete search history.

(56) References Cited

U.S. PATENT DOCUMENTS

| | | | |
|---|---|---|---|
| 5,878,023 A | | 3/1999 | Matsui |
| 6,097,875 A | * | 8/2000 | Matsui ........................ 386/278 |
| 6,446,866 B1 | | 9/2002 | Tatsuta |

FOREIGN PATENT DOCUMENTS

| | | |
|---|---|---|
| JP | 8-106517 A | 4/1996 |
| JP | 11-219405 A | 8/1999 |
| JP | 2000-76372 A | 3/2000 |
| JP | 2000-99616 A | 4/2000 |
| JP | 2005-319932 A | 2/2005 |
| JP | 2002-197410 A | 10/2007 |

OTHER PUBLICATIONS

International Search Report of PCT/JP2005/007312, date of mailing Jul. 12, 2005.
Translation of International Preliminary Report on Patentability dated Oct. 16, 2007 of International Application No. PCT/JP2005/007312.

* cited by examiner

*Primary Examiner* — Daniel Mariam
(74) *Attorney, Agent, or Firm* — Westerman, Hattori, Daniels & Adrian, LLP

(57) ABSTRACT

A quadrangular or rectangular area on a medium surface of a printed material is defined as a block. A straight line in a vertical direction and a horizontal direction along an edge of the block is defined as a reference lattice line. A virtual lattice point is disposed at a predetermined interval on the reference lattice line. A reference lattice point dot is disposed on a virtual lattice point on a horizontal reference lattice line. A straight line connecting the reference grid point dots and virtual lattice points on a vertical line is defined as a lattice line. A point of intersection between lattice lines is defined as a virtual lattice point. A dot pattern is generated by arranging one or more information dots having a distance and a direction on the basis of the virtual lattice point. Such a dot pattern is scanned as image information by an optical reading means. Then, the dot pattern is converted into a numerical value and the information corresponding to the numerical information is read from a storage means. Then the information is outputted.

17 Claims, 108 Drawing Sheets

FIG. 11

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| INFORMATION BIT | 1 | 0 | 0 | 1 | 1 | 1 | 1 | 0 | 1 | 0 | 1 | 1 | 1 | 0 |

| | $K_1$ | $K_2$ | $K_3$ | $K_4$ | $K_5$ | $K_6$ | $K_7$ | $K_8$ | $K_9$ | $K_{10}$ | $K_{11}$ | $K_{12}$ | $K_{13}$ | $K_{14}$ |
|---|---|---|---|---|---|---|---|---|---|---|---|---|---|---|
| SECURITY TABLE | 0 | 0 | 1 | 0 | 1 | 1 | 0 | 1 | 1 | 0 | 0 | 0 | 1 | 1 |

| | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ |
|---|---|---|---|---|---|---|---|---|---|---|---|---|---|---|
| TRUE VALUE | 1 | 0 | 1 | 1 | 0 | 0 | 1 | 1 | 0 | 0 | 1 | 1 | 0 | 1 |

FIG. 20
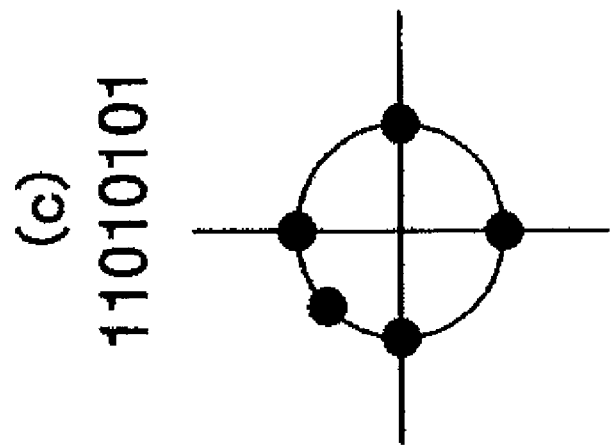
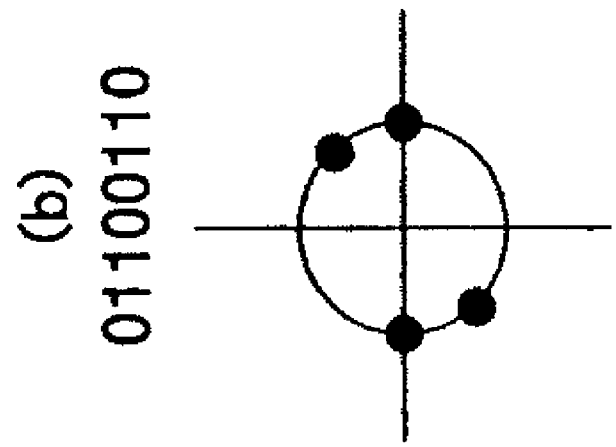
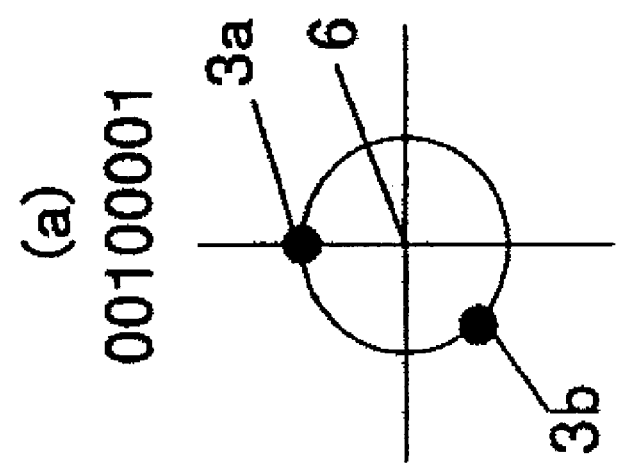

FIG. 27

② BLOCK CONCATENATION DATA SCANNING

READ AND COMPARE INDEXES OF THE UPPER AND LOWER BLOCKS OF A BLOCK AT THE FOCAL POINT OF IMAGING.

1) A. IF THE UPPER AND LOWER BLOCKS HAVE THE SAME DATA BLOCK NUMBERS, (a)

| 1 | 2 | 3 | 4 | 5 |
|---|---|---|---|---|
| 1 | 2⁺ₐ | 3 | 4 | 5 |
| 1 | 2 | 3 | 4 | 5 |

2) A. IF THE UPPER AND LOWER BLOCKS HAVE THE SAME DATA BLOCK NUMBERS, OR
   B. THE UPPER AND LOWER BLOCKS ARE DUMMY BLOCKS WITH THE SAME NUMBERS (b)

| 1 | 3 | 5 | 7 | 9 |
|---|---|---|---|---|
| 2 | 4 | 6 | 8 | DUMMY |
| 1 | 3⁺ₐ | 5 | 7 | 9⁺_b |
| 2 | 4 | 6 | 8 | DUMMY |

3) A. IF THE UPPER AND LOWER BLOCKS HAVE DIFFERENT DATA BLOCK NUMBERS, OR
   B. THE UPPER AND LOWER BLOCKS ARE DUMMY BLOCKS WITH DIFFERENT NUMBERS, OR
   C. THE UPPER OR LOWER BLOCK IS A DATA BLOCK OR A DUMMY BLOCK (c)

| 1 | 4 | 7 | 10 | 13 |
|---|---|---|----|----|
| 2 | 5 | 8 | 11 | DUMMY (1) |
| 3 | 6 | 9⁺ₐ | 12 | DUMMY (2) |
| 1 | 4 | 7 | 10 | 13⁺_b |
| 2 | 5 | 8 | 11 | DUMMY⁺_c (1) |
| 3 | 6 | 9 | 12 | DUMMY (2) |

FIG. 28

CASE1

(a)
| 1 | 2 | 3 | 4 | 5 | 6 | 1 | 2 | 3 | 4 | 5 | 6 |
|---|---|---|---|---|---|---|---|---|---|---|---|
| 1 | 2 | 3 | 4 | 5 | 6 | 1 | 2 | 3 | 4 | 5 | 6 |
| 1 | 2 | 3 | 4 | 5 | 6 | 1 | 2 | 3 | 4 | 5 | 6 |

CASE2  READ AN UPPER OR LOWER BLOCK, WHICHEVER IS CLOSER TO THE BLOCK AT THE CENTER OF IMAGING.

(b)
| 1 | 3 | 5 | 7 | 9 | 11 | 13 | 1 | 3 | 5 | 7 | 9 | 11 | 13 |
|---|---|---|---|---|----|----|---|---|---|---|---|----|----|
| 2 | 4 | 6 | 8 | 10 | 12 | DUMMY | 2 | 4 | 6 | 8 | 10 | 12 | DUMMY |
| 1 | 3 | 5 | 7 | 9 | 11 | 13 | 1 | 3 | 5 | 7 | 9 | 11 | 13 |
| 2 | 4 | 6 | 8 | 10 | 12 | DUMMY | 2 | 4 | 6 | 8 | 10 | 12 | DUMMY |

CASE3

(c)
| 1 | 4 | 7 | 10 | 13 | 16 | 1 | 4 | 7 | 10 | 13 | 16 |
|---|---|---|----|----|----|---|---|---|----|----|----|
| 2 | 5 | 8 | 11 | 14 | DUMMY(1) | 2 | 5 | 8 | 11 | 14 | DUMMY(1) |
| 3 | 6 | 9 | 12 | 15 | DUMMY(2) | 3 | 6 | 9 | 12 | 15 | DUMMY(2) |
| 1 | 4 | 7 | 10 | 13 | 16 | 1 | 4 | 7 | 10 | 13 | 16 |
| 2 | 5 | 8 | 11 | 14 | DUMMY(1) | 2 | 5 | 8 | 11 | 14 | DUMMY(1) |
| 3 | 6 | 9 | 12 | 15 | DUMMY(2) | 3 | 6 | 9 | 12 | 15 | DUMMY(2) |

FIG. 30
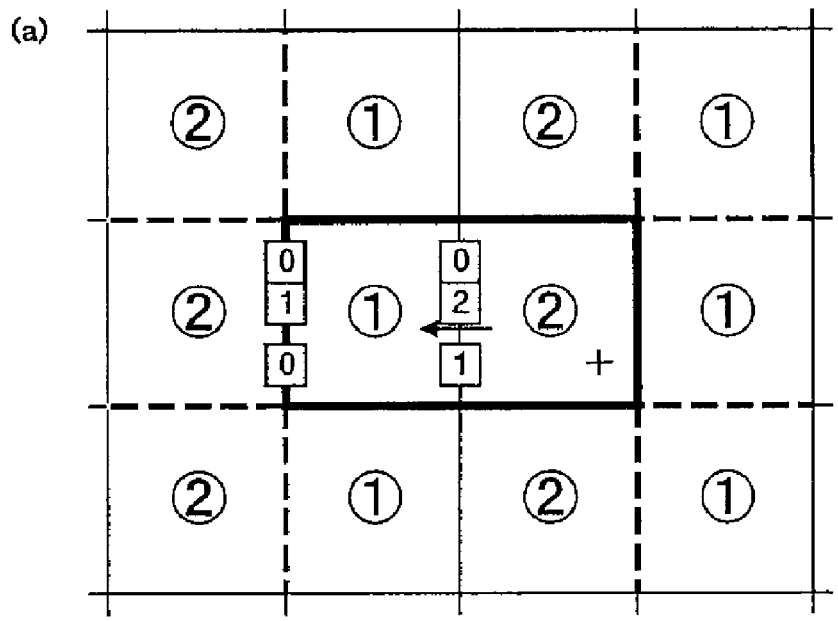
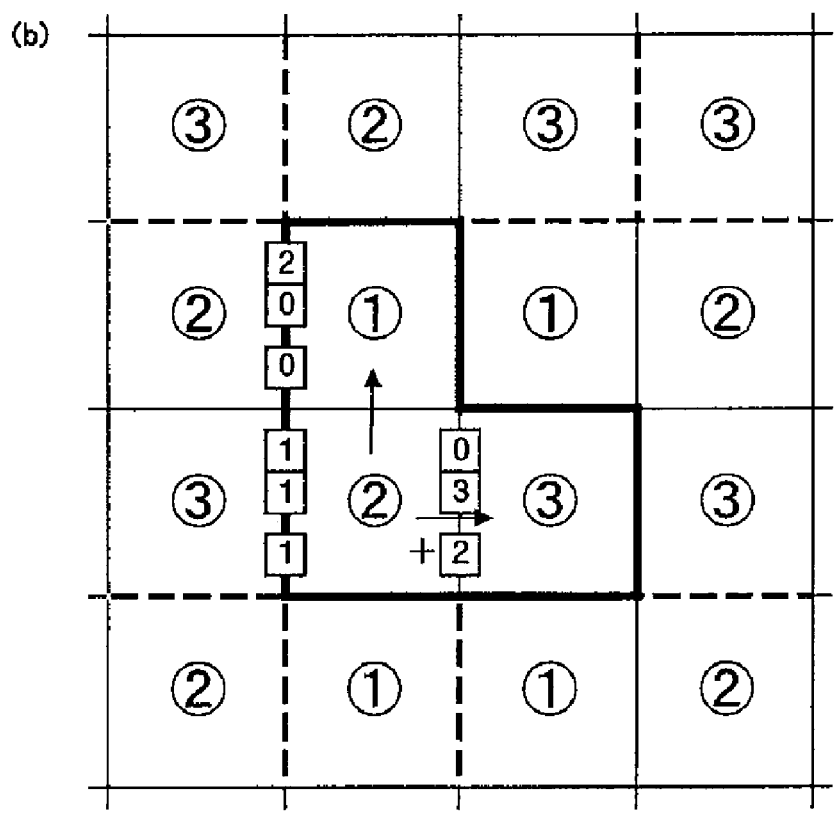

FIG. 31
FOUR BLOCKS
(a) 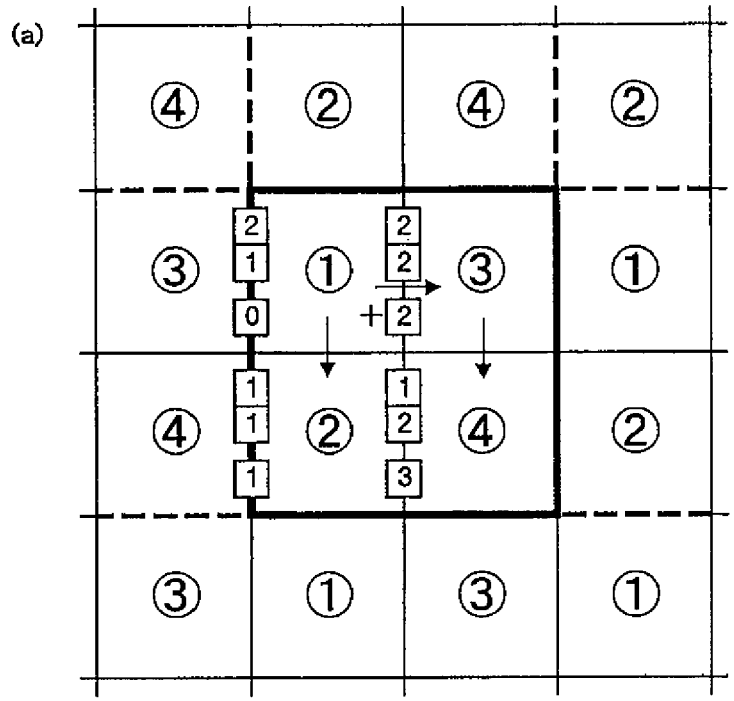
FIVE BLOCKS
(b) 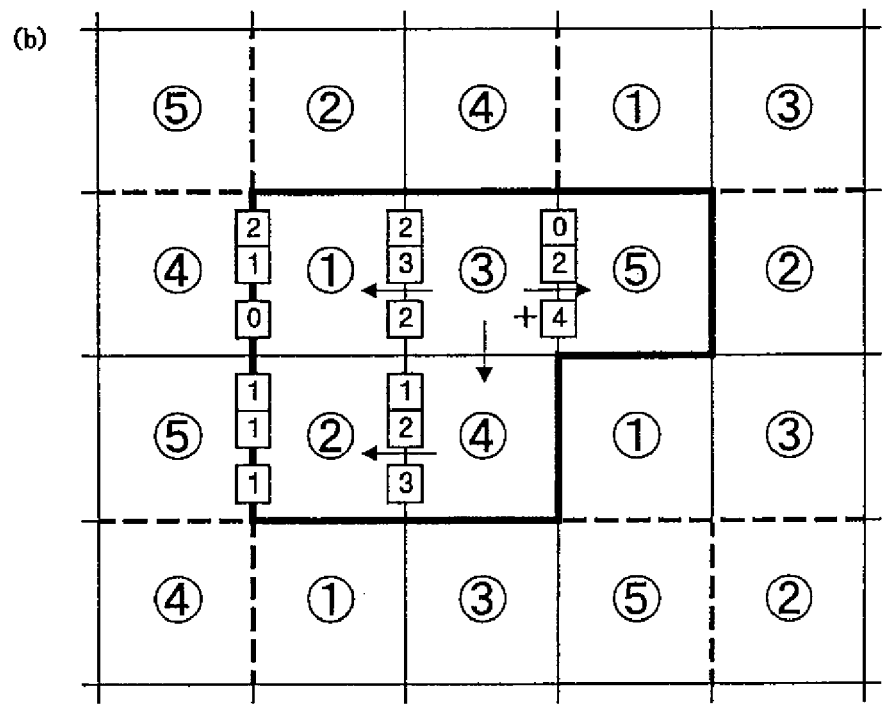

FIG. 32
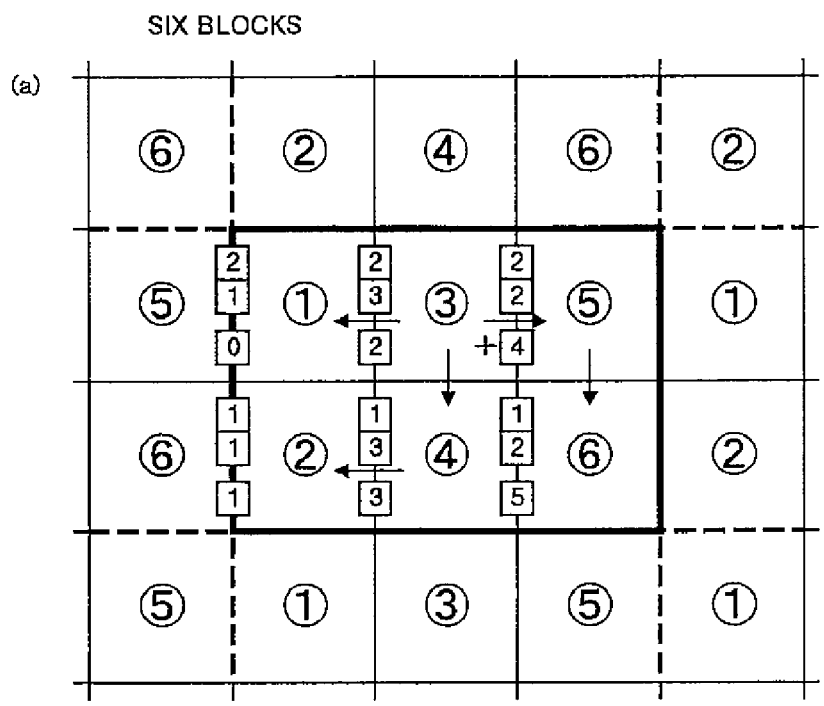
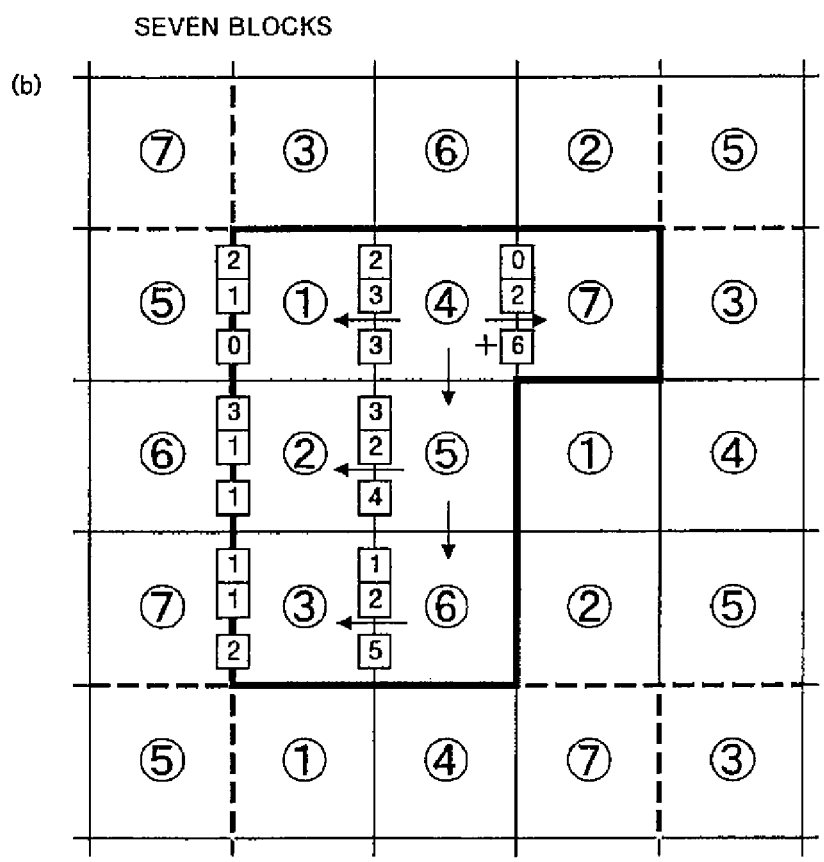

FIG. 33
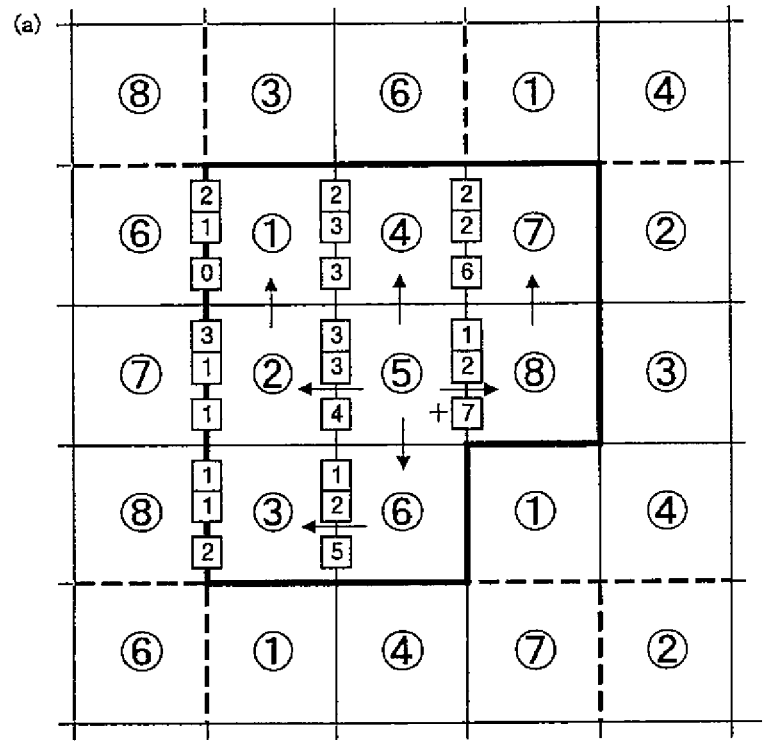
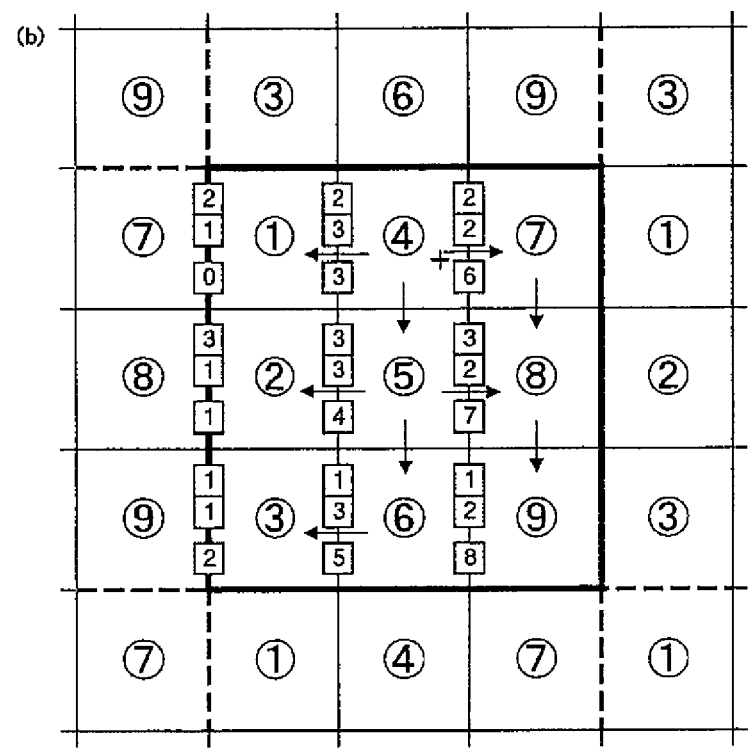

FIG. 34
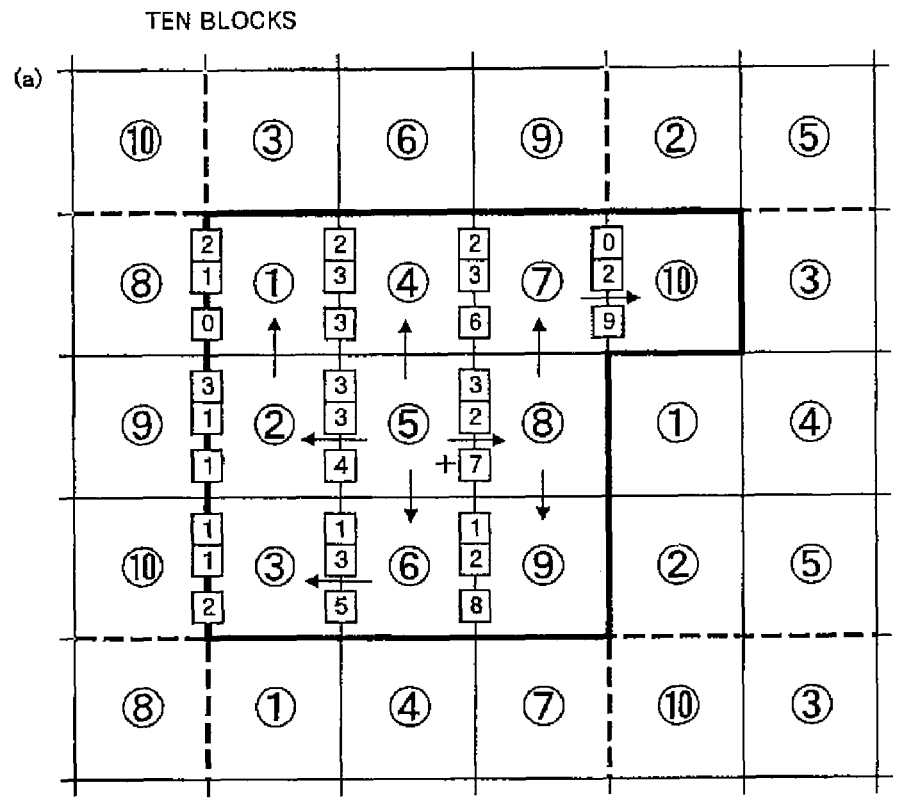
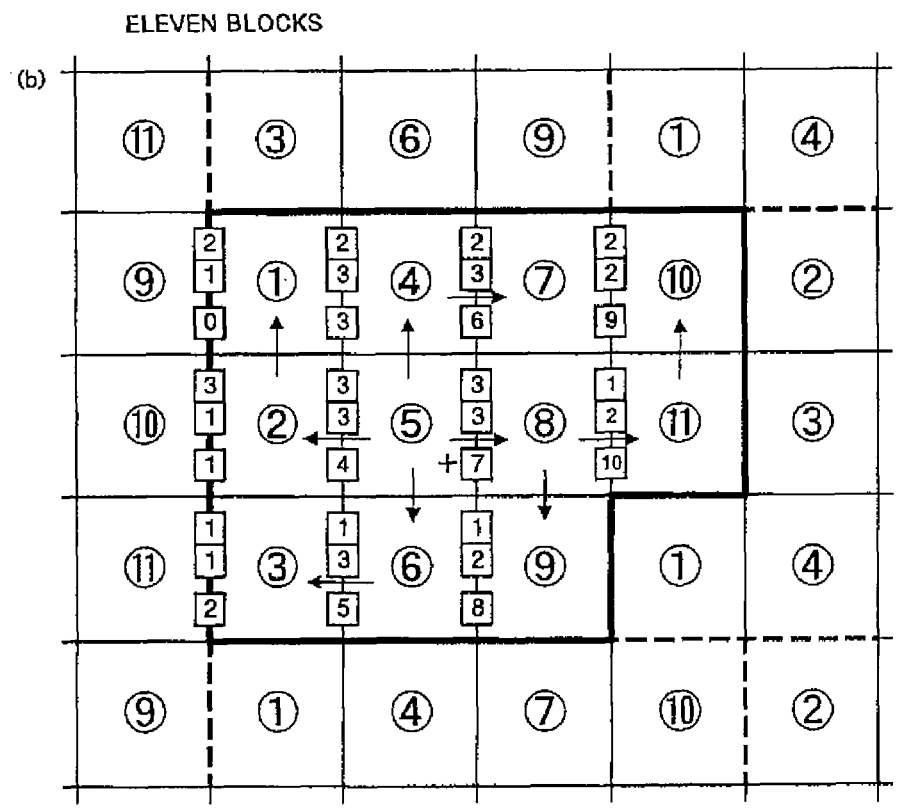

FIG. 41
GRID I  DIRECT SCANNING
(a)
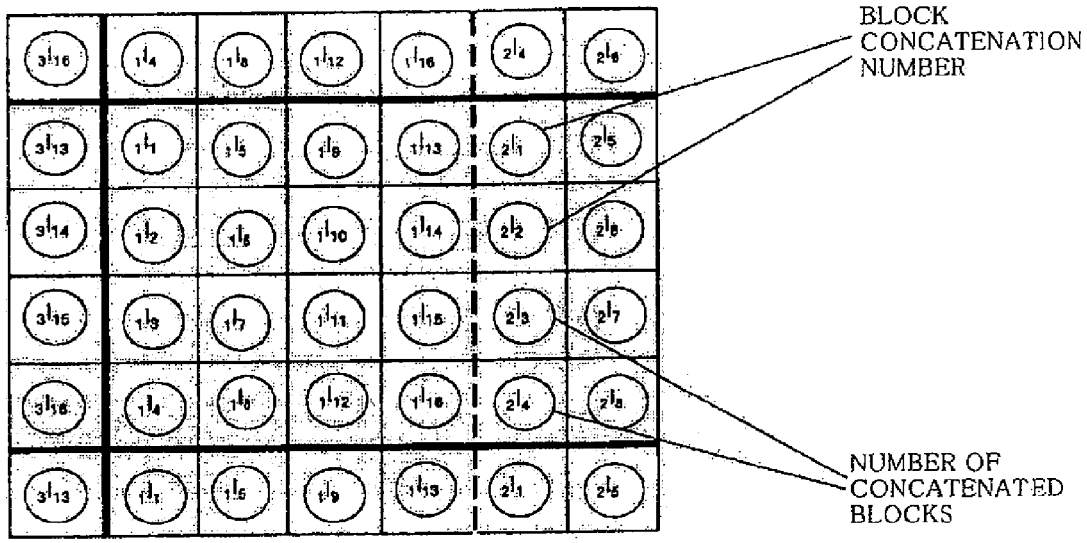
(b)
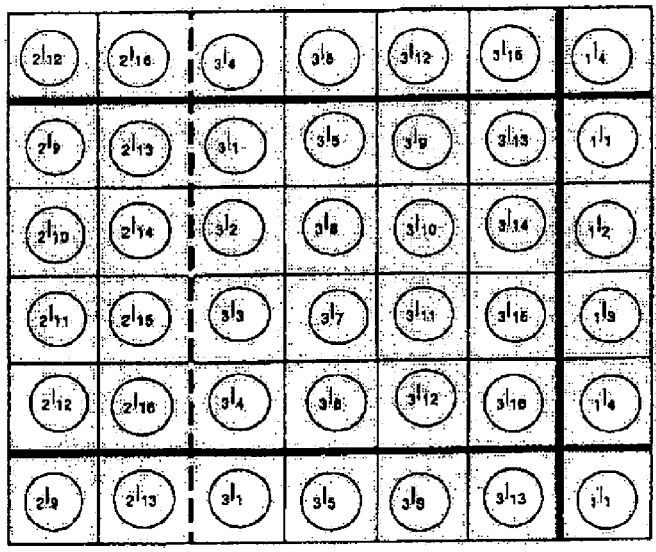

FIG. 42

| DATA SECTION | NUMBER OF CONCATENATED BLOCKS | | BLOCK CONCATENATION NUMBER | |
|---|---|---|---|---|
| $_1l_{16} \sim {_1l_5}$ | $_1i_4$ 001 | $_1i_3$ 100 | $_1i_2$ 001 | $_1i_1$ 000 |
| | $_1i_4$ 00 | $_1i_3$ 10 | $_1i_2$ 00 | $_1i_1$ 00 |
| | 0010=2 (DECIMAL) | | 0000=0 (DECIMAL) | |
| $_2l_{16} \sim {_2l_5}$ | $_2i_4$ 001 | $_2i_3$ 100 | $_2i_2$ 001 | $_2i_1$ 010 |
| | $_2i_4$ 00 | $_2i_3$ 10 | $_2i_2$ 00 | $_2i_1$ 01 |
| | 0010=2 (DECIMAL) | | 0001=1 (DECIMAL) | |
| $_3l_{16} \sim {_3l_5}$ | $_3i_4$ 001 | $_3i_3$ 100 | $_3i_2$ 001 | $_3i_1$ 100 |
| | $_3i_4$ 00 | $_3i_3$ 10 | $_3i_2$ 00 | $_3i_1$ 10 |
| | 0010=2 (DECIMAL) | | 0010=2 (DECIMAL) | |

FIG. 44

GRID I DIFFERENCE SCANNING (a)

(b)

FIG. 45
NUMBER OF CONCATENATED BLOCKS
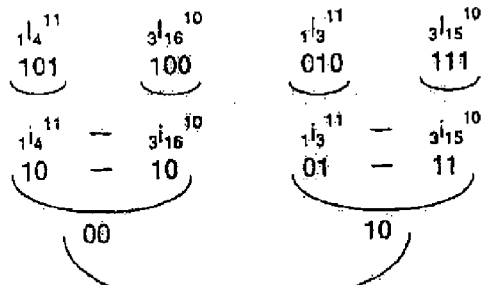
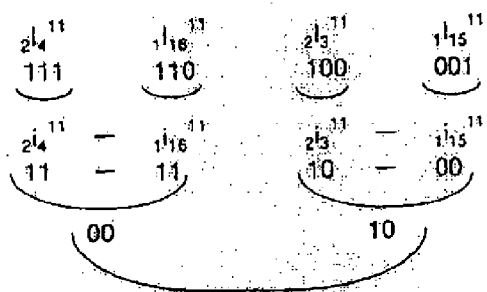
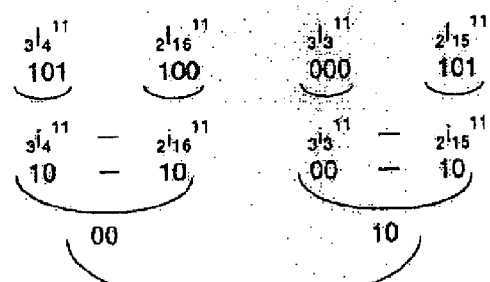
BLOCK CONCATENATION NUMBER
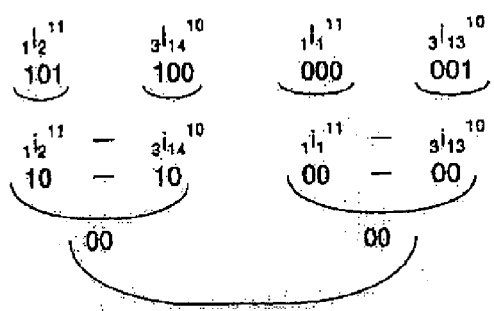
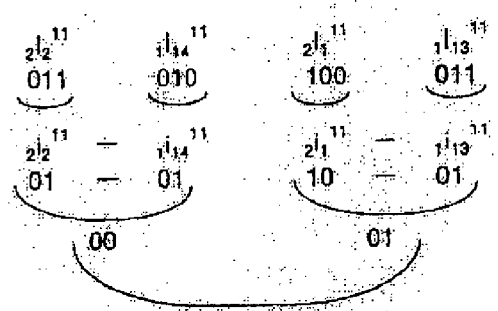
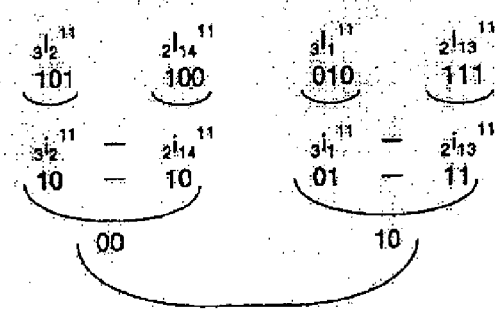

FIG. 47

GRID I  DIRECT SPIRAL

FIG. 48

| DATA SECTION | NUMBER OF CONCATENATED BLOCKS | | BLOCK CONCATENATION NUMBER | |
|---|---|---|---|---|
| $_1l_{16} \sim {_1l_5}$ | $_1l_4$ 001 | $_1l_3$ 110 | $_1l_2$ 001 | $_1l_1$ 000 |
| | $_1l_4$ 00 | $_1l_3$ 11 | $_1l_2$ 00 | $_1l_1$ 00 |
| | 0011=3 (DECIMAL) | | 0000=0 (DECIMAL) | |
| $_2l_{16} \sim {_2l_5}$ | $_2l_4$ 001 | $_2l_3$ 110 | $_2l_2$ 001 | $_2l_1$ 010 |
| | $_2l_4$ 00 | $_2l_3$ 11 | $_2l_2$ 00 | $_2l_1$ 01 |
| | 0011=3 (DECIMAL) | | 0001=1 (DECIMAL) | |
| $_3l_{16} \sim {_3l_5}$ | $_3l_4$ 001 | $_3l_3$ 110 | $_3l_2$ 001 | $_3l_1$ 100 |
| | $_3l_4$ 00 | $_3l_3$ 11 | $_3l_2$ 00 | $_3l_1$ 10 |
| | 0011=3 (DECIMAL) | | 0010=2 (DECIMAL) | |
| $_4l_{16} \sim {_4l_5}$ | $_4l_4$ 001 | $_4l_3$ 110 | $_4l_2$ 001 | $_4l_1$ 110 |
| | $_4l_4$ 00 | $_4l_3$ 11 | $_4l_2$ 00 | $_4l_1$ 11 |
| | 0011=3 (DECIMAL) | | 0011=3 (DECIMAL) | |

GRID I DIFFERENCE SPIRAL

FIG. 51

NUMBER OF CONCATENATED BLOCKS $_1i_4{}^{11}$ $_2i_{16}{}^{10}$ $_1i_3{}^{11}$ $_2i_{15}{}^{10}$
111   110   110   001

$_1i_4{}^{11}$ — $_2i_{16}{}^{10}$   $_1i_3{}^{11}$ — $_2i_{15}{}^{10}$
11   11      11   00

00                    11

0011=3(DECIMAL)

$_2i_4{}^{11}$ $_1i_{16}{}^{11}$ $_2i_3{}^{11}$ $_1i_{15}{}^{11}$
011   010   100   111

$_2i_4{}^{11}$ — $_1i_{16}{}^{11}$   $_2i_3{}^{11}$ — $_1i_{15}{}^{11}$
01   01      10   11

00                    11

0011=3(DECIMAL)

$_3i_4{}^{11}$ $_4i_{16}{}^{11}$ $_3i_3{}^{11}$ $_4i_{15}{}^{11}$
101   100   010   101

$_3i_4{}^{11}$ — $_4i_{16}{}^{11}$   $_3i_3{}^{11}$ — $_4i_{15}{}^{11}$
10   10      00   10

00                    10

0010=2(DECIMAL)

$_4i_4{}^{11}$ $_3i_{16}{}^{10}$ $_4i_3{}^{11}$ $_3i_{15}{}^{10}$
001   000   000   011

$_4i_4{}^{11}$ — $_3i_{16}{}^{10}$   $_4i_3{}^{11}$ — $_3i_{15}{}^{10}$
00   00      00   01

00                    11

0011=3(DECIMAL)

BLOCK CONCATENATION NUMBER $_1i_2{}^{11}$ $_2i_{14}{}^{10}$ $_1i_1{}^{11}$ $_2i_{13}{}^{10}$
001   000   010   011

$_1i_2{}^{11}$ — $_2i_{14}{}^{10}$   $_1i_1{}^{11}$ — $_2i_{13}{}^{10}$
00   00      01   01

00                    00

0000=0(DECIMAL)

$_2i_2{}^{11}$ $_1i_{14}{}^{11}$ $_2i_1{}^{11}$ $_1i_{13}{}^{11}$
111   110   110   101

$_2i_2{}^{11}$ — $_1i_{14}{}^{11}$   $_2i_1{}^{11}$ — $_1i_{13}{}^{11}$
11   11      11   10

00                    01

0001=1(DECIMAL)

$_3i_2{}^{11}$ $_4i_{14}{}^{11}$ $_3i_1{}^{11}$ $_4i_{13}{}^{11}$
111   110   000   101

$_3i_2{}^{11}$ — $_4i_{14}{}^{11}$   $_3i_1{}^{11}$ — $_4i_{13}{}^{11}$
11   11      00   10

00                    10

0010=2(DECIMAL)

$_4i_2{}^{11}$ $_3i_{14}{}^{10}$ $_4i_1{}^{11}$ $_3i_{13}{}^{10}$
101   100   010   101

$_4i_2{}^{11}$ — $_3i_{14}{}^{10}$   $_4i_1{}^{11}$ — $_3i_{13}{}^{10}$
10   10      01   10

00                    11

0011=3(DECIMAL)

FIG. 53

GRID I DIRECT SEARCH

FIG. 54

| DATA SECTION | CONCATENATION BLOCK NUMBER | | CONCATENATION INFORMATION | |
|---|---|---|---|---|
| $_1l_{16}{}^{11} \sim {}_1l_5{}^{11}$ | $_1l_4{}^{11}$ 001 | $_1l_3{}^{11}$ 000 | $_1l_2{}^{11}$ 001 | $_1l_1{}^{11}$ 100 |
| | $_1l_4{}^{11}$ 00 | $_1l_3{}^{11}$ 00 | $_1l_2{}^{11}$ 00 | $_1l_1{}^{11}$ 10 |
| | 0000=0( DECIMAL ) | | NO LEFT RIGHT CONCATENATION | DOWN CONCATENATION |
| $_2l_{16}{}^{11} \sim {}_2l_5{}^{11}$ | $_2l_4{}^{11}$ 001 | $_2l_3{}^{11}$ 110 | $_2l_2{}^{11}$ 011 | $_2l_1{}^{11}$ 010 |
| | $_2l_4{}^{11}$ 00 | $_2l_3{}^{11}$ 11 | $_2l_2{}^{11}$ 01 | $_2l_1{}^{11}$ 01 |
| | 0001=1( DECIMAL ) | | RIGHT CONCATENATION | UP CONCATENATION |
| $_3l_{16}{}^{11} \sim {}_3l_5{}^{11}$ | $_3l_4{}^{11}$ 001 | $_3l_3{}^{11}$ 100 | $_3l_2{}^{11}$ 101 | $_3l_1{}^{11}$ 000 |
| | $_3l_4{}^{11}$ 00 | $_3l_3{}^{11}$ 10 | $_3l_2{}^{11}$ 10 | $_3l_1{}^{11}$ 00 |
| | 0010=2( DECIMAL ) | | LEFT CONCATENATION | NO UP DOWN CONCATENATION |

FIG. 56

GRID I   DIFFERENCE SEARCH

FIG. 57
CONCATENATION BLOCK NUMBER
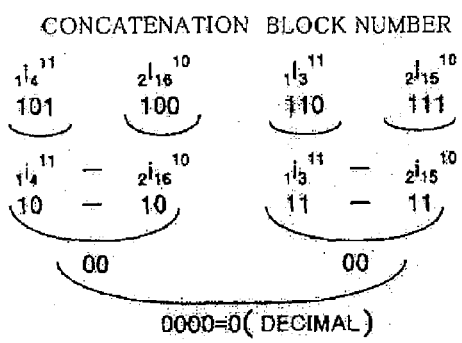
CONCATENATION INFORMATION
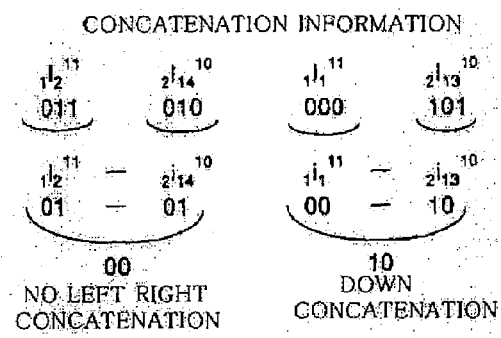
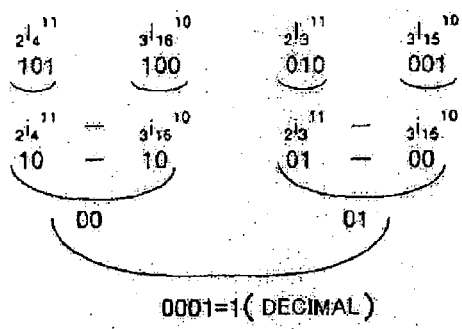
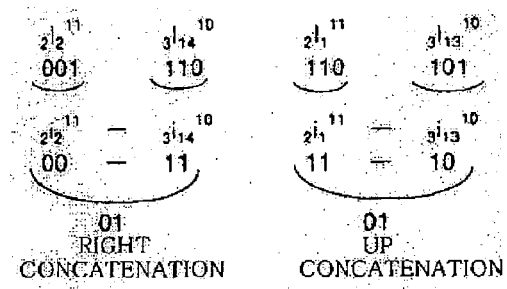
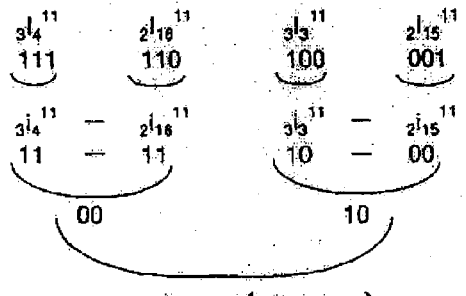
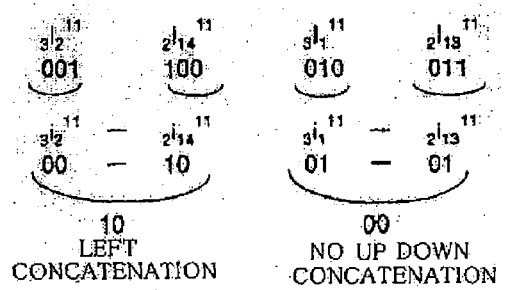

FIG. 59

GRID II  DIRECT SCANNING (a)

| $_3l_{35}$ | • | $_1l_{31}$ | $_1l_{32}$ | $_1l_{33}$ | $_1l_{34}$ | $_1l_{35}$ | • | $_2l_{31}$ | $_2l_{32}$ |
|---|---|---|---|---|---|---|---|---|---|
| $_3l_6$ | $_1l_1$ | $_1l_2$ | $_1l_3$ | $_1l_4$ | $_1l_5$ | $_1l_6$ | $_2l_1$ | $_2l_2$ | $_2l_3$ |
| $_3l_{12}$ | $_1l_7$ | $_1l_8$ | $_1l_9$ | $_1l_{10}$ | $_1l_{11}$ | $_1l_{12}$ | $_2l_7$ | $_2l_8$ | $_2l_9$ |
| $_3l_{18}$ | $_1l_{13}$ | $_1l_{14}$ | $_1l_{15}$ | $_1l_{16}$ | $_1l_{17}$ | $_1l_{18}$ | $_2l_{13}$ | $_2l_{14}$ | $_2l_{15}$ |
| $_3l_{24}$ | $_1l_{19}$ | $_1l_{20}$ | $_1l_{21}$ | $_1l_{22}$ | $_1l_{23}$ | $_1l_{24}$ | $_2l_{19}$ | $_2l_{20}$ | $_2l_{21}$ |
| $_3l_{30}$ | $_1l_{25}$ | $_1l_{26}$ | $_1l_{27}$ | $_1l_{28}$ | $_1l_{29}$ | $_1l_{30}$ | $_2l_{25}$ | $_2l_{26}$ | $_2l_{27}$ |
| $_3l_{35}$ | • | $_1l_{31}$ | $_1l_{32}$ | $_1l_{33}$ | $_1l_{34}$ | $_1l_{35}$ | • | $_2l_{31}$ | $_2l_{32}$ |
| $_3l_6$ | $_1l_1$ | $_1l_2$ | $_1l_3$ | $_1l_4$ | $_1l_5$ | $_1l_6$ | $_2l_1$ | $_2l_2$ | $_2l_3$ |

(b)

| $_2l_{33}$ | $_2l_{34}$ | $_2l_{35}$ | • | $_3l_{31}$ | $_3l_{32}$ | $_3l_{33}$ | $_3l_{34}$ | $_3l_{35}$ | • |
|---|---|---|---|---|---|---|---|---|---|
| $_2l_4$ | $_2l_5$ | $_2l_6$ | $_3l_1$ | $_3l_2$ | $_3l_3$ | $_3l_4$ | $_3l_5$ | $_3l_6$ | $_1l_1$ |
| $_2l_{10}$ | $_2l_{11}$ | $_2l_{12}$ | $_3l_7$ | $_3l_8$ | $_3l_9$ | $_3l_{10}$ | $_3l_{11}$ | $_3l_{12}$ | $_1l_7$ |
| $_2l_{16}$ | $_2l_{17}$ | $_2l_{18}$ | $_3l_{13}$ | $_3l_{14}$ | $_3l_{15}$ | $_3l_{16}$ | $_3l_{17}$ | $_3l_{18}$ | $_1l_{13}$ |
| $_2l_{22}$ | $_2l_{23}$ | $_2l_{24}$ | $_3l_{19}$ | $_3l_{20}$ | $_3l_{21}$ | $_3l_{22}$ | $_3l_{23}$ | $_3l_{24}$ | $_1l_{19}$ |
| $_2l_{28}$ | $_2l_{29}$ | $_2l_{30}$ | $_3l_{25}$ | $_3l_{26}$ | $_3l_{27}$ | $_3l_{28}$ | $_3l_{29}$ | $_3l_{30}$ | $_1l_{25}$ |
| $_2l_{33}$ | $_2l_{34}$ | $_2l_{35}$ | • | $_3l_{31}$ | $_3l_{32}$ | $_3l_{33}$ | $_3l_{34}$ | $_3l_{35}$ | • |
| $_2l_4$ | $_2l_5$ | $_2l_6$ | $_3l_1$ | $_3l_2$ | $_3l_3$ | $_3l_4$ | $_3l_5$ | $_3l_6$ | $_1l_1$ |

FIG. 60

BLOCK CONCATENATION NUMBER $\begin{pmatrix} {}_1l_3 & {}_1l_2 & {}_1l_1 \\ 0 & 0 & 0 \end{pmatrix}$ 000=0(DECIMAL)

$\begin{pmatrix} {}_2l_3 & {}_2l_2 & {}_2l_1 \\ 0 & 0 & 1 \end{pmatrix}$ 001=1(DECIMAL)

$\begin{pmatrix} {}_3l_3 & {}_3l_2 & {}_3l_1 \\ 0 & 1 & 0 \end{pmatrix}$ 010=2(DECIMAL)

NUMBER OF CONCATENATED BLOCKS $\begin{pmatrix} {}_1l_6 & {}_1l_5 & {}_1l_4 \\ 0 & 1 & 0 \end{pmatrix}$ 010=2(DECIMAL)

$\begin{pmatrix} {}_2l_6 & {}_2l_5 & {}_2l_4 \\ 0 & 1 & 0 \end{pmatrix}$ 010=2(DECIMAL)

$\begin{pmatrix} {}_3l_6 & {}_3l_5 & {}_3l_4 \\ 0 & 1 & 0 \end{pmatrix}$ 010=2(DECIMAL)

DATA SECTION ${}_1l_{35} \sim {}_1l_7$ ${}_2l_{35} \sim {}_2l_7$ ${}_3l_{35} \sim {}_3l_7$ FIG. 62
GRID II DIFFERENCE SCANNNING
(a)
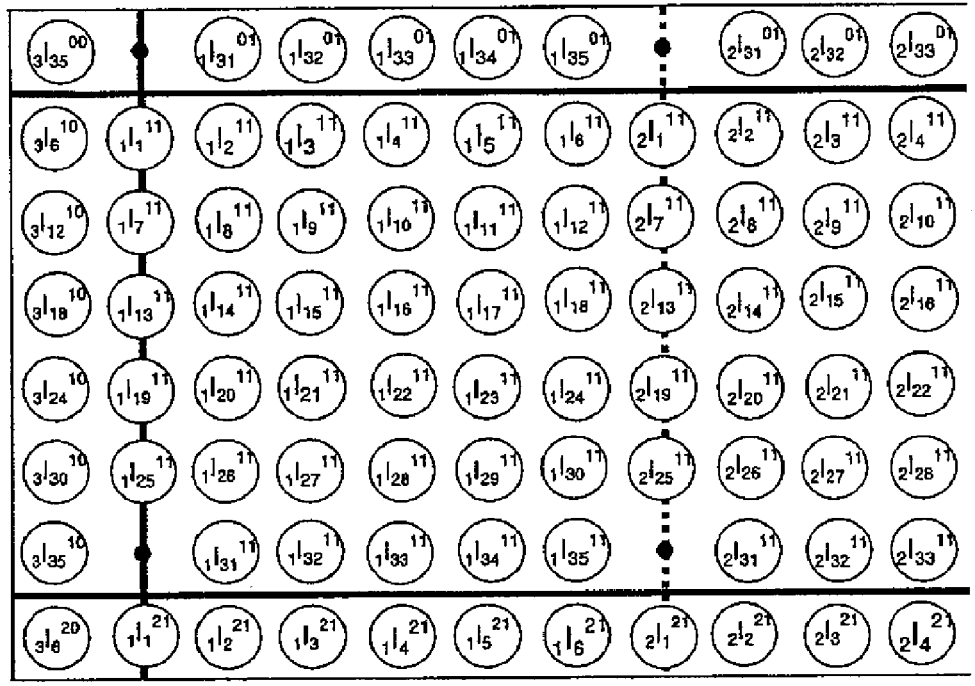
(b)
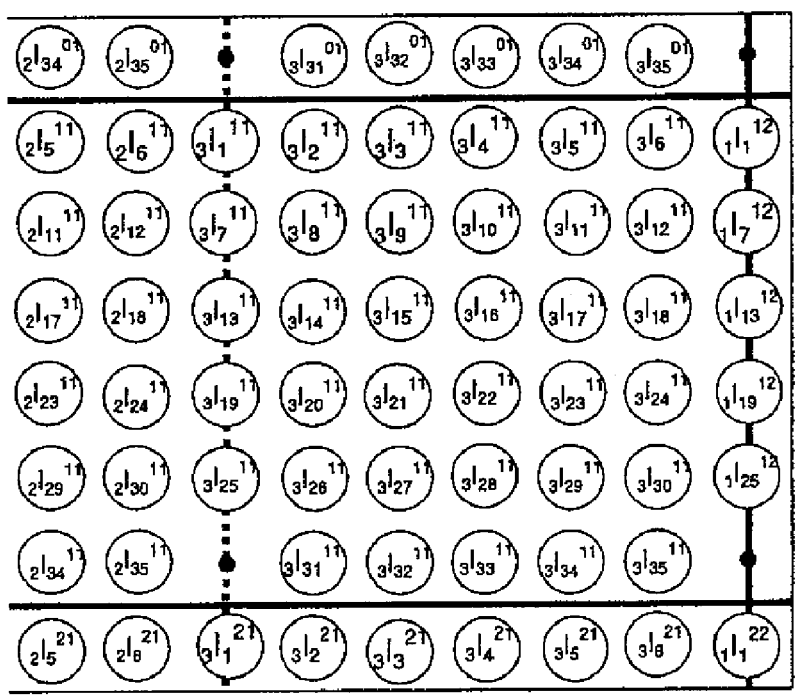

GRID II  DIRECT SPIRAL

FIG. 66

| DATA SECTION | NUMBER OF CONCATENATED BLOCKS | BLOCK CONCATENATION NUMBER |
|---|---|---|
| $_1l_{35} \sim {}_1l_7$ | $\underbrace{\begin{matrix} {}_1l_6 & {}_1l_5 & {}_1l_4 \\ 0 & 1 & 1 \end{matrix}}$<br>011=3(DECIMAL) | $\underbrace{\begin{matrix} {}_1l_3 & {}_1l_2 & {}_1l_1 \\ 0 & 0 & 0 \end{matrix}}$<br>000=0(DECIMAL) |
| $_2l_{35} \sim {}_2l_7$ | $\underbrace{\begin{matrix} {}_2l_6 & {}_2l_5 & {}_2l_4 \\ 0 & 1 & 1 \end{matrix}}$<br>011=3(DECIMAL) | $\underbrace{\begin{matrix} {}_2l_3 & {}_2l_2 & {}_2l_1 \\ 0 & 0 & 1 \end{matrix}}$<br>001=1(DECIMAL) |
| $_3l_{35} \sim {}_3l_7$ | $\underbrace{\begin{matrix} {}_3l_6 & {}_3l_5 & {}_3l_4 \\ 0 & 1 & 1 \end{matrix}}$<br>011=3(DECIMAL) | $\underbrace{\begin{matrix} {}_3l_3 & {}_3l_2 & {}_3l_1 \\ 0 & 1 & 0 \end{matrix}}$<br>010=2(DECIMAL) |
| $_4l_{35} \sim {}_4l_7$ | $\underbrace{\begin{matrix} {}_4l_6 & {}_4l_5 & {}_4l_4 \\ 0 & 1 & 1 \end{matrix}}$<br>011=3(DECIMAL) | $\underbrace{\begin{matrix} {}_4l_3 & {}_4l_2 & {}_4l_1 \\ 0 & 1 & 1 \end{matrix}}$<br>011=3(DECIMAL) |

FIG. 69

| DATA SECTION | NUMBER OF CONCATENATED BLOCKS | BLOCK CONCATENATION NUMBER |
|---|---|---|

$_1I_{35}^{11} \sim _1I_7^{11}$ $_2I_1^{11} - _1I_6^{11}$ $_1I_6^{11} - _1I_5^{11}$ $_1I_5^{11} - _1I_4^{11}$
 0 — 0    0 — 1    1 — 0
   0        1        1

011=3(DECIMAL)

$_1I_4^{11} - _1I_3^{11}$ $_1I_3^{11} - _1I_2^{11}$ $_1I_2^{11} - _1I_1^{11}$
 0 — 0    0 — 0    0 — 0
   0        0        0

000=0(DECIMAL)

$_2I_{35}^{11} \sim _2I_7^{11}$ $_1I_1^{12} - _2I_6^{11}$ $_2I_6^{11} - _2I_5^{11}$ $_2I_5^{11} - _2I_4^{11}$
 1 — 1    1 — 0    0 — 1
   0        1        1

011=3(DECIMAL)

$_2I_4^{11} - _2I_3^{11}$ $_2I_3^{11} - _2I_2^{11}$ $_2I_2^{11} - _2I_1^{11}$
 1 — 1    1 — 1    1 — 0
   0        0        1

001=1(DECIMAL)

$_3I_{35}^{11} \sim _3I_7^{11}$ $_4I_1^{11} - _3I_6^{11}$ $_3I_6^{11} - _3I_5^{11}$ $_3I_5^{11} - _3I_4^{11}$
 0 — 0    0 — 1    1 — 0
   0        1        1

011=3(DECIMAL)

$_3I_4^{11} - _3I_3^{11}$ $_3I_3^{11} - _3I_2^{11}$ $_3I_2^{11} - _3I_1^{11}$
 0 — 0    0 — 1    1 — 1
   0        1        0

010=2(DECIMAL)

$_4I_{35}^{11} \sim _4I_7^{11}$ $_3I_1^{12} - _4I_6^{11}$ $_4I_6^{11} - _4I_5^{11}$ $_4I_5^{11} - _4I_4^{11}$
 0 — 0    0 — 1    1 — 0
   0        1        1

011=3(DECIMAL)

$_4I_4^{11} - _4I_3^{11}$ $_4I_3^{11} - _4I_2^{11}$ $_4I_2^{11} - _4I_1^{11}$
 0 — 0    0 — 1    1 — 0
   0        1        1

011=3(DECIMAL)

FIG. 71

GRID II DIRECT SEARCH

FIG. 72

| DATA SECTION | CONCATENATION NUMBER | | | CONCATENATION INFORMATION | | | |
|---|---|---|---|---|---|---|---|
| $_1I_{35}{}^{11} \sim {}_1I_8{}^{11}$ | $_1I_7{}^{11}$ | $_1I_6{}^{11}$ | $_1I_5{}^{11}$ | $_1I_4{}^{11}$ $_1I_3{}^{11}$ | | $_1I_2{}^{11}$ $_1I_1{}^{11}$ | |
|  | 0 | 0 | 0 | 0 | 1 | 1 | 0 |
|  | 000=0(DECIMAL) | | | 01 RIGHT CONCATENATION | | 10 DOWN CONCATENATION | |
| $_2I_{35}{}^{11} \sim {}_2I_8{}^{11}$ | $_2I_7{}^{11}$ | $_2I_6{}^{11}$ | $_2I_5{}^{11}$ | $_2I_4{}^{11}$ $_2I_3{}^{11}$ | | $_2I_2{}^{11}$ $_2I_1{}^{11}$ | |
|  | 0 | 0 | 1 | 1 | 0 | 0 | 0 |
|  | 001=1(DECIMAL) | | | 10 LEFT CONCATENATION | | 00 NO UP DOWN CONCATENATION | |
| $_3I_{35}{}^{11} \sim {}_3I_8{}^{11}$ | $_3I_7{}^{11}$ | $_3I_6{}^{11}$ | $_3I_5{}^{11}$ | $_3I_4{}^{11}$ $_3I_3{}^{11}$ | | $_3I_2{}^{11}$ $_3I_1{}^{11}$ | |
|  | 0 | 1 | 0 | 0 | 0 | 0 | 1 |
|  | 010=2(DECIMAL) | | | 00 NO LEFT RIGHT CONCATENATION | | 01 UP CONCATENATION | |

GRID II DIFFERENCE SEARCH

FIG. 75

FIG. 77
GRID III DIRECT SCANNING
(a)
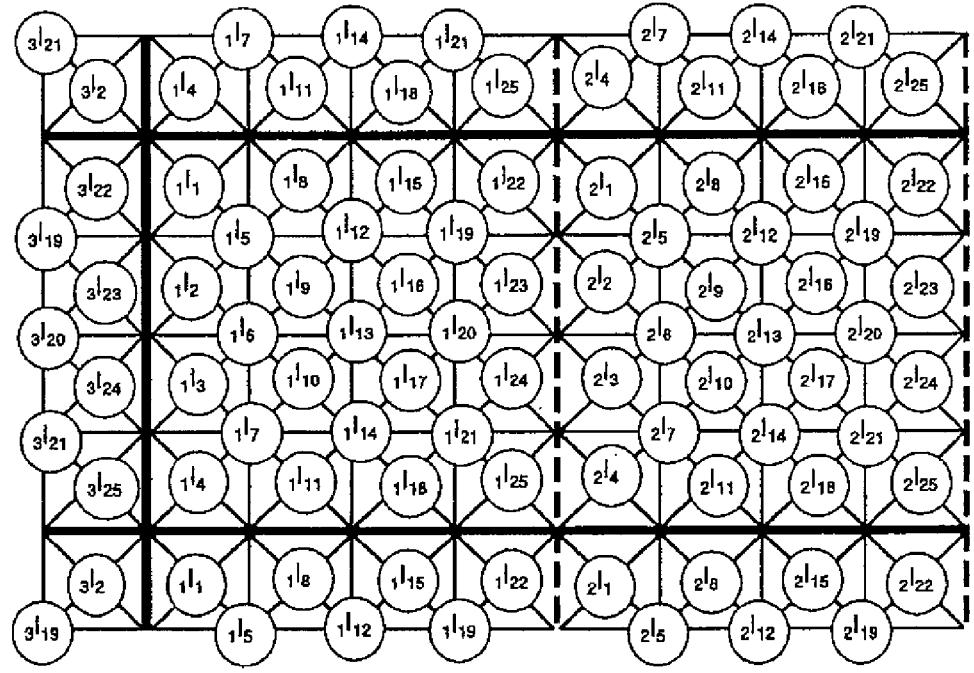
(b)
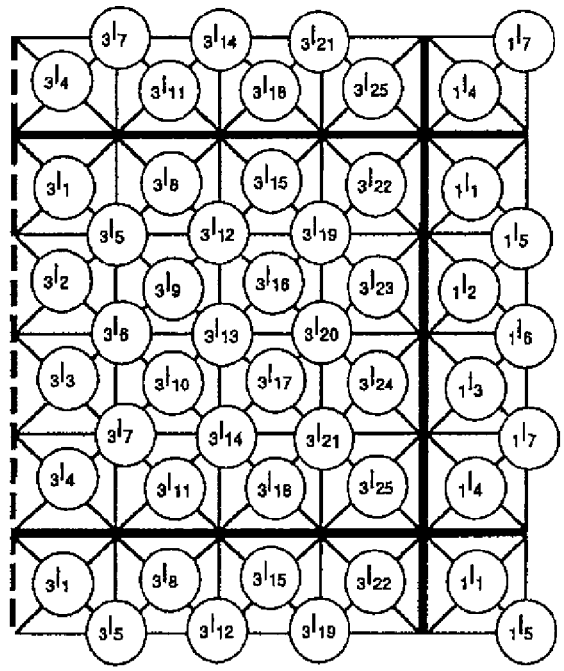

| DATA SECTION | NUMBER OF CONCATENATED BLOCKS | BLOCK CONCATENATION NUMBER |
|---|---|---|
| $_1l_{25} \sim {}_1l_5$ | $_1i_4$ $_1i_3$<br>001  101<br>$_1i_4$ $_1i_3$<br>00   10<br>0010=2(DECIMAL) | $_1i_2$ $_1i_1$<br>001  001<br>$_1i_2$ $_1i_1$<br>00   00<br>0000=0(DECIMAL) |
| $_2l_{25} \sim {}_2l_5$ | $_2i_4$ $_2i_3$<br>001  101<br>$_2i_4$ $_2i_3$<br>00   10<br>0010=2(DECIMAL) | $_2i_2$ $_2i_1$<br>001  011<br>$_2i_2$ $_2i_1$<br>00   01<br>0001=1(DECIMAL) |
| $_3l_{25} \sim {}_3l_5$ | $_3i_4$ $_3i_3$<br>001  101<br>$_3i_4$ $_3i_3$<br>00   10<br>0010=2(DECIMAL) | $_3i_2$ $_3i_1$<br>001  101<br>$_3i_2$ $_3i_1$<br>00   10<br>0010=2(DECIMAL) |

FIG. 80
GRID III DIFFERENCE SCANNNING
(a)
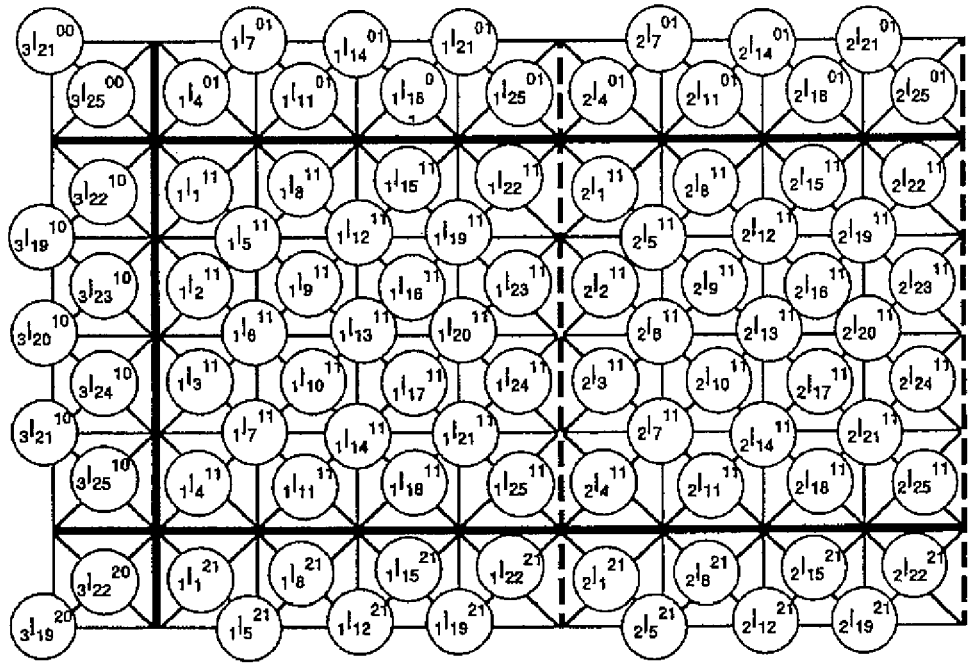
(b)
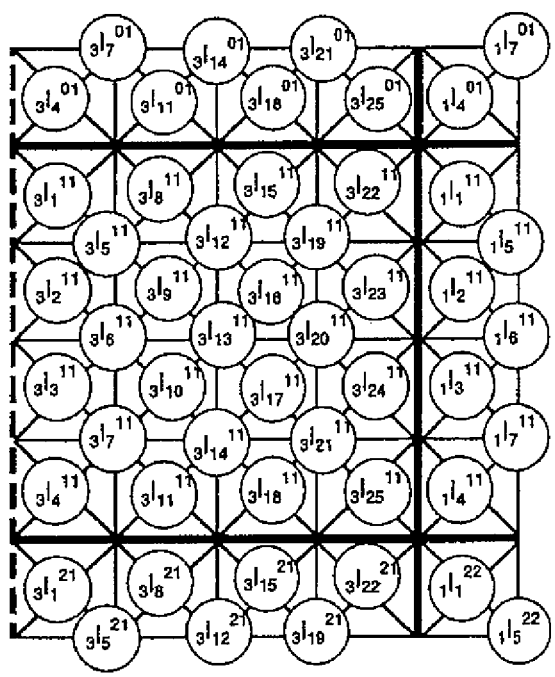

GRID III DIRECT SPIRAL

FIG. 84

| DATA SECTION | NUMBER OF CONCATENATED BLOCKS | BLOCK CONCATENATION NUMBER |
|---|---|---|
| $_1l_{25} \sim {}_1l_5$ | $_1i_4$ 001   $_1i_3$ 111<br>$_1i_4$ 00   $_1i_3$ 11<br>0011=3(DECIMAL) | $_1i_2$ 001   $_1i_1$ 001<br>$_1i_2$ 00   $_1i_1$ 00<br>0000=0(DECIMAL) |
| $_2l_{25} \sim {}_2l_5$ | $_2i_4$ 001   $_2i_3$ 111<br>$_2i_4$ 00   $_2i_3$ 11<br>0011=3(DECIMAL) | $_2i_2$ 001   $_2i_1$ 011<br>$_2i_2$ 00   $_2i_1$ 01<br>0001=1(DECIMAL) |
| $_3l_{25} \sim {}_3l_5$ | $_3i_4$ 001   $_3i_3$ 111<br>$_3i_4$ 00   $_3i_3$ 11<br>0011=3(DECIMAL) | $_3i_2$ 001   $_3i_1$ 101<br>$_3i_2$ 00   $_3i_1$ 10<br>0010=2(DECIMAL) |
| $_4l_{25} \sim {}_4l_5$ | $_4i_4$ 001   $_4i_3$ 111<br>$_4i_4$ 00   $_4i_3$ 11<br>0011=3(DECIMAL) | $_4i_2$ 001   $_4i_1$ 111<br>$_4i_2$ 00   $_4i_1$ 11<br>0011=3(DECIMAL) |

GRID III  DIFFERENCE SPIRAL

GRID III DIRECT SEARCH

FIG. 92

| DATA SECTION | CONCATENATION BLOCK NUMBER | | CONCATENATION INFORMATION | |
|---|---|---|---|---|
| $_1l_{25}{}^{11} \sim {}_1l_5{}^{11}$ | $_1l_4{}^{11}$ 001 | $_1l_3{}^{11}$ 001 | $_1l_2{}^{11}$ 001 | $_1l_1{}^{11}$ 101 |
| | $_1i_4{}^{11}$ 00 | $_1i_3{}^{11}$ 00 | $_1i_2{}^{11}$ 00 | $_1i_1{}^{11}$ 10 |
| | _____0000 = 0 (DECIMAL)_____/ | | NO LEFT RIGHT CONCATENATION | DOWN CONCATENATION |
| $_2l_{25}{}^{11} \sim {}_2l_5{}^{11}$ | $_2l_4{}^{11}$ 001 | $_2l_3{}^{11}$ 011 | $_2l_2{}^{11}$ 011 | $_2l_1{}^{11}$ 011 |
| | $_2i_4{}^{11}$ 00 | $_2i_3{}^{11}$ 01 | $_2i_2{}^{11}$ 01 | $_2i_1{}^{11}$ 01 |
| | _____0001 = 1 (DECIMAL)_____/ | | RIGHT CONCATENATION | UP CONCATENATION |
| $_3l_{25}{}^{11} \sim {}_3l_5{}^{11}$ | $_3l_4{}^{11}$ 001 | $_3l_3{}^{11}$ 101 | $_3l_2{}^{11}$ 101 | $_3l_1{}^{11}$ 001 |
| | $_3i_4{}^{11}$ 00 | $_3i_3{}^{11}$ 10 | $_3i_2{}^{11}$ 10 | $_3i_1{}^{11}$ 00 |
| | _____0010 = 2 (DECIMAL)_____/ | | LEFT CONCATENATION | NO UP DOWN CONCATENATION |

GRID III DIFFERENCE SEARCH

| DATA SECTION | NUMBER OF CONCATENATED BLOCKS | BLOCK CONCATENATION NUMBER |
|---|---|---|
| $_1I_8 \sim {}_1I_3$ | $_1I_2$<br>010=2(DECIMAL) | $_1I_1$<br>000=0(DECIMAL) |
| $_2I_8 \sim {}_2I_3$ | $_2I_2$<br>010=2(DECIMAL) | $_2I_1$<br>001=1(DECIMAL) |
| $_3I_8 \sim {}_3I_3$ | $_3I_2$<br>010=2(DECIMAL) | $_3I_1$<br>010=2(DECIMAL) |

| DATA SECTION | NUMBER OF CONCATENATED BLOCKS | BLOCK CONCATENATION NUMBER |
|---|---|---|
| $_2I_1^{11} - _1I_7^{11}, _1I_7^{11} - _1I_5^{11}, _1I_5^{11} - _1I_3^{11}$ $_2I_2^{11} - _1I_8^{11}, _1I_8^{11} - _1I_6^{11}, _1I_6^{11} - _1I_4^{11}$ | $\underbrace{_1I_4^{11} - _1I_2^{11}}_{101-011}$ 010=2(DECIMAL) | $\underbrace{_1I_3^{11} - _1I_1^{11}}_{010-010}$ 000=0(DECIMAL) |
| $_3I_1^{11} - _2I_7^{11}, _2I_7^{11} - _2I_5^{11}, _2I_5^{11} - _2I_3^{11}$ $_3I_2^{11} - _2I_8^{11}, _2I_8^{11} - _2I_6^{11}, _2I_6^{11} - _2I_4^{11}$ | $\underbrace{_2I_4^{11} - _2I_2^{11}}_{110-100}$ 010=2(DECIMAL) | $\underbrace{_2I_3^{11} - _2I_1^{11}}_{000-111}$ 001=1(DECIMAL) |
| $_1I_1^{12} - _3I_7^{11}, _3I_7^{11} - _3I_5^{11}, _3I_5^{11} - _3I_3^{11}$ $_1I_2^{12} - _3I_8^{11}, _3I_8^{11} - _3I_6^{11}, _3I_6^{11} - _3I_4^{11}$ | $\underbrace{_3I_4^{11} - _3I_2^{11}}_{111-101}$ 010=2(DECIMAL) | $\underbrace{_3I_3^{11} - _3I_1^{11}}_{011-001}$ 010=2(DECIMAL) |

GRID IV DIRECT SPIRAL

FIG. 106

| DATA SECTION | NUMBER OF CONCATENATED BLOCKS | BLOCK CONCATENATION NUMBER |
|---|---|---|
| $_1I_8 \sim {_1}I_3$ | $_1I_2$<br>011=3(DECIMAL) | $_1I_1$<br>000=0(DECIMAL) |
| $_2I_8 \sim {_2}I_3$ | $_2I_2$<br>011=3(DECIMAL) | $_2I_1$<br>001=1(DECIMAL) |
| $_3I_8 \sim {_3}I_3$ | $_3I_2$<br>011=3(DECIMAL) | $_3I_1$<br>010=2(DECIMAL) |
| $_4I_8 \sim {_4}I_3$ | $_4I_2$<br>011=3(DECIMAL) | $_4I_1$<br>011=3(DECIMAL) |

FIG. 109

GRID IV DIRECT SEARCH

FIG. 112

| DATA SECTION | CONCATENATION BLOCK NUMBER | | CONCATENATION INFORMATION | |
|---|---|---|---|---|
| $_1l_{16}{}^{11} \sim {}_1l_5{}^{11}$ | $_1i_4{}^{11}$ 001 | $_1i_3{}^{11}$ 000 | $_1i_2{}^{11}$ 011 | $_1i_1{}^{11}$ 000 |
| | $_1i_4{}^{11}$ 00 | $_1i_3{}^{11}$ 00 | $_1i_2{}^{11}$ 01 | $_1i_1{}^{11}$ 00 |
| | 0000=0(DECIMAL) | | RIGHT CONCATENATION | NO UP DOWN CONCATENATION |
| $_2l_{16}{}^{11} \sim {}_2l_5{}^{11}$ | $_2i_4{}^{11}$ 001 | $_2i_3{}^{11}$ 010 | $_2i_2{}^{11}$ 101 | $_2i_1{}^{11}$ 100 |
| | $_2i_4{}^{11}$ 00 | $_2i_3{}^{11}$ 01 | $_2i_2{}^{11}$ 10 | $_2i_1{}^{11}$ 10 |
| | 0001=1(DECIMAL) | | LEFT CONCATENATION | DOWN CONCATENATION |
| $_3l_{16}{}^{11} \sim {}_3l_5{}^{11}$ | $_3i_4{}^{11}$ 001 | $_3i_3{}^{11}$ 100 | $_3i_2{}^{11}$ 001 | $_3i_1{}^{11}$ 010 |
| | $_3i_4{}^{11}$ 00 | $_3i_3{}^{11}$ 10 | $_3i_2{}^{11}$ 00 | $_3i_1{}^{11}$ 01 |
| | 0010=2(DECIMAL) | | NO LEFT RIGHT CONCATENATION | UP CONCATENATION |

INFORMATION INPUT OUTPUT METHOD USING A DOT PATTERN

TECHNICAL FIELD

The present invention relates to an information input output method using a dot pattern for inputting and outputting various kinds of information and programs by optically reading dot pattern information formed on a printed material, and more specifically, to a method for reading a block of a dot pattern.

BACKGROUND ART

There has been proposed an information input output method for reading a bar code printed on a printed material and outputting voice or audio information. For example, a method has been proposed to store information corresponding to a given key information in a storage means, retrieve the information corresponding to the key read by a bar code reader, and output information and the like. In addition, in order to output many kinds of information and programs, a technique has been proposed to generate a dot pattern in which fine dots are arranged based on a predetermined rule, use a camera to scan the dot pattern printed on a printed material as image data, and digitize the data to output audio information.

However, the aforementioned conventional method of using a bar code to output audio information and the like has a problem in that a bar code printed on a printed material may obstruct the view. There is another problem in that, since a bar code is large enough to occupy a part of the paper, it is substantially impossible to arrange many bar codes in a limited layout space with each bar code disposed in part of text or a sentence or for each meaningful character and other object appearing in an image such as a photograph, a picture, and a graphic so as to be easily viewed.

In this context, much attention has been paid on a technique for reading a code or a coordinate using a fine dot pattern which can be superimposed on a medium surface (printed surface) as the inventors have proposed.

According to this kind of dot pattern, a dot pattern defined for each block in a predetermined area is read by an optical reading means and is converted into a predetermined code or coordinate. Then, the corresponding character, voice, image, and animation information is outputted.

However, it is necessary to determine the number of blocks (fixed length) containing the dot pattern therein. Accordingly, when a fixed length block is used, the amount of data to be defined is limited due to its fixed length, or there is a possibility that the printed area is occupied by a block having no meaning since the data is small and need not use all the fixed length blocks.

The present invention has been invented to solve the above mentioned problems. Thus, an object of the present invention is to provide a dot pattern technique with flexible length of data to be registered and with enhanced security by arranging a dot pattern to be disposed on a printed material, especially a block containing the dot pattern, on the basis of a new rule.

DISCLOSURE OF THE INVENTION

Hereinafter, the present invention will be described with reference to drawings.

First, a basic principle of a dot pattern used in the present invention will be described. Next, examples of a block concatenation of these dot patterns will be described.

(Description of a Dot Pattern: GRID1)

FIG. 1 is an explanatory drawing showing GRID1 which is an example of a dot pattern in accordance with the present invention. FIG. 2 is an enlarged drawing showing an example of an information dot of a dot pattern and a bit representation of data defined thereby. FIGS. 3(a) and (b) are explanatory drawings showing information dots disposed around a key dot.

The information input output method using a dot pattern in accordance with the present invention comprises a means of generating a dot pattern 1; recognizing the dot pattern 1; and outputting information and a program from this dot pattern 1. More specifically, the dot pattern 1 is scanned by a camera as image data. Then, a lattice dot is extracted. Next, a key dot is extracted by finding a position in which a dot is assumed to be disposed, but no dot is found. Next, an information dot 3 is extracted and digitized. Then, an information area is extracted and information is converted into a numerical value. Then, the numerical value is used to output information and a program from this dot pattern 1. For example, information such as a voice and a program is outputted from this dot pattern 1 to an information output apparatus, a personal computer, a personal digital assistant (PDA), or a cellular phone.

According to a generation of a dot pattern 1 in accordance with the present invention, fine dots, more specifically, a key dot 2, an information dot 3, and a lattice dot, are arranged by a predetermined rule using a dot code generation algorithm. As shown in FIG. 1, 5×5 lattice dots 4 are disposed around a key dot 2 to form a block of the dot pattern 1 representing information. Then, an information dot 3 is disposed at a virtual point, i.e., a center surrounded by the four lattice dots. Any numerical information is defined in this block. It should be noted that FIG. 1 shows that four blocks (thick line frame) of dot pattern 1 are disposed side by side. However, it is apparent that the number of blocks constituting a dot pattern 1 is not limited to four.

It is possible to output one information and program corresponding to one block, or to output one information and program corresponding to a plurality of blocks.

When this dot pattern 1 is read as image data by a camera, lattice dots 4 are used to correct camera lens distortion, oblique imaging, expansion and contraction of paper, curving of a medium surface, and distortion during printing. More specifically, a correction function $(X_n, Y_n) = f(X'_n, Y'_n)$ is set up to restore a distorted square defined by the four lattice dots to the original square. Then, the same function is used to correct information dots to obtain a vector of the correct information dot 3.

Because lattice dots are disposed in the dot pattern 1, when this dot pattern 1 is scanned by a camera, distortion of image data due to the camera can be corrected. Therefore, even if a general camera with a high distortion lens is used to scan the dot pattern 1, image data can be recognized correctly. In addition, even if the camera is inclined to the surface of a dot pattern 1, the dot pattern 1 can be recognized correctly.

As shown in FIG. 1, a key dot 2 is a dot which is disposed by unidirectionally shifting a lattice dot 4 from an approximate center of a square surrounded by lattice dots. This key dot is a representative point of a block of the dot pattern 1 containing an information dot 3. For example, the key dot is disposed by shifting a lattice dot 4 0.2 mm upward from the center of a block of the dot pattern 1. When an information dot 3 represents an X Y coordinate, the coordinate point is obtained by shifting a key dot 2 0.2 mm downward. It should be noted that these values are not limited to the above, but may be variable depending on the size of a block of the dot pattern 1.

An information dot is a dot used to recognize various kinds of information. These information dots 3 are disposed around the key dot 2 serving as a representative point. An information dot is expressed as a vector starting at a virtual point, i.e., a center surrounded by four lattice dots, and ending at a position in which this information dot 3 is disposed. For example, as shown in FIG. 2, an information dot is disposed 0.2 mm away from the virtual point surrounded by lattice dots 4, and is expressed as a vector having a direction and a length. When an information dot is rotated 45 degrees clockwise, the information dot can be disposed in eight directions to express three bits. Accordingly, a block of dot pattern 1 can express 3 bits×16=48 bits.

It should be noted that three bits are expressed by eight directions as shown in FIG. 2, but the present invention is not limited to this. It is apparent that four bits can be expressed by 16 directions and other modifications are also possible.

It is desirable that the diameter of the key dot 2, the information dot 3 or the lattice dot 4 is approximately 0.1 mm, in view of its appearance, printing precision corresponding to paper quality, camera resolution and optimum digitization.

In addition, in view of the amount of information necessary for an imaging area and false recognition of various kinds of dots 2, 3, and 4, it is desirable that lattice dots 4 are spaced apart approximately 1 mm vertically and horizontally. It is desirable that the amount of shifting a key dot is approximately 20% of spacing between lattices to avoid false recognition between a lattice dot 4 and information dot 3.

It is desirable that the spacing between an information dot 3 and a virtual point surrounded by four lattice dots 4 is approximately 15-30% of spacing between adjacent virtual points. If the distance between an information dot 3 and a virtual point is longer than this spacing, the dots are easily recognized as a one big dot. Thus it is hard to be seen as a dot pattern 1. On the contrary, if the distance between an information dot 3 and a virtual point is shorter than this spacing, it is hard to determine which virtual point of the adjacent virtual points is related to the information dot 3 having a vector direction.

For example, as shown in FIG. 3 (a) information dots 3 $I_1$ to $I_{16}$ are disposed around the key dot 2. Lattice spacing is 1 mm. A 4 mm×4 mm block represents 3 bits×16=48 bits.

It should be noted that a block is further divided into several subblocks, each of which has independent information content and is not affected by other information content. As shown in FIG. 3 (b), a subblock consists of four information dots such as [$I_1$, $I_2$, $I_3$, $I_4$], [$I_5$, $I_6$, $I_7$, $I_8$], [$I_9$, $I_{10}$, $I_{11}$, $I_{12}$], and [$I_{13}$, $I_{14}$, $I_{15}$, $I_{16}$]. Each subblock has independent data (3 bits×4=12 bits). Thus it is easy to perform error checking for each subblock.

It is desirable that the vector direction (rotational direction) of an information dot 3 is evenly determined for each 30-90 degrees.

FIG. 4 shows examples of a bit representation of an information dot and data defined therein.

In addition, assuming that two kinds of length, i.e., long and short, is used as the spacing between an information dot 3 and a virtual point surrounded by lattice dots 4, and the number of vector directions is eight, 4 bits can be expressed. In this case, it is desirable that the long length is 25-30% of the spacing between the adjacent lattice points, and the short length is 15-20% of the spacing between the adjacent lattice points. It should be noted that it is desirable that the length between the centers of long and short spacing information dots 3 is longer that the diameter of the information dot.

It is desirable that an information dot 3 surrounded by four lattice dots 4 is one dot to consider its appearance. However, in order to increase the amount of information without considering its appearance, one information dot 3 can be expressed by a plurality of dots by allocating one bit for each vector. Thereby an information dot 3 can have a large amount of information. For example, when a vector is arranged concentrically in eight directions, an information dot 3 surrounded by four lattice dots 4 can express $2^8$ information, and a block consisting of 16 information dots can express $2^{128}$ information.

FIG. 5 shows examples of a bit representation of an information dot and data defined therein. Two dots are disposed in (a), four dots are disposed in (b), and five dots are disposed in (c).

FIG. 6 shows modifications of a dot pattern. (a), (b), (c), and (d) are schematic drawings of information dots. Six information dots are disposed in (a), nine information dots are disposed in (b), 12 information dots are disposed in (c), and 36 information dots are disposed in (d).

Dot patterns 1 as shown in FIGS. 1 and 3 are examples in which 16 (4×4) information dots 3 are disposed in a block. However, the number of information dots 3 in a block is not limited to 16, but other modifications are possible. For example, 6 (2×3) information dots 3 in a block as in (a), 9 (3×3) information dots 3 in a block as in (b), 12 (3×4) information dots 3 in a block as in (c), and 36 (6×6) information dots 3 in a block as in (d).

(Description of a Dot Pattern: GRID2)

Hereinafter the basic principle of a dot pattern for GRID2 will be described with reference to FIG. 7. GRID2 is a dot placement algorithm using a difference method.

First, lattice lines (y1 to y7, x1 to x5) are assumed to be drawn in a predetermined interval in x and y directions as shown in FIG. 7. A point of intersection between the lattice lines is called a lattice point. According to this embodiment, a block surrounded by four lattice points is set as a minimum unit (one grid). Four blocks (four grids) are placed in x and y directions and a total of 4×4=16 blocks (16 grids) are treated as one information block. It should be noted that 16 blocks treated as a unit of information block are just an example, and it is apparent that any number of blocks can constitute an information block.

The four corner points constituting a rectangular area of this information block is set as corner dots (x1y1, x1y5, x5y1, x5y5) (circled dots in the figure). These four corner dots are made to coincide with lattice points.

In this way, an information block can be identified by finding four corner dots coinciding with lattice points. It should be noted that an information block can be identified by corner dots, but its direction cannot be identified only by corner dots. For example, if the direction of an information block cannot be identified, when an information block rotated ±90 or 180 degrees is scanned, the information block may be recognized different information block.

With this in mind, a vector dot (key dot) is disposed on a lattice point inside the rectangular area or in an adjacent rectangular area of the information block. With reference to the figure, a vector dot is indicated by a dot (x0y3) surrounded by a triangle. More specifically, the key dot (vector dot) is disposed on a lattice point situated one lattice point upward from the middle of the lattice line constituting the upper line of the information block. In the same way as above, an key dot of another information block disposed under this information block is disposed on a lattice dot (x4y3) above the middle of the lattice line constituting the bottom line of this information block.

According to this embodiment, the distance between lattices (grids) is set to 0.25 mm. Accordingly, one side of an information block is 0.25 mm×4 grids 1 mm. Its area is 1 mm×1 mm=1 mm². This area can contain 14 bits of information. If 2 bits of them is used as control data, 14 bits of information can be stored. It should be noted that a value of 0.25 mm set as the distance between lattices (grids) is just an example, and any value ranging between 0.25 to 0.5 mm may be freely set as the distance.

According to GRID2, an information dot is disposed every other lattice point shifted in x and y directions. It is preferable that the diameter of an information dot is extremely small, between 0.03 and 0.05 mm, and the amount of shift from a lattice point is approximately 15 to 25%. This amount of shift is just an example, the present invention is not limited to this, but if a value exceeding 25% is used as the amount of shift, a dot pattern may tend to be seen in patterns.

In other word, an information dot is shifted alternately between vertically (y direction) and horizontally (x direction). Accordingly, an uneven distribution of a dot and visual recognition of moiré and a figured pattern on a printed surface can be prevented, thereby keeping an aesthetic appearance of the printed surface.

This placement principle allows an information dot to be disposed on every other point on the lattice line in the y direction (see FIG. 8). This means that when a dot pattern is read, all that is needed is only to find a lattice line disposed on every other straight line in the y direction or the x direction. This is advantageous because the computational algorithm of the information processing apparatus can be simplified and its recognition speed can be increased.

In addition, even if a dot pattern is deformed due to a curving of paper and like, the lattice line may not be a straight line, but it is relatively easy to find a lattice line since the lattice line is a slowly varying curve approximating a straight line. Accordingly, this algorithm is resistant to deformation of paper and displacement or distortion of an optical reading system.

With reference to FIG. 9, the meaning of an information dot will be described. In this figure, a cross mark + denotes a lattice point; a large round mark ● denotes a dot (information dot). An information dot disposed in the −y direction relative to a lattice point is set to 0, and an information dot disposed in the +y direction is set to 1. Likewise, an information dot disposed in the −x direction relative to a lattice point is set to 0, and an information dot disposed in the +x direction is set to 1.

Next, with reference to FIG. 10, an information dot placement state and reading algorithm will be described.

In this figure, a circled 1 (herein after referred to as an information dot (1)) is shifted in the +x direction relative to a lattice point (x2y1), thus meaning "1". An information dot (2) (circled 2) is shifted in the +y direction relative to a lattice point (x3y1), thus meaning "1". An information dot (3) (circled 3) is shifted in the −x direction relative to a lattice point (x4y1), thus meaning "0". An information dot (4) (circled 4) means "0". An information dot (5) (circled 5) means "0".

The dot pattern as shown in FIG. 10 contains information dots (1) to (17), each having the following value.

(1)=1
(2)=1
(3)=0
(4)=0
(5)=0
(6)=1
(7)=0
(8)=1
(9)=0
(10)=1
(11)=1
(12)=0
(13)=0
(14)=0
(15)=0
(16)=1
(17)=1

It should be noted that in this embodiment, the values of the above information bits are calculated by an information acquisition algorithm using a difference method as described below, but the information dots may be outputted as information bits as is. Alternatively, an arithmetic processing may be performed on these information bits using a security table described later to produce a true value.

Next, with reference to FIG. 10, an information acquisition method using a difference method on the basis of a dot pattern of this embodiment will be described.

It should be noted that in the description of this embodiment, a number in parentheses corresponds to the number in a circle (circled number), and a number in brackets corresponds to the number in a square.

According to this embodiment, a value of each of the 14 bits within the information block is expressed by a difference between the adjacent information dots For example, the first bit is obtained by the difference between the information dot (1) and the information dot (5) which is disposed +one lattice in the x direction. More specifically, [1]=(5)−(1). Here, the information dot (5) is "0" and the information dot (1) is "1". Thus, the first bit [1] is 0−1=1. In the same way, the second bit [2] is expressed by (6)−(2), and the third bit is expressed by (7)−(3). The resultant bits [1] to [3] are as follows.

It should be noted that the following values are absolute values in the following difference formula.

$$[1]=(5)-(1)=0-1=1$$

$$[2]=(6)-(2)=1-1=0$$

$$[3]=(7)-(3)=0-0=0$$

Next, the fourth bit [4] is obtained by the difference between the information dot (5) and the information dot (8) which is disposed just on a vector dot. The bits from the fourth bit [4] to the sixth bit [6] are obtained by the difference between the values of information dots which are disposed one lattice in the +x direction and one lattice in the +y direction.

In this way, the bits from the fourth bit [4] to the sixth bit [6] can be calculated by the following formula.

$$[4]=(8)-(5)=1-0=1$$

$$[5]=(9)-(6)=0-1=1$$

$$[6]=(10)-(7)=1-0=1$$

Next, the bits from the fourth bit [7] to the sixth bit [9] are obtained by the difference between the values of information dots which are disposed one lattice in the +x direction and one lattice in the −y direction.

In this way, the bits from the fourth bit [7] to the sixth bit [9] can be calculated by the following formula.

$$[7]=(12)-(8)=0-1=1$$

$$[8]=(13)-(9)=0-0=0$$

$$[9]=(14)-(10)=0-1=1$$

Next, the bits from the 10th bit [10] to the 12th bit [12] are obtained by the difference between the values of information dots which are disposed one lattice in the +x direction as listed below.

$$[10]=(15)-(12)=0-0=0$$

$$[11]=(16)-(13)=1-0=1$$

$$[12]=(17)-(14)=1-0=1$$

Lastly, the 13th bit [13] and 14th bit [14] are obtained by the difference between information dots which are disposed +one lattice and −one lattice in the x direction as listed below.

$$[13]=(8)-(4)=1-0=1$$

$$[14]=(11)-(8)=1-1=0$$

It should be noted that the bits from the first bit [1] to the 14th bit [14] may be read as true values as is, but to maintain the security, a security table corresponding to the 14 bits is created and a key parameter is defined for each bit, and then, true values may be obtained by performing addition, multiplication and other arithmetic processing on the read data.

In this case, a true value can be obtained by $Tn=[n]+Kn$ (n:1-14, Tn: true value, [n]: read value, Kn: key parameter). The security table containing these key parameters can be stored in a ROM of the optical reading apparatus.

For example, assume that the following key parameters are entered in the security table.

$K_1=0$
$K_2=0$
$K_3=1$
$K_4=0$
$K_5=1$
$K_6=1$
$K_7=0$
$K_8=1$
$K_9=1$
$K_{10}=0$
$K_{11}=0$
$K_{12}=0$
$K_{13}=1$
$K_{14}=1$

Then, the true values T1 to T14 can be obtained by the following formula.

$$T_1=[1]+K_1=1+0=1$$

$$T_2=[2]+K_2=0+0=0$$

$$T_3=[3]+K_3=0+1=1$$

$$T_4=[4]+K_4=1+0=1$$

$$T_5=[5]+K_5=1+1=0$$

$$T_6=[6]+K_6=1+1=0$$

$$T_7=[7]+K_7=1+0=1$$

$$T_8=[8]+K_8=0+1=1$$

$$T_9=[9]+K_9=1+1=0$$

$$T_{10}=[10]+K_{10}=0+0=0$$

$$T_{11}=[11]+K_{11}=1+0=1$$

$$T_{12}=[12]+K_{12}=1+0=1$$

$$T_{13}=[13]+K_{13}=1+1=0$$

$$T_{14}=[14]+K_{14}=0+1=1$$

The relation among an information bit, a security table, and a true value is shown in FIG. 11.

It should be noted that in the above description, an information bit is obtained from an information dot and then a true value is obtained by referring to a security table. However, if a dot pattern is generated from a true value, the value of an nth bit is obtained by $[n]=Tn-Kn$.

Assuming that T1=1, T2=0, and T3=1, the bits from the first bit [1] to the third bit [3] can be obtained by the following formula.

$$[1]=1-0=1$$

$$[2]=0-0=0$$

$$[3]=1-1=0$$

And the bits from the first bit [1] to the third bit [3] can be obtained by the following difference formula.

$$[1]=(5)-(1)$$

$$[2]=(6)-(2)$$

$$[3]=(7)-(3)$$

Here, given the initial values of the dots such as (1)=1, (2)=1, and (3)=0, the dots (5) to (7) can be obtained as follows.

$$(5)=(1)+[1]=1+1=0$$

$$(6)=(2)+[2]=1+0=1$$

$$(7)=(3)+[3]=0+0=0$$

In the same way, the values of dots (8) to (14) can be obtained, and dots may be disposed on the basis of these values, though their description is omitted here.

It should be noted that the initial values of dots (1) to (3) are arbitrary random numbers.

In other word, the values of dots (5) to (7) to be disposed on the next lattice line in the y direction can be obtained by adding the values of information bits [1] to [3] to the assigned initial dots (1) to (3). In the same way, the values of dots (8) to (10) can be obtained by adding the values of information bits [4] to [6] to the values of initial dots (5) to (7). Further, dots (12) to (14) can be obtained by adding the values of information bits [7] to [9] to them. Further, dots (15) to (17) can be obtained by adding the values of information bits [10] to [12] to them.

It should be noted that the dot (4) can be obtained by subtracting information bit [13] from the dot (8) obtained above, and the dot (11) can be obtained by adding information bit [14] to the dot (8).

As described above, according to this embodiment, the placement of dots on a lattice line yn is determined by the placement of dots on a lattice line y(n−1). The entire placement of information dots is determined by sequentially repeating this process.

(Description of a Dot Pattern: GRID3)

Hereinafter, GRID3 will be described.

FIG. 12 is an explanatory drawing showing an example of a dot pattern in accordance with the present invention. FIG. 13 is an enlarged drawing showing an example of an information dot of a dot pattern and a bit representation of data defined thereby. FIGS. 14 (a), (b), and (c) are explanatory drawings showing placement states of key dots and information dots.

The information input output method using a dot pattern in accordance with the present invention comprises a means of recognizing a dot pattern 1, and a means of outputting information and a program from this dot pattern 1. More specifically, a dot pattern 1 is scanned as image data by a camera, and first, a reference lattice point dot is extracted. Next, key dots 2 (four corners of a block) are extracted by confirming that a dot is not disposed on a position where a reference lattice point dot should be disposed. Next, information dots 3 are extracted and digitized. Then, an information area is extracted and information is converted into a numerical value. Then, the numerical information is used to output information and a program from this dot pattern 1.

For example, information such as a voice and a program are outputted from this dot pattern 1 to an information output apparatus, a personal computer, a PDA, or a cellular phone.

According to a generation of a dot pattern 1 in accordance with the present invention, a dot code generation algorithm is used to arrange very fine dots, i.e., key dots 2, information dots 3, and lattice dots 4, by a predetermined rule. As shown in FIG. 12, 5×5 lattice dots 4 are disposed around a key dot 2 to form a block of the dot pattern 1 representing information. Then, an information dot 3 is disposed around a virtual point, i.e., a center surrounded by the four lattice dots. Any numerical information is defined in this block. It should be noted that FIG. 12 shows that four blocks (thick line frame) of dot pattern 1 are disposed side by side. However, it is apparent that the number of blocks constituting a dot pattern 1 is not limited to four.

It is possible to output one information and program corresponding to one block, or to output one information and program corresponding to a plurality of blocks.

When this dot pattern 1 is scanned as image data by a camera, lattice dots 4 are used to correct camera lens distortion, oblique imaging, expansion and contraction of paper, curving of a medium surface, and distortion during printing. More specifically, a correction function $(X_n, Y_n) = f(X'_n, Y'_n)$ is set up to restore a distorted square defined by the four lattice dots to the original square. Then, the same function is used to correct information dots to obtain a vector of the correct information dot 3.

When lattice dots 4 are disposed in the dot pattern 1, and this dot pattern 1 is scanned by a camera, distortion of image data due to the camera can be corrected. Therefore, even if a general camera with a high distortion lens is used to scan the dot pattern 1, image data can be recognized correctly. In addition, even if the camera is inclined to the surface of a dot pattern 1, the dot pattern 1 can be recognized correctly.

As shown in FIG. 12, a key dot 2 is a dot which is disposed by unidirectionally shifting a lattice dot 4 relative to an approximate center surrounded by lattice dots 4 disposed in a form of a rectangle. This key dot is a representative point of a block of the dot pattern 1 containing an information dot 3. For example, the key dot is disposed by shifting a lattice dot 4 0.2 mm upward from the center of a block of the dot pattern 1. When an information dot 3 represents an XY coordinate, the coordinate point is obtained by shifting a key dot 2 0.2 mm downward. It should be noted that these values are not limited to the above, but may be variable depending on the size of a block of the dot pattern 1.

An information dot 3 is a dot used to recognize various kinds of information. These information dots 3 are disposed around the key dot 2 serving as a representative point. An information dot 3 is expressed as a vector starting at a virtual point, i.e., a center surrounded by four lattice dots, and ending at a position in which this information dot is disposed. For example, as shown in FIG. 13, an information dot 3 is disposed 0.2 mm away from the virtual point surrounded by lattice dots 4, and is expressed as a vector having a direction and a length. When an information dot 3 is rotated 45 degrees clockwise, the information dot can be disposed in eight directions to express three bits. Accordingly, a block of dot pattern 1 can express 3 bits×16=48 bits.

It should be noted that three bits are expressed by eight directions as shown in the figure, but the present invention is not limited to this. It is apparent that four bits can be expressed by 16 directions and other modifications are also possible.

It is desirable that the diameter of a dot such as a key dot 2, an information dot 3 or a lattice dot 4 is approximately 0.1 mm, in view of its appearance, printing precision corresponding to paper quality, camera resolution and optimum digitization.

In addition, in view of the amount of information necessary for an imaging area and false recognition of various kinds of dots 2, 3, and 4, it is desirable that lattice dots 4 are spaced apart approximately 1 mm vertically and horizontally. It is desirable that the amount of shifting a key dot 2 is approximately 20% of spacing between lattices to avoid false recognition between a lattice dot 4 and information dot 3.

It is desirable that the spacing between an information dot 3 and a virtual point surrounded by four lattice dots 4 is approximately 15-30% of distance between adjacent virtual points. If the distance between an information dot 3 and a virtual point is longer than this spacing, dots are easily recognized as one big dot. Thus it is hard to be seen as a dot pattern 1. On the contrary, if the distance between an information dot 3 and a virtual point is shorter than this spacing, it is hard to determine which virtual point of the adjacent virtual points is related to the information dot 3 having a vector direction.

For example, as shown in FIG. 14 (*a*), information dots 3 $I_1$ to $I_{16}$ are disposed around the key dot 2. Lattice spacing is 1 mm. A 4 mm×4 mm block represents 3 bits×16=48 bits.

It should be noted that a block is further divided into several subblocks, each of which has independent information content and is not affected by other information content. As shown in FIG. 14 (*b*), a subblock consists of four information dots such as $[I_1, I_2, I_3, I_4]$, $[I_5, I_6, I_7, I_8]$, $[I_9, I_{10}, I_{11}, I_{12}]$, and $[I_{13}, I_{14}, I_{15}, I_{16}]$. Each subblock has independent data (3 bits×4=12 bits). Thus it is easy to perform error checking for each subblock.

It is desirable that the vector direction (rotational direction) of an information dot is evenly determined for each 30-90 degrees.

FIG. 15 shows an example of a bit representation of an information dot and data defined therein, which shows another embodiment.

In addition, assuming that two kinds of length, i.e., long and short, is used as the distance between an information dot 3 and a virtual point surrounded by lattice dots 4, and the number of vector directions is eight, 4 bits can be expressed. In this case, it is desirable that the long length is 25-30% of the distance between the adjacent lattice points, and the short length is 15-20% of the distance between the adjacent lattice points. However, it is desirable that the distance between centers of a long information dot and a short information dot is longer than the diameter of these dots.

It is desirable that an information dot 3 surrounded by four lattice dots 4 is one dot to consider its appearance. However, in order to increase the amount of information without considering its appearance, one information dot 3 can be expressed by a plurality of dots by allocating one bit for each vector. Thereby an information dot 3 can have a large amount of information. For example, when a vector is arranged concentrically in eight directions, an information dot 3 surrounded by four lattice dots 4 can express $2^8$ information, and a block consisting of 16 information dots can express $2^{128}$ information.

FIG. 16 shows examples of a bit representation of an information dot and data defined therein. Two dots are disposed in (a), four dots are disposed in (b), five dots are disposed in (c) to (e), and seven dots are disposed in (f).

FIGS. 12 and 14 show dot patterns 1 in which 16 (4×4) information dots are disposed in a block. However, the number of information dots in a block is not limited to 16, and other modifications are possible. For example, 6 (2×3) information dots 3 in a block as in (a), 9 (3×3) information dots 3 in a block as in (b), 12 (3×4) information dots 3 in a block as in (c), and 36 (6×6) information dots 3 in a block as in (d), depending on the amount of information required and the camera resolution.

(Description of a Dot Pattern: GRID4)

FIG. 17 shows examples of a dot pattern in accordance with an embodiment of the present invention. (a) shows a dot pattern consisting of 4×4 lattices. (b) shows a dot pattern consisting of 5×4 lattices. (c) shows a dot pattern consisting of 6×4 lattices.

With reference to FIG. 17 (*a*), reference lattice lines 5*a* to 5*d* are disposed horizontally and vertically along the four sides of a square, and virtual lattice points 6 are disposed at a predetermined interval within the square.

Note that reference lattice lines 5*a* to 5*d* and virtual lattice points 6 are not actually printed on paper (medium surface), but virtually set in computer image memory when dot patterns are disposed or read.

Next, a reference lattice point dot 7 is disposed on a virtual lattice point 6 on upper and lower horizontal reference lattice lines 5*a* and 5*b*.

Next, a line connecting virtual lattice points 6 is assumed as a lattice line 8, and an intersection point of the lattice lines 8 is also assumed as a virtual lattice point 6.

Next, one or more information dots 3, each having a distance and a direction from a virtual grid point 4, are disposed for each virtual lattice point 6 to generate a dot pattern. It should be noted that in FIG. 17, one information dot 3 is disposed for each virtual lattice point 6.

As described above, FIG. 17 (*a*) shows that information dots are disposed with four lattices in the vertical direction and four lattices in the horizontal direction (4×4 lattices) (b) 5×4 lattices, and (c) 6×4 lattices.

FIG. 18 shows how to define an information dot. The value of an information dot is defined depending on the direction from a virtual lattice point 6. More specifically, an information dot can be disposed on one of the eight points, each shifted 45 degrees clockwise on the basis of a lattice line 8 passing through a virtual lattice point 6 so as to define a total of eight different information dots (000 to 111 in binary notation, three bits).

In FIG. 19, a two-step distance is provided, each in the same direction as described above to define a total of 16 different information dots (0000 to 1111 in binary notation, four bits).

In FIG. 20, a plurality of information dots 3 are disposed concentrically around a virtual lattice point 6. If a dot is present there, 1 is defined, and if not, 0 is defined so as to define a total of eight bits. Thus, a dot disposed in a vertical direction is defined as a first bit, and then subsequent bit information is defined clockwise sequentially.

In FIG. 21, the aforementioned concentric circle is doubled to define a total of 16 bits. This structure allows a large amount of information to be defined for a virtual lattice point 6.

FIG. 22 explains the order for an optical reading means to read information dots. The circled numbers in the figure are used just for convenience, and in actuality correspond to dot patterns shown in FIGS. 17 (*a*) to (*c*).

With reference to FIG. 22 (*a*), scanning starts with the left-most vertical reference lattice line 51*c* to read an information dot 3 for each virtual lattice point 6 (circled numbers from (1) to (3)). Then scanning moves on to the next vertical lattice line 8 to read from top to bottom (circled numbers from (4) to (6)). This process is repeated sequentially to read for each lattice point.

It should be noted that the above described order of reading for each lattice point is to start with the left-most vertical lattice line, but it is obvious that any lattice order of disposing and reading information is possible.

(Embodiment of Block Concatenation)

With reference to FIGS. 23 to 39, an embodiment of concatenation of blocks in which a dot pattern is formed.

These drawings, especially concatenation information, are shown schematically for convenience of description, but in actuality, concatenation information is formed as a dot pattern.

(Block Concatenation Data Spiral)

With reference to FIG. 23, concatenation information consists of a first concatenation information (a number on the upper left side of a block) and a second concatenation information (a number on the lower left side of a block).

Here, the first concatenation information indicates a block reading sequence, and second concatenation information indicates total number of blocks to be read. Accordingly, the FIG. 23 (*a*) indicates that the total number of blocks is one, and the dot pattern to be read consists of only one block.

In the same way, FIG. 23 (*b*) indicates that the total number of blocks is two, and a block (2) (circled 2 in the figure) and a block (1) (circled 1 in the figure) should be read. FIG. 23 (*c*) indicates that blocks (1), (2), (3) and a dummy block constitutes a group of information (block group), a block which is first read by a optical reading means is a dummy block, and each block should be read starting with the dummy block and proceeding in a sequence of (3), (2), and (1) in that order spirally.

Here, a dummy block is a block in which information meaningful as a dot pattern is not stored. When one or two or more dummy blocks are disposed in a block group, the amount of information to be entered can be flexibly specified without changing a rectangular shape formed of a block group. For such a dummy block, the value of a first concatenation information is switched to the value of a second concatenation information. As a result, the first concatenation information indicates the total number of blocks, and the second concatenation information indicates the position of a dummy block by a difference value between the first concatenation information and the second concatenation information. If the value of the first concatenation information is equal to or smaller than the value of the second concatenation information, the block is a normal block containing meaningful information. If the value of the first concatenation information is larger than the value of the second concatenation information, the block is a dummy block.

Insertion of a dummy block allows a group of blocks to be formed in a rectangular shape having a series of information chunks, thus increasing the reading efficiency of the optical reading means.

In addition, with a focus on one block, information of a dot pattern to be stored has a fixed length, but variable length information can be processed by associating a plurality of blocks with each other using concatenation information.

With reference to FIG. 23 (c), if the dummy block is assumed to be a start point of reading, a CPU of the optical reading means judges the block as a dummy block based on a program since the first concatenation information (value "2") is greater than the second concatenation information (value "1"). Then, the CPU judges that the block group consists of three blocks since the total number of blocks is obtained by adding 1 to the value of the first concatenation information. Next, the CPU creates a block sequence table for reading three blocks into memory of the optical reading means.

Then, blocks are read starting with this dummy block and then blocks (3), (2), and (1) in that order until all the read flags are set to "1". In this way, as shown in FIG. 23 (c), even if reading starts with a dummy block, all the necessary blocks can be read by a block sequence table on the basis of concatenation information.

It should be noted that in regard to a dummy block, (e) is processed in the same way.

The above described reading sequence is shown in FIG. 40 indicating a change of a block sequence table installed in the optical reading means.

As shown in the figure, the second block (2) is assumed to be a starting block to be read by the optical reading means. The optical reading means reads the block (2) and finds that its second concatenation information has a value "3". Then, the optical reading means creates a block sequence table capable of setting four read flags to blocks with block sequences 0 to 3. At the time when this sequence table is created, all the read flags are set to "0".

Next, the optical reading means finds that the first concatenation information of the reading start block has a value "2" and changes the flag with the block sequence "2" in the sequence table to 1.

Next, the optical reading means reads a block (3) disposed +one block shifted in the x direction. The optical reading means finds that the first concatenation information of the block (3) has a value "3" and sets the flag with the block sequence "3" in the sequence table (changes the flag to 1).

Next, the optical reading means reads a block (0) disposed −one block shifted in the y direction. The optical reading means finds that the first concatenation information of the block (0) has a value "0" and sets the flag with the block sequence "0" in the sequence table (changes the flag to 1).

Further, the optical reading means reads a block (1) disposed −one block shifted in the x direction. The optical reading means finds that the first concatenation information of the block (1) has a value "1" and sets the flag with the block sequence "1" in the sequence table (changes the flag to 1).

Here, the optical reading means confirms that all the read flags in the block sequence table are set to "1", which means that all the blocks constituting a block group containing a block of information have been read. Then, the optical reading means terminates reading.

With reference to FIG. 23 (e), when reading starts with a dummy block, the optical reading means scans blocks starting with the dummy block and continuing with (5), (2), (1), (3), and (4) in that order. At this time, the optical reading means checks the concatenation information of the dummy block and a block (5) to find that the total number of blocks containing information is five. Then, the optical reading means creates a table for five blocks in its memory. Each time when reading a block, the optical reading means sets a flag in the table created by the block sequence on the basis of concatenation information. When all the flags are set, the optical reading means judges that all the necessary blocks have been read. Then, the optical reading means reorders the data read for each block according to the read sequence and outputs corresponding audio information, character information, a program, image information, video information, and the like.

FIG. 24 (a) shows an example of disposing two dummy blocks. (b) shows an example of disposing one dummy block. (d) shows an example of disposing two dummy blocks. (e) shows an example of disposing one dummy block.

FIG. 25 (a) shows a configuration of 4×4=16 blocks. Three blocks of them are dummy blocks, and the remaining thirteen blocks are information blocks.

FIG. 25 (b) shows another configuration of 16 blocks. Two blocks of them are dummy blocks, and the remaining fourteen blocks are information blocks.

Likewise, FIG. 26 (a) shows yet another configuration of 16 blocks. One block of them is a dummy block, and the remaining fifteen blocks are information blocks.

FIG. 26 (b) shows yet another configuration of 16 blocks, all of which are information blocks.

As described above, according to this embodiment, each block has a fixed length, but data to be stored as a dot pattern can be treated as variable length by concatenating blocks on the basis of concatenation information. In addition, use of a dummy block allows a group of blocks to be configured as a rectangular shape or any other shape.

(Description of Block Concatenation Data Scanning Method)

With reference to FIGS. 27 to 28, a block concatenation data scanning method will be described.

Here, FIG. 27 (a) shows that blocks are concatenated horizontally into a group of blocks and three block groups are arranged vertically.

FIG. 27 (b) shows that two blocks concatenated vertically are further concatenated horizontally into a group of blocks ending with a dummy block.

FIG. 27 (c) shows that three blocks concatenated vertically are further concatenated horizontally into a group of blocks ending with two dummy blocks.

It should be noted that the optical reading means can obtain the number of blocks to be concatenated in the width direction by the difference between the reading sequence of left and right data blocks. In other word, a block group with an arbitrary width can be read.

FIG. 28 shows ranges in which the optical reading means reads a group of blocks concatenated horizontally.

FIG. 28 (a) shows an example in which the optical reading means reads a group of blocks which are horizontally concatenated starting with a block (4) by reading concatenation information. The optical reading means scans and sequentially reads a group of blocks which are horizontally concatenated. First, the optical reading means reads the second concatenation information of the block (4) and creates a block sequence table (for six blocks). Next, the optical reading means sets a read flag (changes the flag to "1") by sequentially reading a group of blocks horizontally. When all the read flags in the block sequence table are set, the optical reading means completes reading the block group. At this time, a CPU (not shown) of the optical reading means may monitor the state of flags in the block sequence table based on a program, and may output a scanning end signal by sound or display light of an LED.

FIG. 28 (b) shows an example of horizontally scanning two rows of vertically concatenated block group. FIG. 28 (c) shows an example of horizontally scanning three rows of vertically concatenated block group.

FIGS. 29 to 39 show examples of reading blocks on the basis of what is called "block concatenation data search".

With reference to FIG. 29, there are three kinds of concatenation information: a first concatenation information, a second concatenation information, and a third concatenation information. The first concatenation information disposed at the top defines how to concatenate blocks disposed in the up and down directions. The second concatenation information disposed in the middle defines how to concatenate blocks disposed left and right. The third concatenation information disposed at the bottom contains a block concatenation number. If the first concatenation information has a value "0", it means that there is no block concatenation. If the first concatenation information has a value "1", it means that the block is concatenated to an up block. If the first concatenation information has a value "2", it means that the block is concatenated to a down block. If the first concatenation information has a value "3", it means that the block is concatenated to both an up block and a down block.

It should be noted that FIG. 29 shows three kinds of concatenation information are all "0", indicating that fully completed information is stored in one block.

FIGS. 30 to 39 show examples of reading blocks containing these three kinds of concatenation information.

With reference to FIG. 30 (a), first, the optical reading means reads a block (2) and checks three kinds of concatenation information of the block (2). The optical reading means finds that the first concatenation information has a value "0", the second concatenation information has a value "2", and the third concatenation information has a value "1". The optical reading means judges that the block (2) is not concatenated in the up or down direction, but the block (2) is concatenated left or right, and the block has a second sequence in the block group (the value "1" of the third concatenation information indicates "2" since the initial value is "0"). As a result, the optical reading means reads the dot pattern of this block (2) and then, reads the dot pattern of an adjacent left block (1) on the basis of the second concatenation information. According to this block (1), the first concatenation information has a value "0", the second concatenation information has a value "1", and the third concatenation information has a value "0". The optical reading means judges that the block (1) is not concatenated in the up or down directions, but the block (1) is concatenated left or right, and the block has a first sequence in the block group (the value "0" of the third concatenation information indicates "1" since the initial value is "0"). Then, the optical reading means completes reading the block group since all the concatenated blocks starting with the block (2) have been read.

With reference to FIG. 30 (b), the optical reading means reads blocks, starting with a block (2), and continuing with an adjacent up block (1) and adjacent right block (3) in that order. The optical reading means checks the concatenation information (first concatenation information="1", and the second concatenation information="1" and finds that the block (2) is concatenated to a block in the up direction and a block in the right direction. Then the optical reading means reads the block (1) in the up direction and the block (3) in the right direction. Then the optical reading means checks the concatenation information of the block (1) in the up direction and the block (3) in the right direction and finds that there are no more blocks concatenated. Then, the optical reading means judges that all the blocks in the block group have been read. Then the optical reading means reorders the dot patterns stored in memory on the basis of the third concatenation information, and converts them into numerical values or codes, and outputs the corresponding images, animations, voices, characters, programs and the like.

FIG. 31 (a) shows an example of reading a total of four blocks starting with a block (1). FIG. 31 (b) shows an example of reading a total of five blocks starting with a block (3). FIG. 32 (a) shows an example of reading a total of six blocks starting with a block (3). FIG. 32 (b) shows an example of reading a total of seven blocks starting with a block (4). FIG. 33 (a) shows an example of reading a total of eight blocks starting with a block (5). FIG. 33 (b) shows an example of reading a total of nine blocks starting with a block (5).

In the same way, FIG. 34 (a) shows an example of reading a block group in which ten blocks are concatenated. FIG. 34 (b) shows an example of reading a block group in which eleven blocks are concatenated. FIG. 35 shows an example of reading a block group in which twelve blocks are concatenated. FIG. 36 shows an example of reading a block group in which thirteen blocks are concatenated. FIG. 37 shows an example of reading a block group in which fourteen blocks are concatenated. FIG. 38 shows an example of reading a block group in which fifteen blocks are concatenated. FIG. 39 shows an example of reading a block group in which sixteen blocks are concatenated.

As described above, according to the block concatenation data search method shown in FIGS. 29 to 39, blocks may be disposed in any manner so long as concatenation in the up, down, left, or right direction is maintained. Even if the block placement area is limited in shape, a block group may be disposed, thus increasing the flexibility with block group placement.

EXAMPLES

FIGS. 41 to 43 explain a dot pattern for GRID1 (algorithm for defining information about dots described in FIGS. 1 to 6), in which blocks are concatenated by a direct scanning method.

According to this direct scanning method, when blocks continue from right to left in the figure, blocks are read sequentially.

In FIGS. 41 (a) and (b), information dots are shown in circles for convenience of description. Hereinafter, circled symbols such as "1|4" are shown in circled (1|4). FIGS (a) and (b) are assumed to be concatenated from left to right. The explanatory drawing shown in FIG. 41 corresponds to the dot pattern shown in FIG. 43. It is apparent that the vertical and horizontal lattice lines shown in FIG. 43 are not provided in an actual dot pattern.

In the figure, information dots (1|3) and (1|4) indicate the number of concatenated blocks, dots (1|1) and (1|2) indicate block concatenation numbers, and dots (1|5) to (1|16) indicate information dots containing information.

As shown in FIG. 42, an information dot (1|4) has a value of "001", and an information dot (1|3) has a value of "100". Thus, the two high order bits are concatenated into "0010", indicating a decimal "2". Accordingly, the number of concatenated blocks is "2", indicating that data consists of two blocks.

The block concatenation number is obtained by concatenating two high order bits of the dots (1|2) and (1|1). The result "0000" indicates that a block consisting of the dots (1|1) to (1|16) is the 0th block.

When the optical reading means reads the dots (1|1) to (1|16), the optical reading means checks the number of concatenated blocks and the block concatenation number and finds that the block is the first block of the two concatenated blocks. Then, the optical reading means continues to read the next block (2|1) to (2|16).

Figure 44:
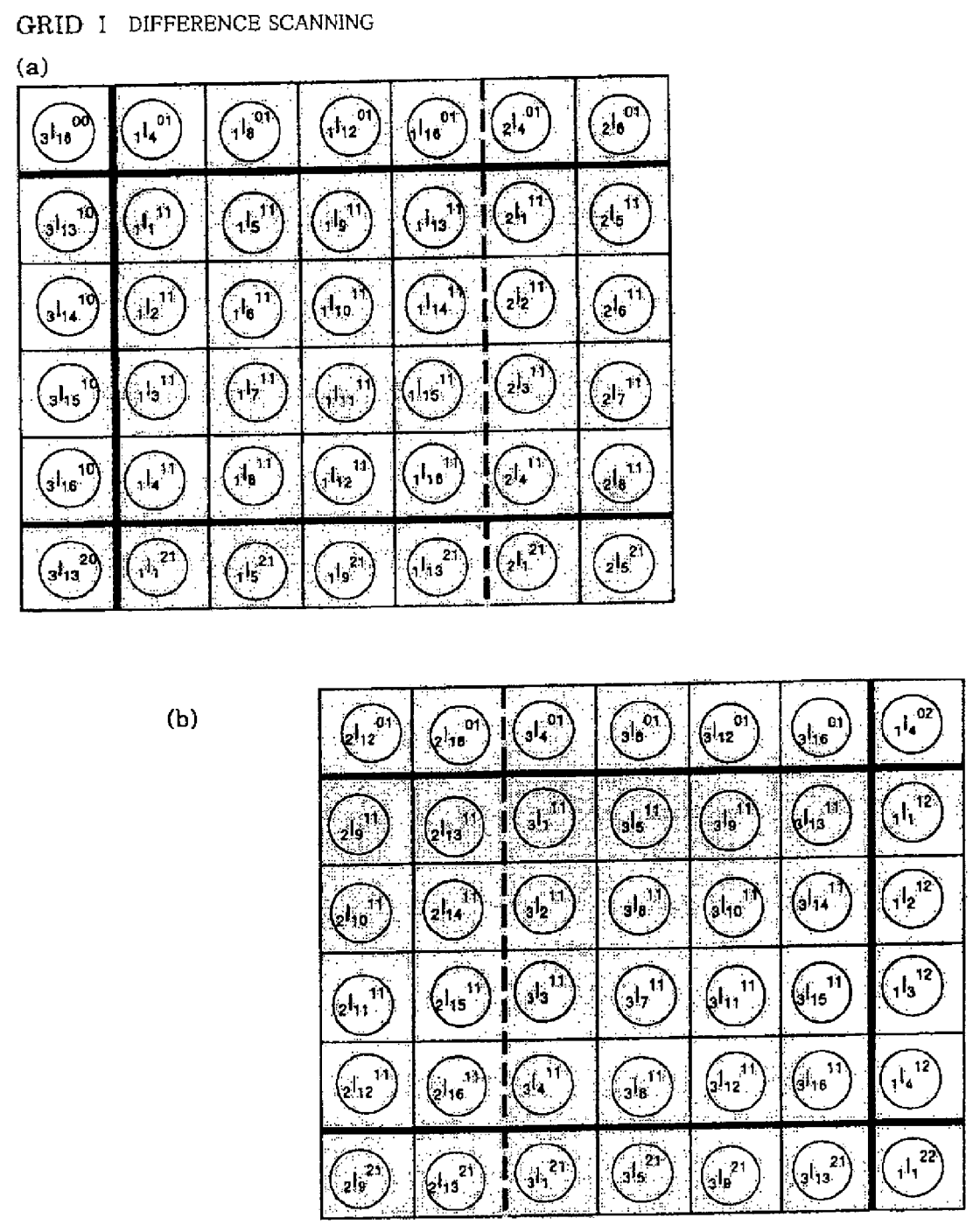

FIGS. 44 to 46 explain a dot pattern for GRID1 in which blocks are concatenated by a difference scanning method.

According to FIG. 44, a block consisting of dots (1|1$^{11}$) to (1|16$^{11}$) will be described. Information is defined by a difference between the corresponding dots of the adjacent blocks.

More specifically, as shown in FIG. 45, the number of concatenated blocks is defined as "2" by a difference between dots $(3|16^{10})$ and $(3|15^{10})$ of the left adjacent block and dots $(1|4^{11})$ and $(1|3^{11})$ of this block. In the same way, the block concatenation number is defined as "0" by a difference between dots $(3|14^{10})$ and $(1|2^{11})$ and dots $(3|13^{10})$ and $(1|1^{11})$.

As a result, a block consisting of dots $(1|1^{11})$ to $(1|16^{11})$ is the 0th block of data, i.e., the first block of the two blocks.

With reference to FIGS. 44 to 46, this block $(1|1^{11})$ to $(1|16^{11})$ is read, and then a right adjacent block $(2|1^{11})$ to $(2|16^{11})$ is read.

Figure 47:
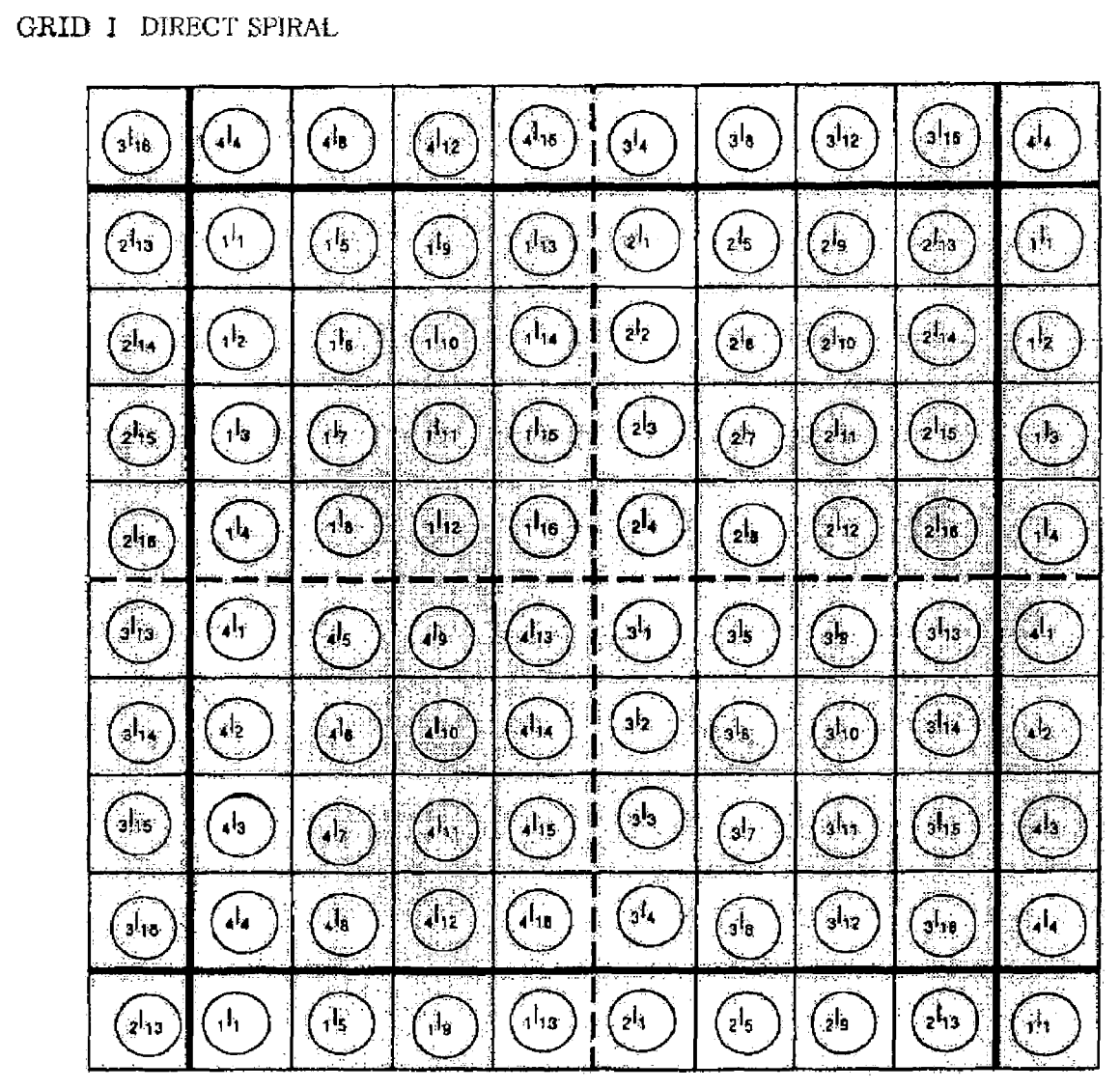

FIGS. 47 to 49 explain a dot pattern for GRID1, in which blocks are concatenated by a direct spiral method.

Here, FIG. 47 is an explanatory drawing of placement of each dot. FIG. 48 indicates the meaning of a dot corresponding to it. FIG. 49 shows an actual dot pattern.

With reference to FIG. 47, blocks are concatenated spirally, starting with an upper left block (1|1) to (1|16), an upper right block (2|1) to (2|16), a lower right block (3|1) to (3|16), and a lower left block (4|1) to (4|16) in that order.

With reference to the upper left block (1|1) to (1|16), the number of concatenated blocks is three by (1|3) and (1|4). The block concatenation number is 0 by (1|1) and (1|2). Information is stored in dots (1|5) to (1|16).

With reference to the number of concatenated blocks, the number of concatenated upper right blocks is one (i.e., second) by (2|1) and (2|2), the number of concatenated lower right blocks is two (i.e., third) by (3|1) and (3|2), and number of concatenated lower left blocks is three (i.e., fourth) by (4|1) and (4|2).

FIGS. 50 to 52 explain a dot pattern for GRID1, in which blocks are concatenated by a difference spiral method.

Here, FIG. 50 is an explanatory drawing of placement of each dot. FIG. 51 indicates the meaning of a dot corresponding to it. FIG. 52 shows an actual dot pattern.

The block layout starts with an upper left block and continues with an upper right block, a lower right block and a lower left block in that order which is the same as in FIG. 47.

As described in FIG. 45, the true value of a dot is obtained by a difference (see FIG. 51).

Figure 53:
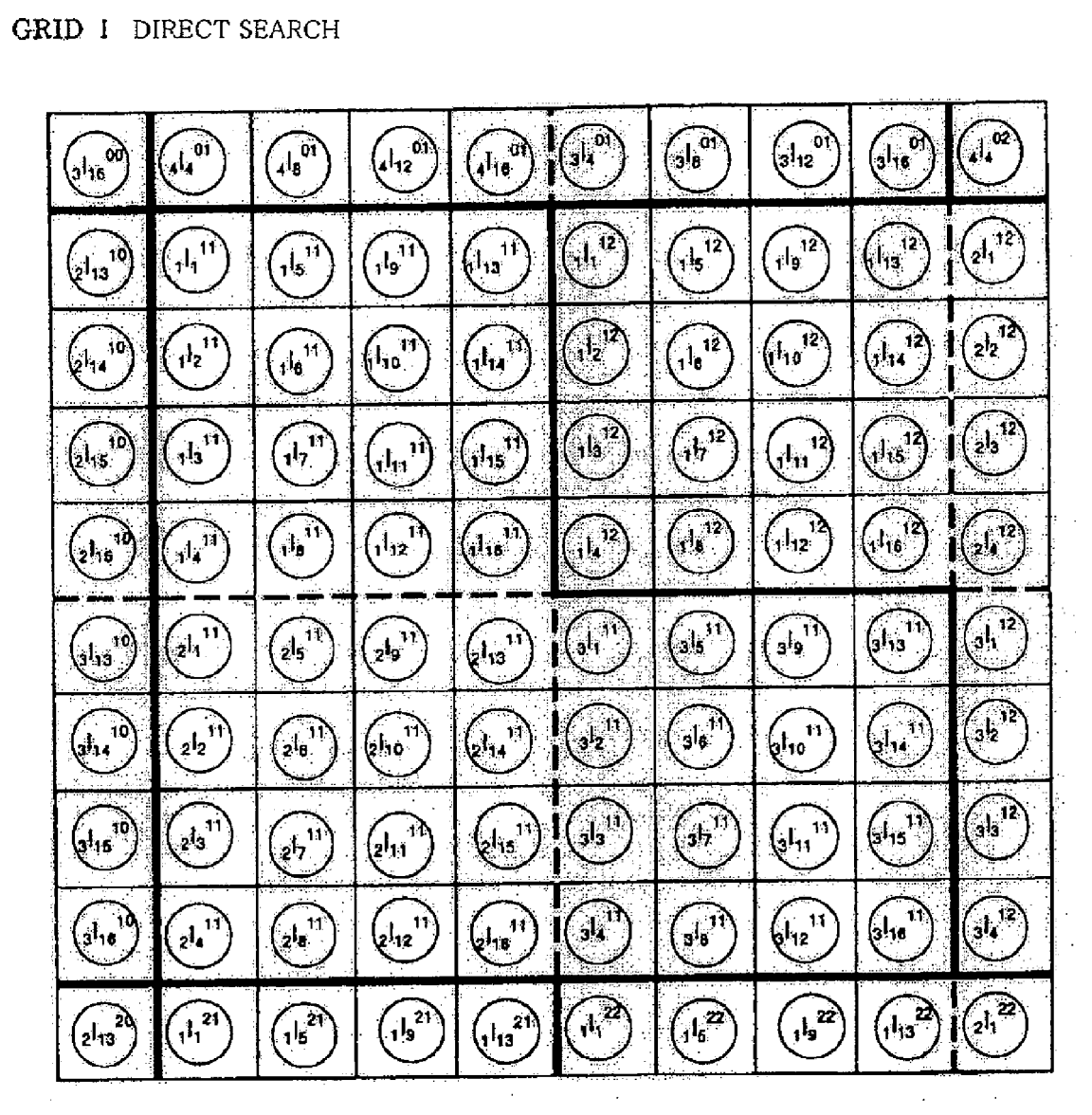

FIGS. 53 to 55 explain a dot pattern for GRID1, in which blocks are concatenated by a direct search method.

Here, FIG. 53 is an explanatory drawing of placement of each dot. FIG. 54 indicates the meaning of a dot corresponding to it. FIG. 55 shows an actual dot pattern.

According to a direct search method, a block contains a concatenation block number showing a block sequence and information about a next block to be concatenated. The relation between blocks is defined by the concatenation block number and the concatenation information.

With reference to a block $(1|1^{11})$ to $(1|16^{11})$, a concatenation block number is expressed by dots ranging from $(1|4^{11})$ to $(1|3^{11})$, and concatenation information is expressed by dots ranging from $(1|2^{11})$ to $(1|1^{11})$ (see FIG. 54).

The description of the concatenation block number is omitted since the concatenation block number is the same as the block concatenation number which has been described in FIG. 42.

Concatenation information indicates the direction of concatenating blocks: up, down, left, and right. For example, the value of a dot $(1|2^{11})$ indicates concatenation of left and right blocks, and the value of a dot $(1|1^{11})$ indicates concatenation of up and down blocks.

With reference to FIG. 54, a dot $(1|2^{11})$ has a value of "00", which indicates that there is no concatenation in the up or down direction. If the value is "10", the block is concatenated to a left block. If the value is "01", the block is concatenated to a right block. If the value is "11", the block is concatenated to both left and right blocks.

In addition, a dot $(1|1^{11})$ has a value of "10", which indicates that the block is concatenated to a down block. If the value is "00", the block is not concatenated to an up or down block. If the value is "01", the block is concatenated to an up block. If the value is "11", the block is concatenated to both up and down blocks.

As a result, an upper left block ranging from $(1|1^{11})$ to $(1|16^{11})$ is concatenated only to its down block (lower left block in the figure). The lower left block ranging from $(2|1^{11})$ to $(2|16^{11})$ is concatenated to both its upper block (upper left block in the figure) and a right block (lower right block in the figure).

In addition, the lower right block ranging from $(3|1^{11})$ to $(3|16^{11})$ is concatenated to only its left block (lower left block in the figure).

According to a concatenation block number for each block, the upper left block is the 0th (first) block, the lower left block is the 1st (second) block, the lower right block is the 2nd (third) block.

Figure 56:
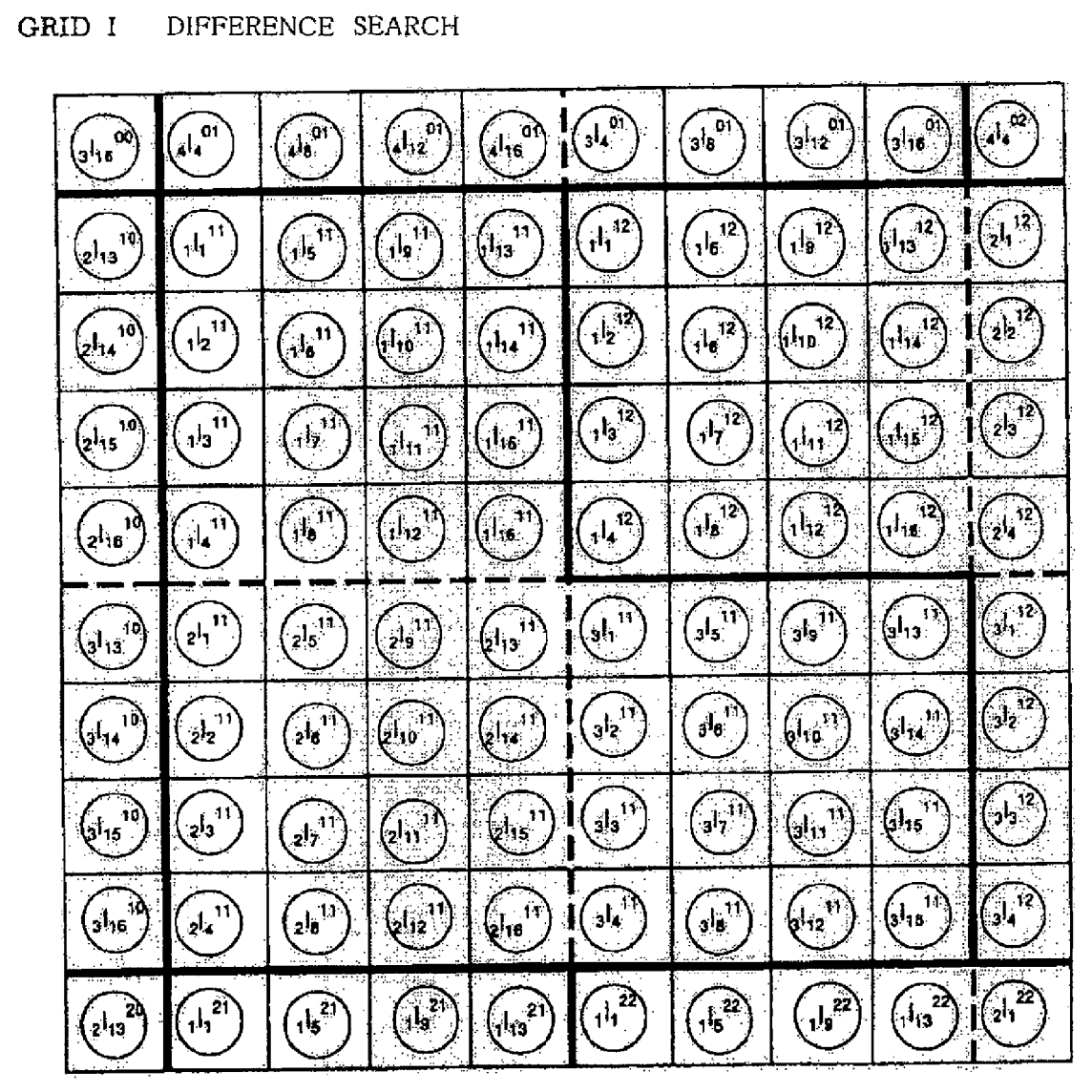

FIGS. 56 to 58 explain a dot pattern for GRID1, in which blocks are concatenated by a difference search method.

Here, FIG. 56 is an explanatory drawing of placement of each dot. FIG. 57 indicates the meaning of a dot corresponding to it. FIG. 58 shows an actual dot pattern.

In this example, a concatenation block number and concatenation information are defined by a difference method. FIG. 57 shows values of the concatenation block number and concatenation information.

FIGS. 59 to 61 explain a dot pattern for GRID2 (dot algorithm described in FIGS. 7 to 11), in which blocks are concatenated by a difference search method.

Here, FIG. 59 is an explanatory drawing of placement of each dot. FIG. 60 indicates the meaning of a dot corresponding to it. FIG. 61 shows an actual dot pattern.

FIGS. 59 (a) and (b) are concatenated, but are divided for convenience of description. It should be noted that the description of the direct scanning method is omitted since it has been described in FIGS. 41 to 43.

Figure 63:
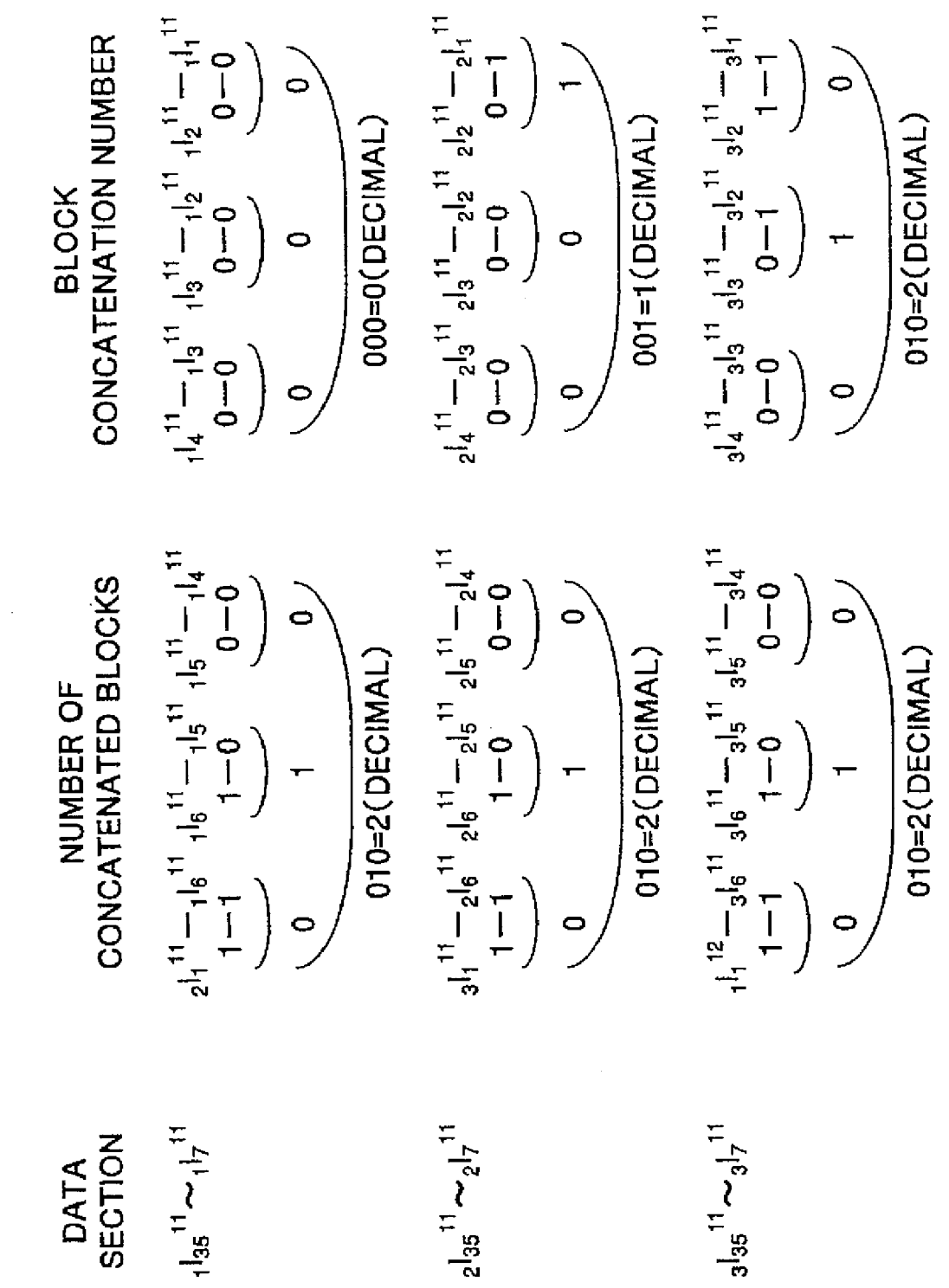

FIGS. 62 to 64 explain a dot pattern for GRID2 (dot algorithm described in FIGS. 7 to 11), in which blocks are concatenated by a difference scanning method.

Here, FIGS. 62 (a) and (b) are an explanatory drawing of placement of each dot. FIG. 63 indicates the meaning of a dot corresponding to it. FIG. 64 shows an actual dot pattern.

It should be noted that the description of the difference scanning method is omitted since it has been described in FIGS. 44 to 46.

Figure 65:
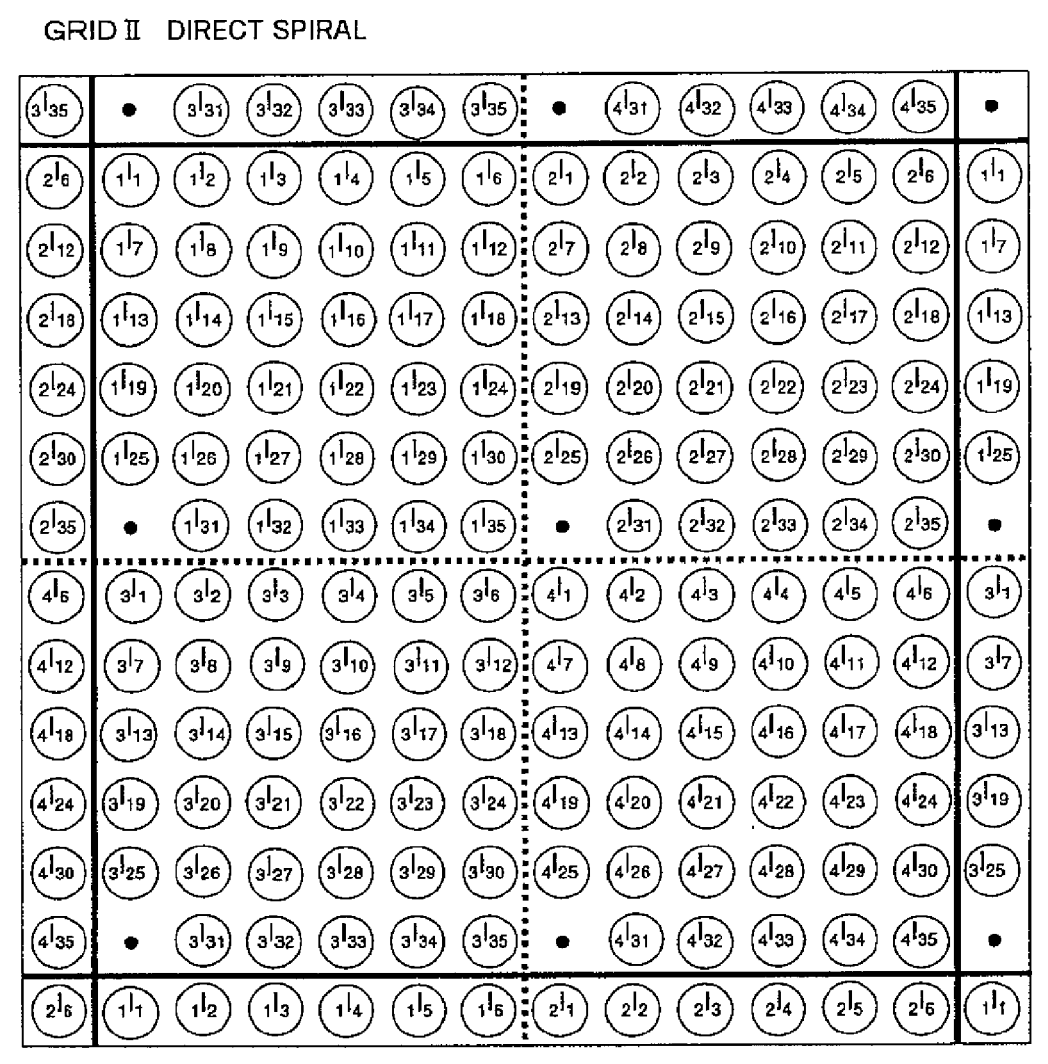

FIGS. 65 to 67 explain a dot pattern for GRID2 (dot algorithm described in FIGS. 7 to 11), in which blocks are concatenated by a direct spiral method.

Here, FIG. 65 is an explanatory drawing of placement of each dot. FIG. 66 indicates the meaning of a dot corresponding to it. FIG. 67 shows an actual dot pattern.

It should be noted that the description of the direct spiral method is omitted since it has been described in FIGS. 47 to 49.

FIGS. 68 to 70 explain a dot pattern for GRID2 (dot algorithm described in FIGS. 7 to 11), in which blocks are concatenated by a difference spiral method.

Here, FIG. 68 is an explanatory drawing of placement of each dot. FIG. 69 indicates the meaning of a dot corresponding to it. FIG. 70 shows an actual dot pattern.

It should be noted that the description of the difference spiral method is omitted since it has been described in FIGS. 50 to 52.

Figure 71:
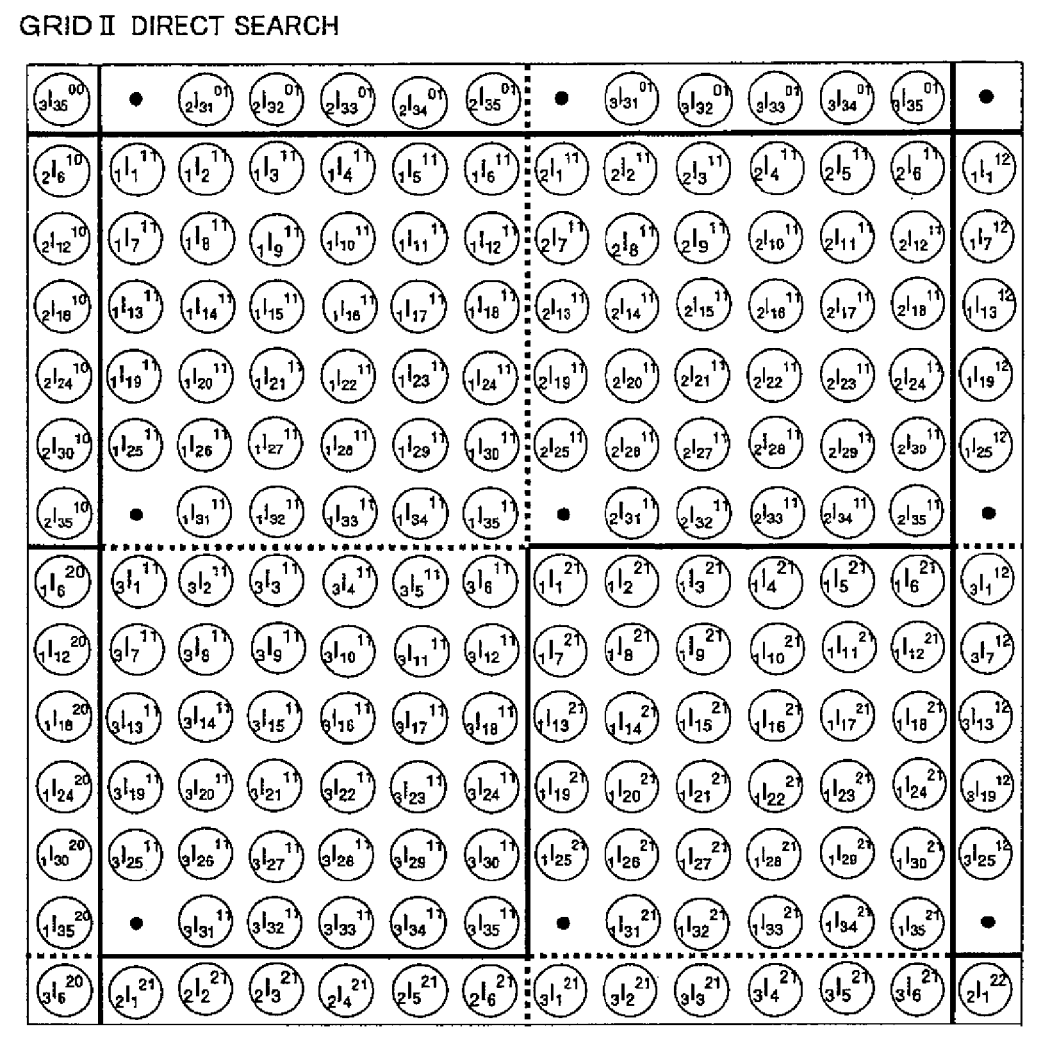

FIGS. 71 to 73 explain a dot pattern for GRID2 (dot algorithm described in FIGS. 7 to 11), in which blocks are concatenated by a direct search method.

Here, FIG. 71 is an explanatory drawing of placement of each dot. FIG. 72 indicates the meaning of a dot corresponding to it. FIG. 73 shows an actual dot pattern.

It should be noted that the description of the direct search method is omitted since it has been described in FIGS. 53 to 55.

Figure 75:
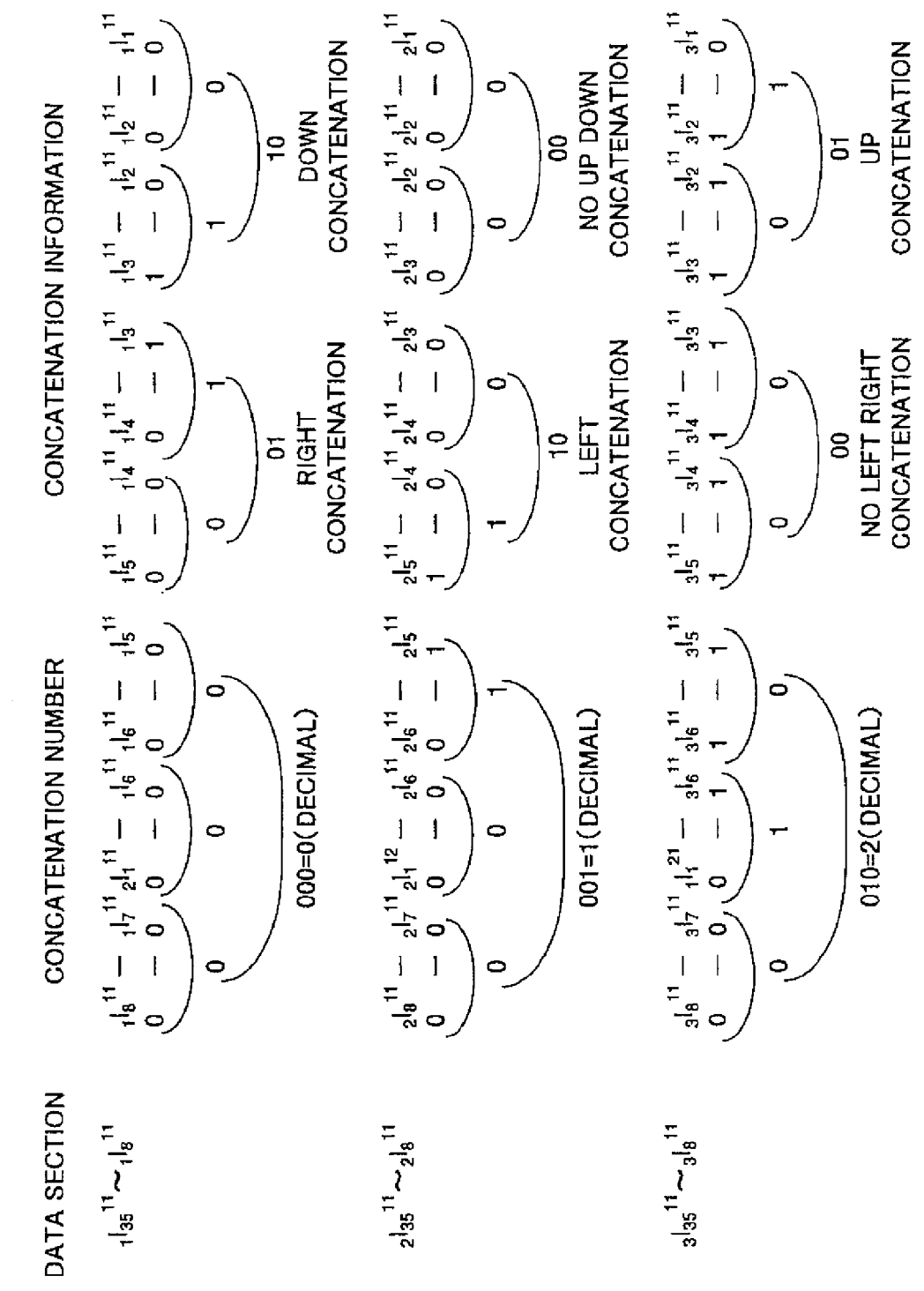

FIGS. 74 to 76 explain a dot pattern for GRID2 (dot algorithm described in FIGS. 7 to 11), in which blocks are concatenated by a difference search method.

Here, FIG. 74 is an explanatory drawing of placement of each dot. FIG. 75 indicates the meaning of a dot corresponding to it. FIG. 76 shows an actual dot pattern.

It should be noted that the description of the difference search method is omitted since it has been described in FIGS. 56 to 58.

FIGS. 77 to 79 explain a dot pattern for GRID3 (dot algorithm described in FIGS. 12 to 16), in which blocks are concatenated by a direct scanning method.

Here, FIGS. 77 (*a*) and (*b*) are explanatory drawings of placement of each dot. FIG. 78 indicates the meaning of a dot corresponding to it. FIG. 79 shows an actual dot pattern.

FIGS. 80 to 82 explain a dot pattern for GRID3 (dot algorithm described in FIGS. 12 to 16), in which blocks are concatenated by a difference search method.

Here, FIGS. 80 (*a*) and (*b*) are explanatory drawings of placement of each dot. FIG. 81 indicates the meaning of a dot corresponding to it. FIG. 82 shows an actual dot pattern.

FIGS. 83 to 85 explain a dot pattern for GRID3 (dot algorithm described in FIGS. 12 to 16), in which blocks are concatenated by a direct spiral method.

Here, FIG. 83 is an explanatory drawing of placement of each dot. FIG. 84 indicates the meaning of a dot corresponding to it. FIG. 85 shows an actual dot pattern.

FIGS. 86 to 88 explain a dot pattern for GRID3 (dot algorithm described in FIGS. 12 to 16), in which blocks are concatenated by a difference spiral method.

Here, FIG. 86 is an explanatory drawing of placement of each dot. FIG. 87 indicates the meaning of a dot corresponding to it. FIG. 88 shows an actual dot pattern.

FIGS. 89 to 93 explain a dot pattern for GRID3 (dot algorithm described in FIGS. 12 to 16), in which blocks are concatenated by a direct search method.

Here, FIG. 89 is an explanatory drawing of placement of each dot. FIG. 92 indicates the meaning of a dot corresponding to it. FIG. 93 shows an actual dot pattern.

FIG. 90 indicates the meaning of a dot position and a block concatenation direction. FIG. 91 is an explanatory drawing of placement of blocks.

FIGS. 94 to 98 explain a dot pattern for GRID3 (dot algorithm described in FIGS. 12 to 16), in which blocks are concatenated by a difference search method.

Here, FIG. 94 is an explanatory drawing of placement of each dot. FIG. 97 indicates the meaning of a dot corresponding to it. FIG. 98 shows an actual dot pattern.

FIG. 95 indicates the meaning of a dot position and a block concatenation direction. FIG. 96 is an explanatory drawing of placement of blocks.

FIGS. 99 to 101 explain a dot pattern for GRID4 (dot algorithm described in FIGS. 17 to 22), in which blocks are concatenated by a direct scanning method.

Here, FIG. 99 is an explanatory drawing of placement of each dot. FIG. 100 indicates the meaning of a dot corresponding to it. FIG. 101 shows an actual dot pattern.

FIGS. 102 to 104 explain a dot pattern for GRID4 (dot algorithm described in FIGS. 17 to 22), in which blocks are concatenated by a difference scanning method.

Here, FIG. 102 is an explanatory drawing of placement of each dot. FIG. 103 indicates the meaning of a dot corresponding to it. FIG. 104 shows an actual dot pattern.

FIGS. 105 to 107 explain a dot pattern for GRID4 (dot algorithm described in FIGS. 17 to 22), in which blocks are concatenated by a direct spiral method.

Here, FIG. 105 is an explanatory drawing of placement of each dot. FIG. 106 indicates the meaning of a dot corresponding to it. FIG. 107 shows an actual dot pattern.

Figure 109:
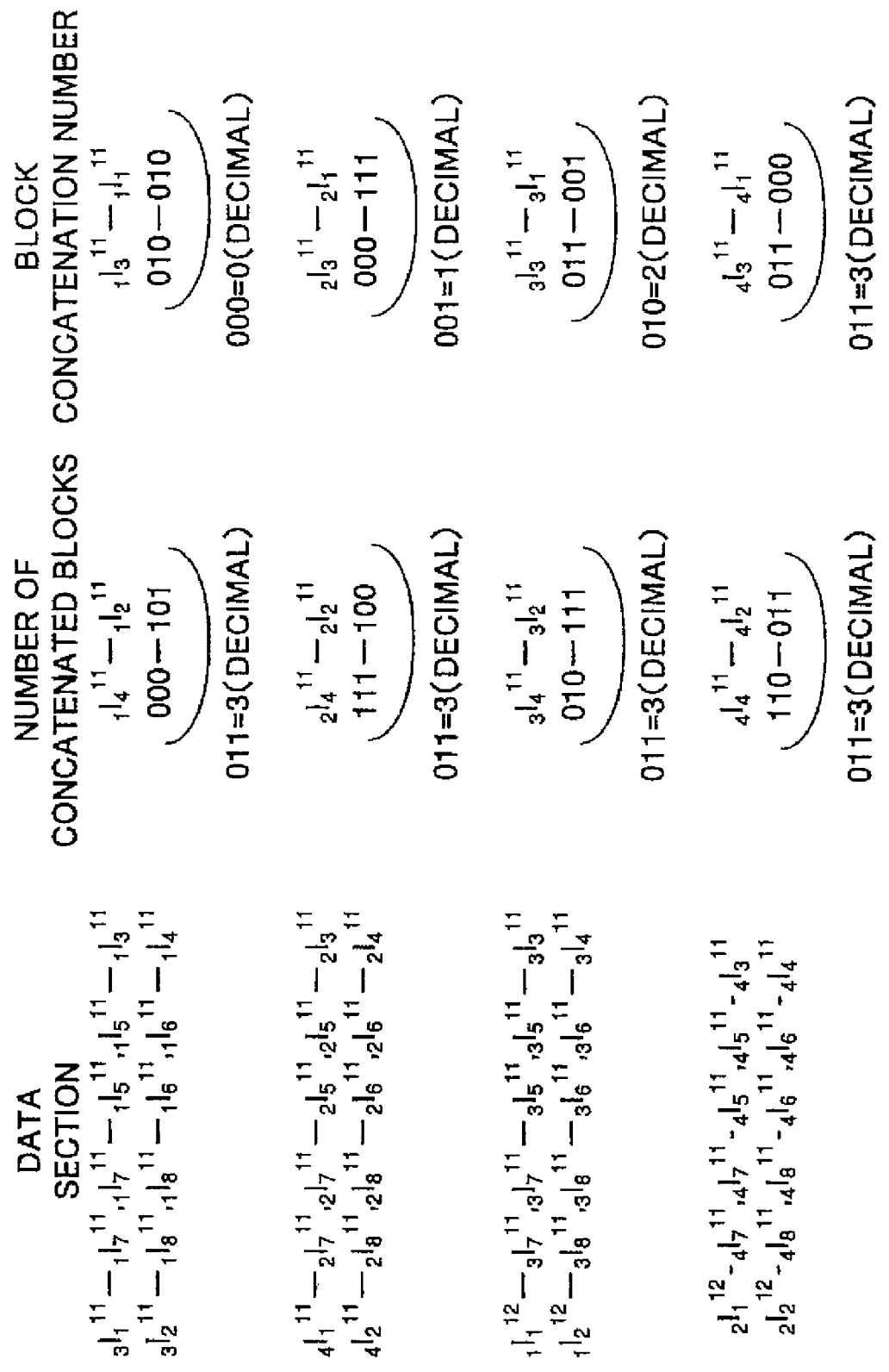

FIGS. 108 to 110 explain a dot pattern for GRID4 (dot algorithm described in FIGS. 17 to 22), in which blocks are concatenated by a difference spiral method.

Here, FIG. 108 is an explanatory drawing of placement of each dot. FIG. 109 indicates the meaning of a dot corresponding to it. FIG. 110 shows an actual dot pattern.

FIGS. 111 to 113 explain a dot pattern for GRID4 (dot algorithm described in FIGS. 17 to 22), in which blocks are concatenated by a direct search method.

Here, FIG. 111 is an explanatory drawing of placement of each dot. FIG. 112 indicates the meaning of a dot corresponding to it. FIG. 113 shows an actual dot pattern.

FIGS. 114 to 116 explain a dot pattern for GRID4 (dot algorithm described in FIGS. 17 to 22), in which blocks are concatenated by a difference search method.

Here, FIG. 114 is an explanatory drawing of placement of each dot. FIG. 115 indicates the meaning of a dot corresponding to it. FIG. 116 shows an actual dot pattern.

BRIEF DESCRIPTION OF THE DRAWINGS

FIG. 11 is a drawing for showing the content of a security table for GRID2.

FIG. 20 is a drawing (4) for describing GRID4.

FIG. 27 is a drawing (5) for describing an aspect of a block concatenation.

FIG. 28 is a drawing (6) for describing an aspect of a block concatenation.

FIG. 30 is a drawing (8) for describing an aspect of a block concatenation.

FIG. 31 is a drawing (9) for describing an aspect of a block concatenation.

FIG. 32 is a drawing (10) for describing an aspect of a block concatenation.

FIG. 33 is a drawing (11) for describing an aspect of a block concatenation.

FIG. 34 is a drawing (12) for describing an aspect of a block concatenation.

FIG. 41 is a drawing (1) for describing a block concatenation by a direct scanning method for GRID1.

FIG. 42 is a drawing (2) for describing a block concatenation by a direct scanning method for GRID1.

FIG. 44 is a drawing (1) for describing a block concatenation by a difference scanning method for GRID1.

FIG. 45 is a drawing (2) for describing a block concatenation by a difference scanning method for GRID1.

FIG. 47 is a drawing (1) for describing a block concatenation by a direct spiral method for GRID1.

FIG. 48 is a drawing (2) for describing a block concatenation by a direct spiral method for GRID1.

FIG. 51 is a drawing (2) for describing a block concatenation by a difference spiral method for GRID1.

FIG. 53 is a drawing (1) for describing a block concatenation by a direct search method for GRID1.

FIG. 54 is a drawing (2) for describing a block concatenation by a direct search method for GRID1.

FIG. 56 is a drawing (1) for describing a block concatenation by a difference search method for GRID1.

FIG. 57 is a drawing (2) for describing a block concatenation by a difference search method for GRID1.

FIG. 59 is a drawing (1) for describing a block concatenation by a direct scanning method for GRID2.

FIG. 60 is a drawing (2) for describing a block concatenation by a direct scanning method for GRID2.

FIG. 62 is a drawing (1) for describing a block concatenation by a difference scanning method for GRID2.

FIG. 63 is a drawing (3) for describing a block concatenation by a difference scanning method for GRID2.

FIG. 65 is a drawing (1) for describing a block concatenation by a direct spiral method for GRID2.

FIG. 66 is a drawing (2) for describing a block concatenation by a direct spiral method for GRID2.

FIG. 69 is a drawing (2) for describing a block concatenation by a difference spiral method for GRID2.

FIG. 71 is a drawing (1) for describing a block concatenation by a direct search method for GRID2.

FIG. 72 is a drawing (2) for describing a block concatenation by a direct search method for GRID2.

FIG. 75 is a drawing (2) for describing a block concatenation by a difference search method for GRID2.

FIG. 77 is a drawing (1) for describing a block concatenation by a direct scanning method for GRID3.

FIG. 80 is a drawing (1) for describing a block concatenation by a difference scanning method for GRID3.

FIG. 84 is a drawing (2) for describing a block concatenation by a direct spiral method for GRID3.

FIG. 92 is a drawing (4) for describing a block concatenation by a direct search method for GRID3.

FIG. 106 is a drawing (2) for describing a block concatenation by a direct spiral method for GRID4.

FIG. 109 is a drawing (2) for describing a block concatenation by a difference spiral method for GRID4.

FIG. 112 is a drawing (2) for describing a block concatenation by a direct search method for GRID4.

Industrial Applicability

Figure 1:
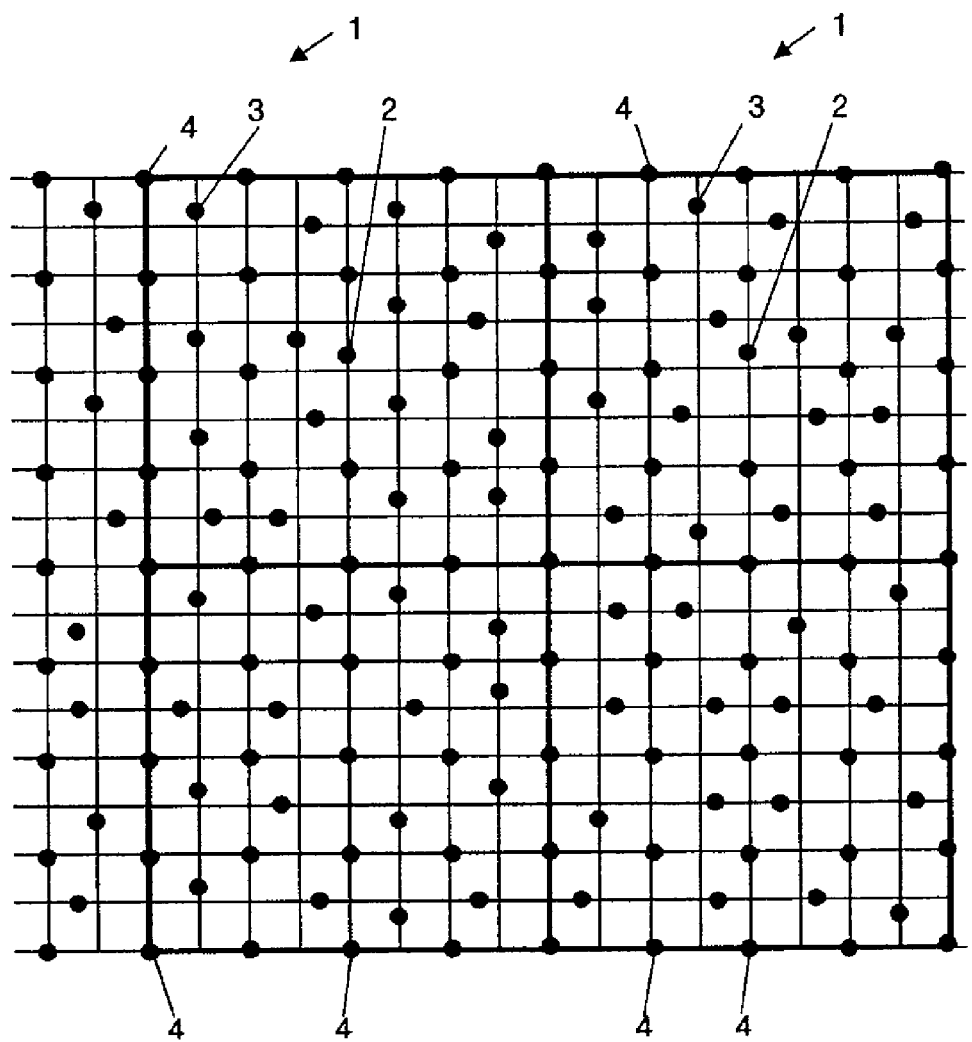
FIG. 1 is a drawing for showing a dot pattern for GRID1 in accordance with an embodiment of the present invention.
Figure 2:
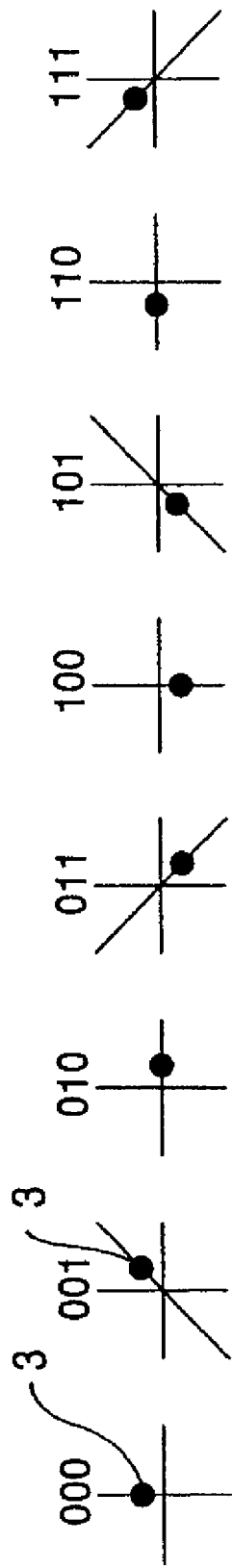
FIG. 2 is a drawing (1) for showing how to define information for GRID1.
Figure 3:
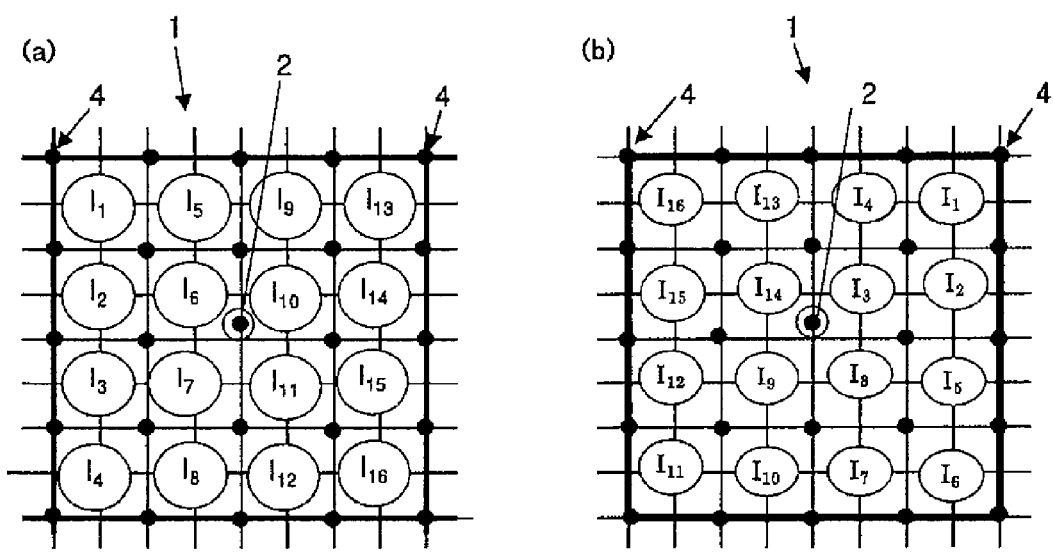
FIG. 3 is a drawing (1) for showing a block reading sequence for GRID1.
Figure 4:
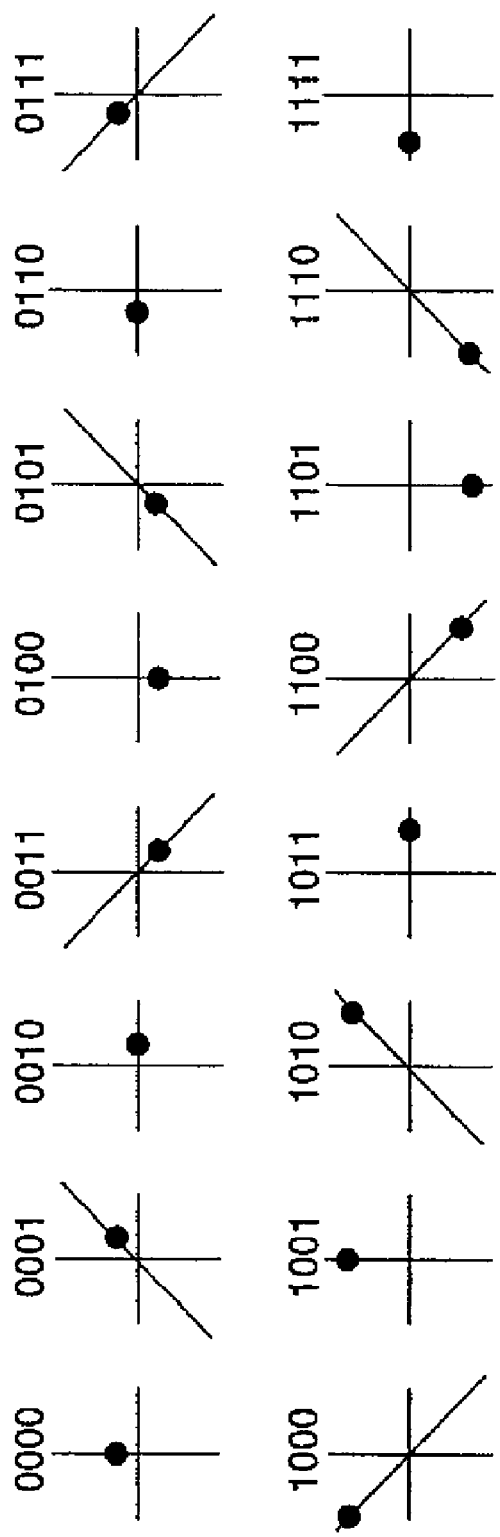
FIG. 4 is a drawing (2) for showing how to define information for GRID1.
Figure 5:
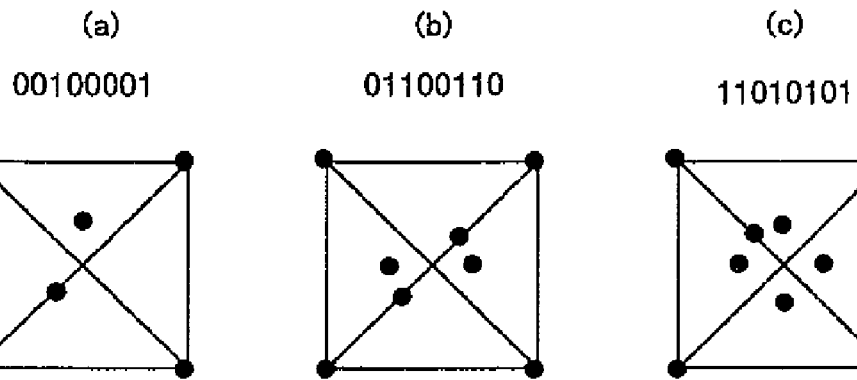
FIG. 5 is a drawing (3) for showing how to define information for GRID1.
Figure 6:
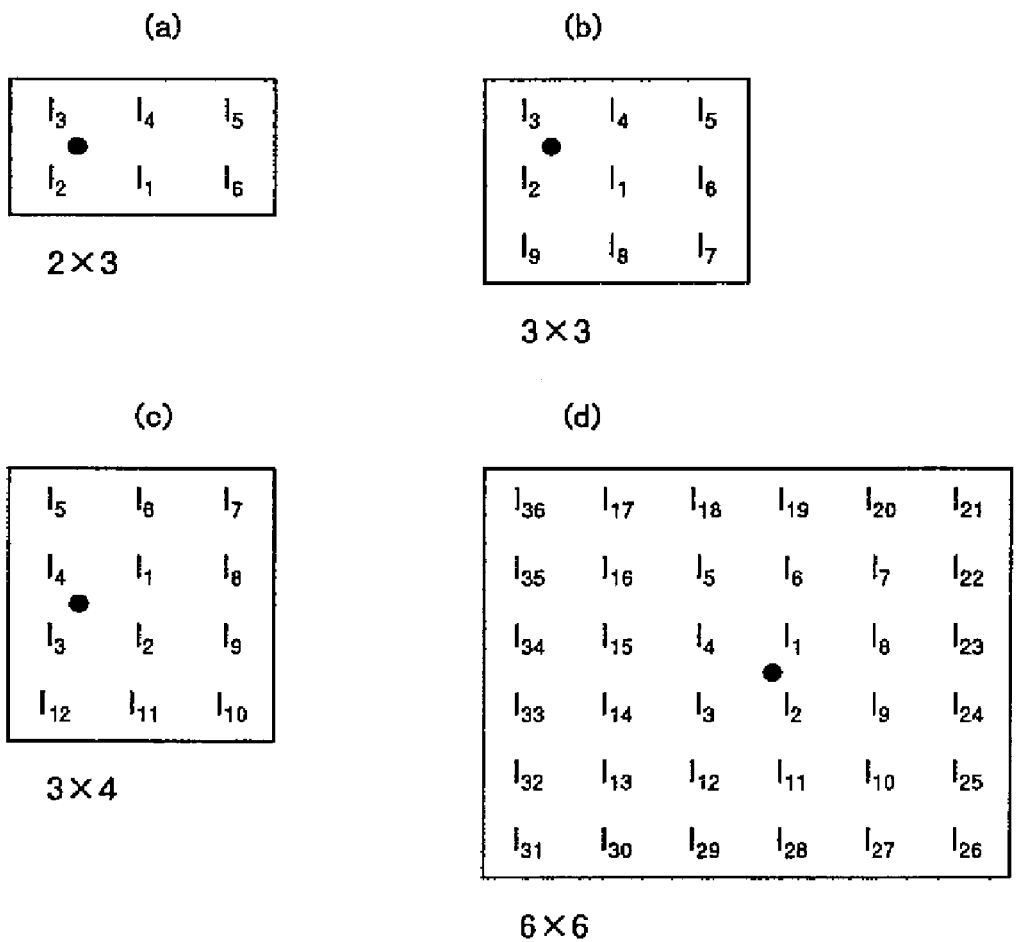
FIG. 6 is a drawing (2) for showing a block reading sequence for GRID1.
Figure 7:
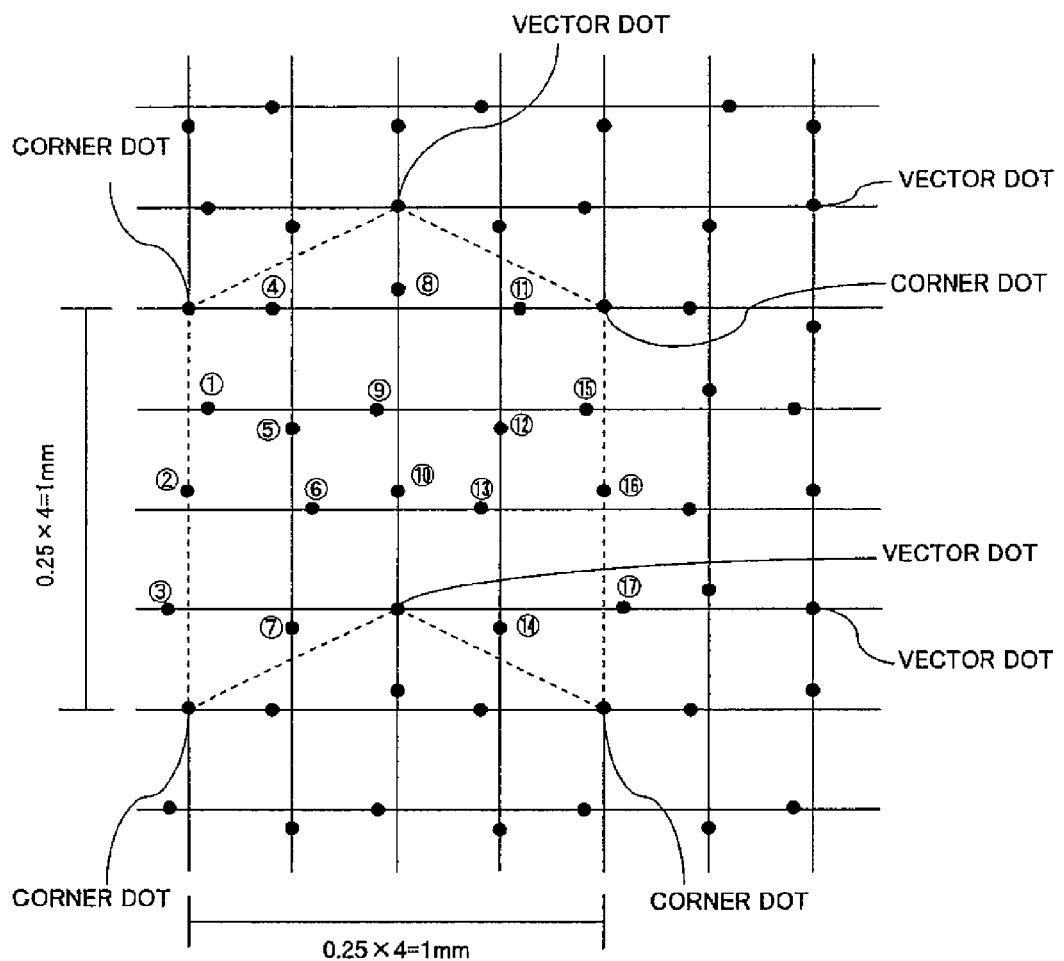
FIG. 7 is a drawing for showing a dot pattern for GRID2.
Figure 8:
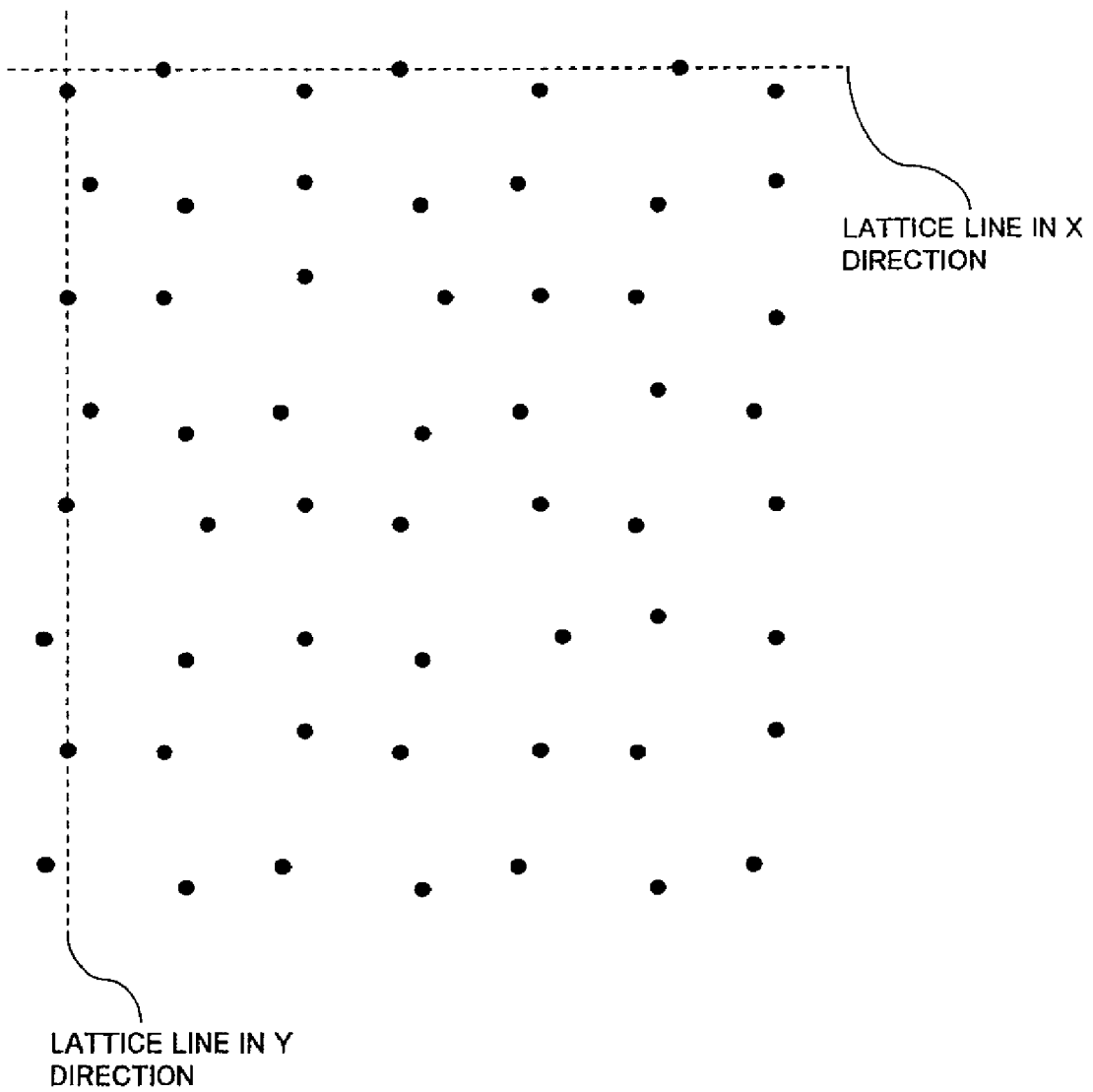
FIG. 8 is a drawing (1) for showing how to define information of a dot pattern for GRID2.
Figure 9:
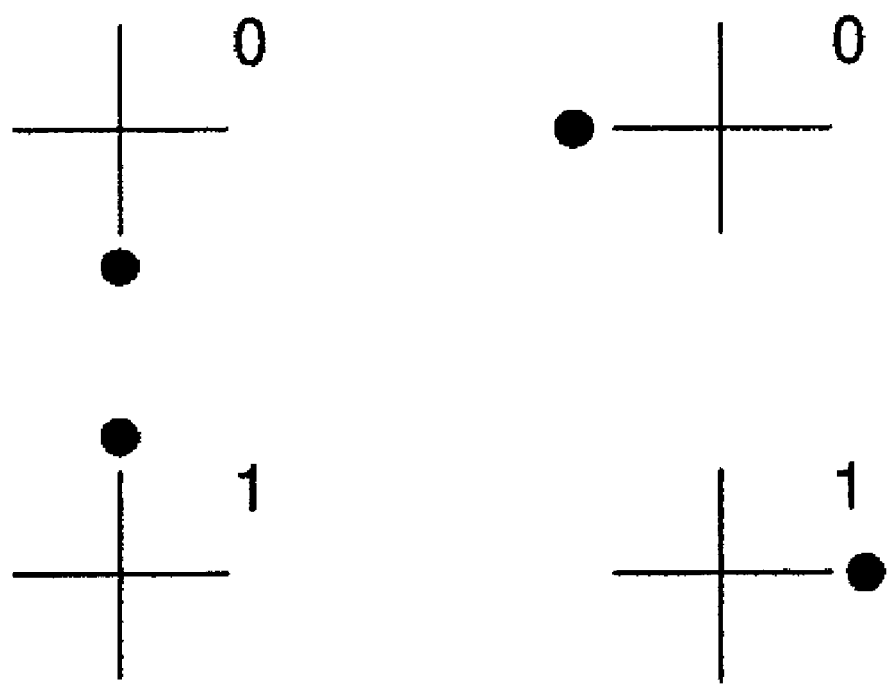
FIG. 9 is a drawing (2) for showing how to define information of a dot pattern for GRID2.
Figure 10:
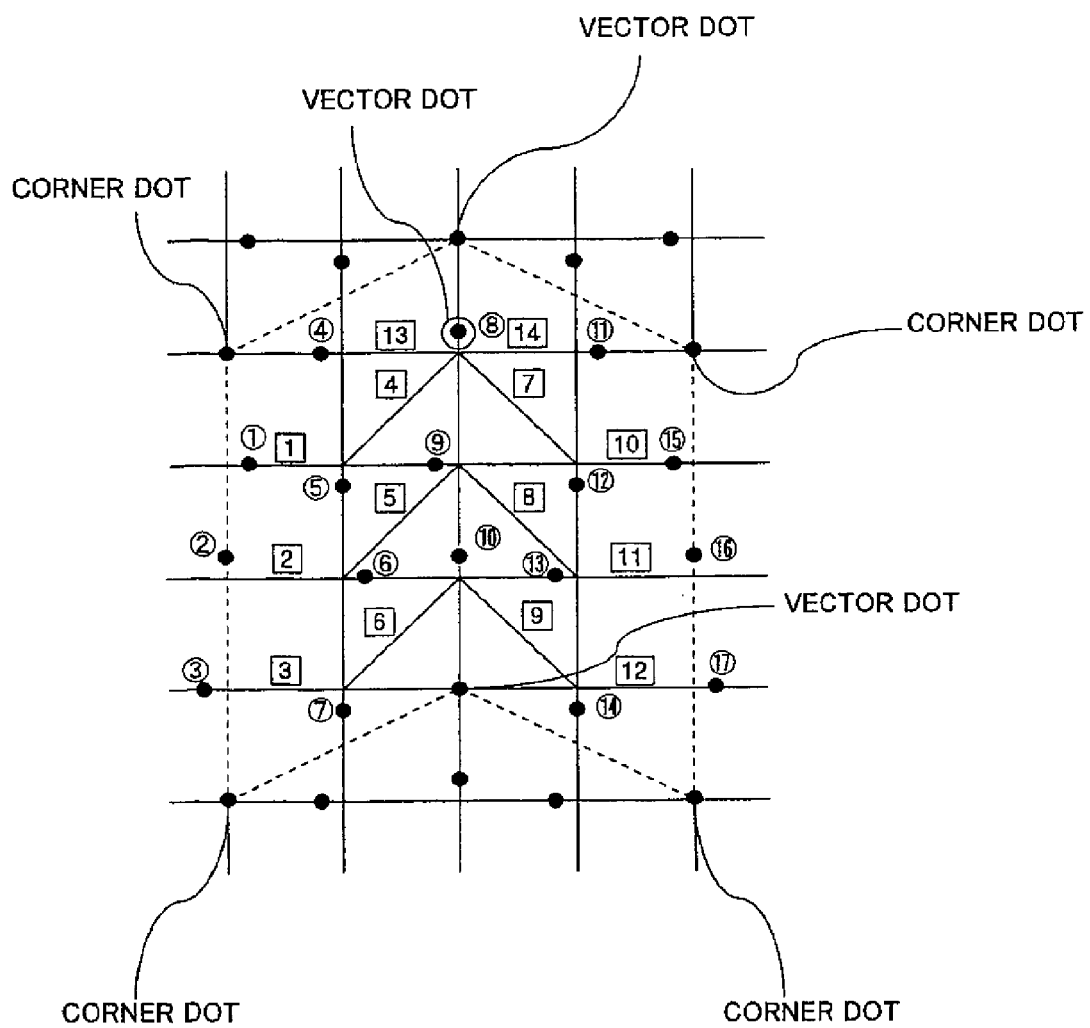
FIG. 10 is a drawing (3) for showing how to define information of a dot pattern for GRID2.
Figure 12:
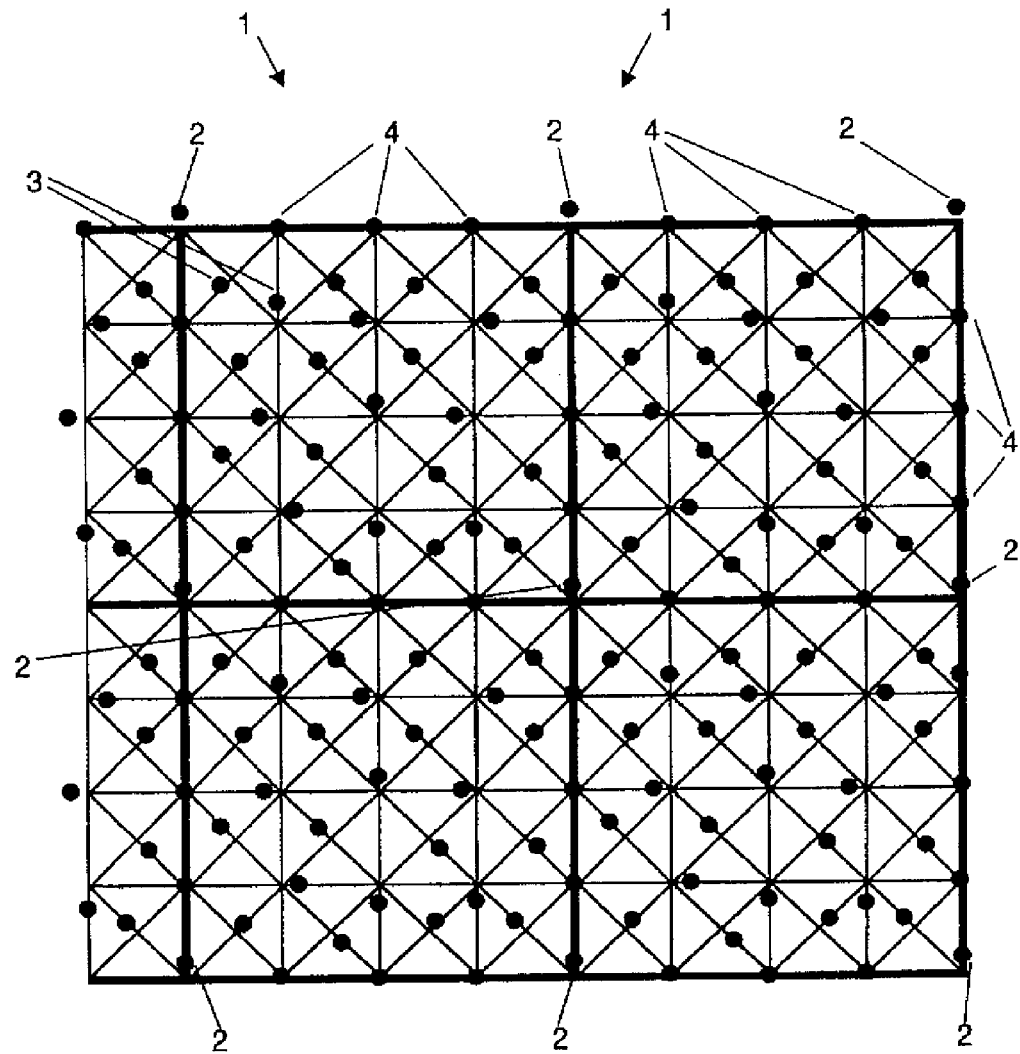
FIG. 12 is a drawing (1) for describing GRID3.
Figure 13:
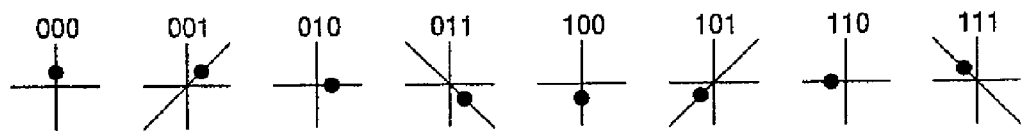
FIG. 13 is a drawing (2) for describing GRID3.
Figure 14:
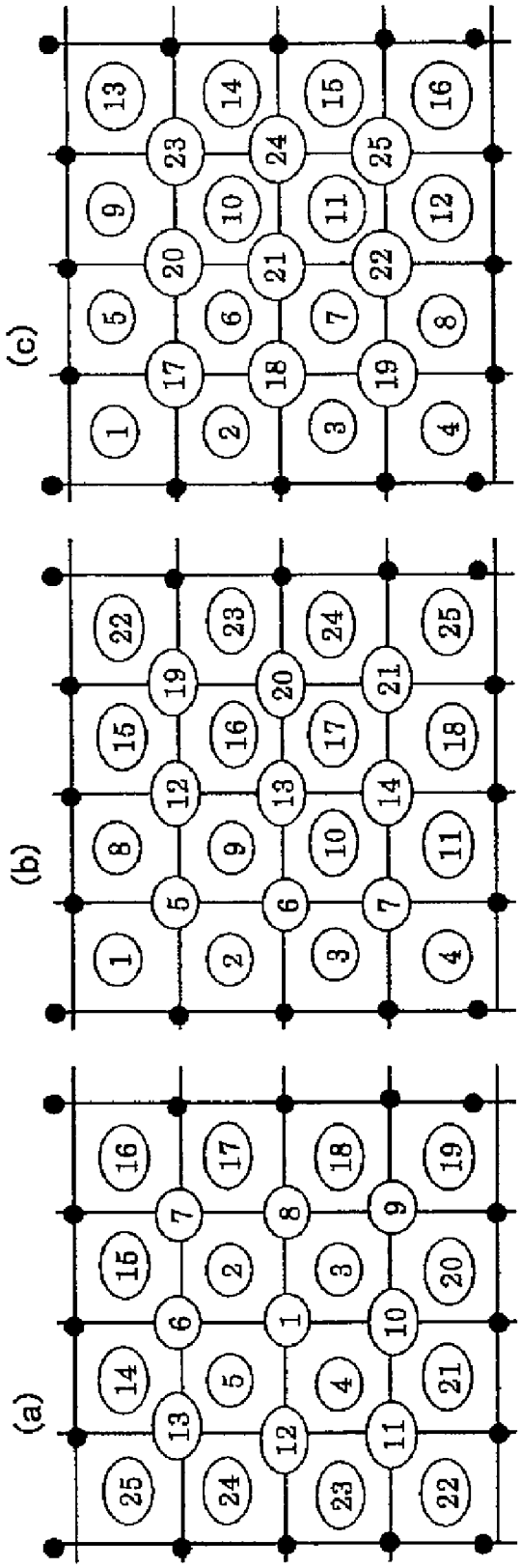
FIG. 14 is a drawing (3) for describing GRID3.
Figure 15:
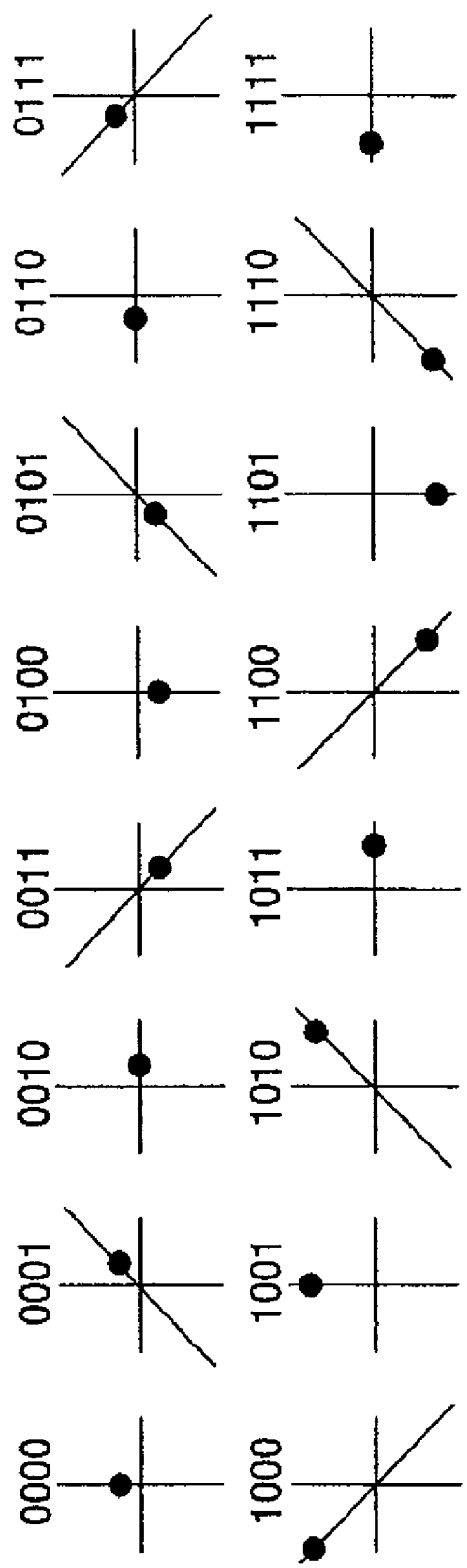
FIG. 15 is a drawing (4) for describing GRID3.
Figure 16:
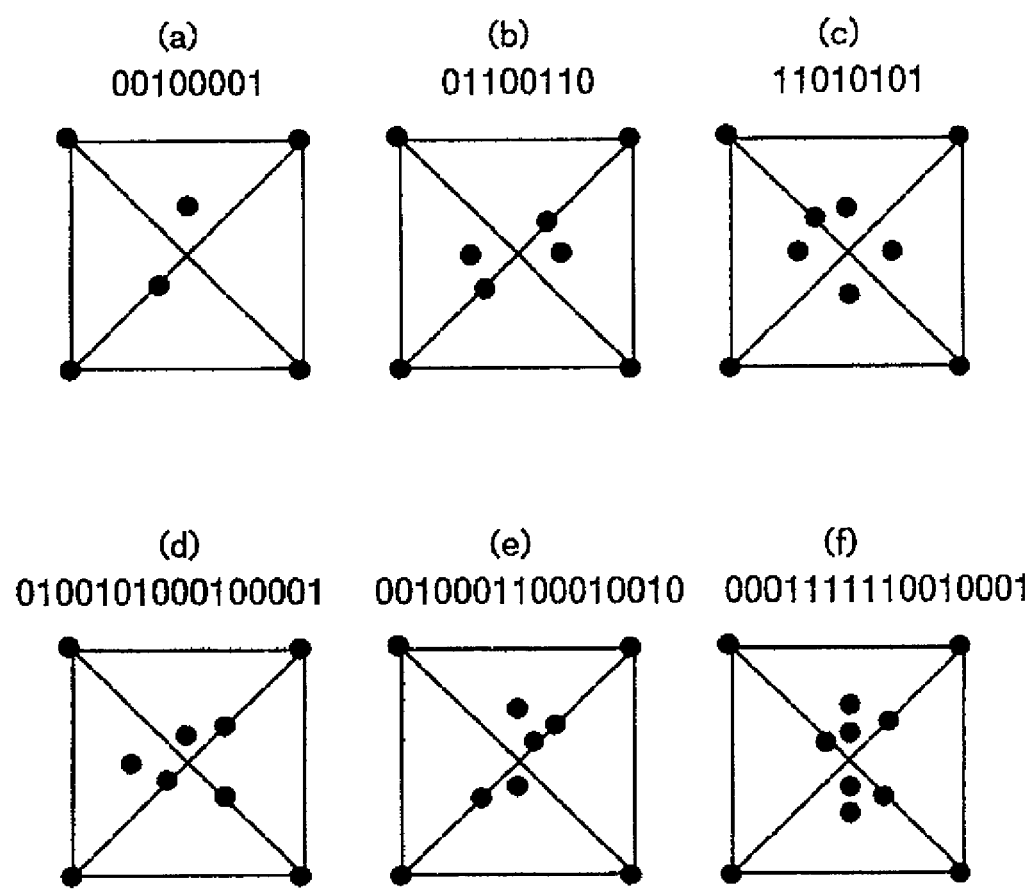
FIG. 16 is a drawing (5) for describing GRID3.
Figure 17:
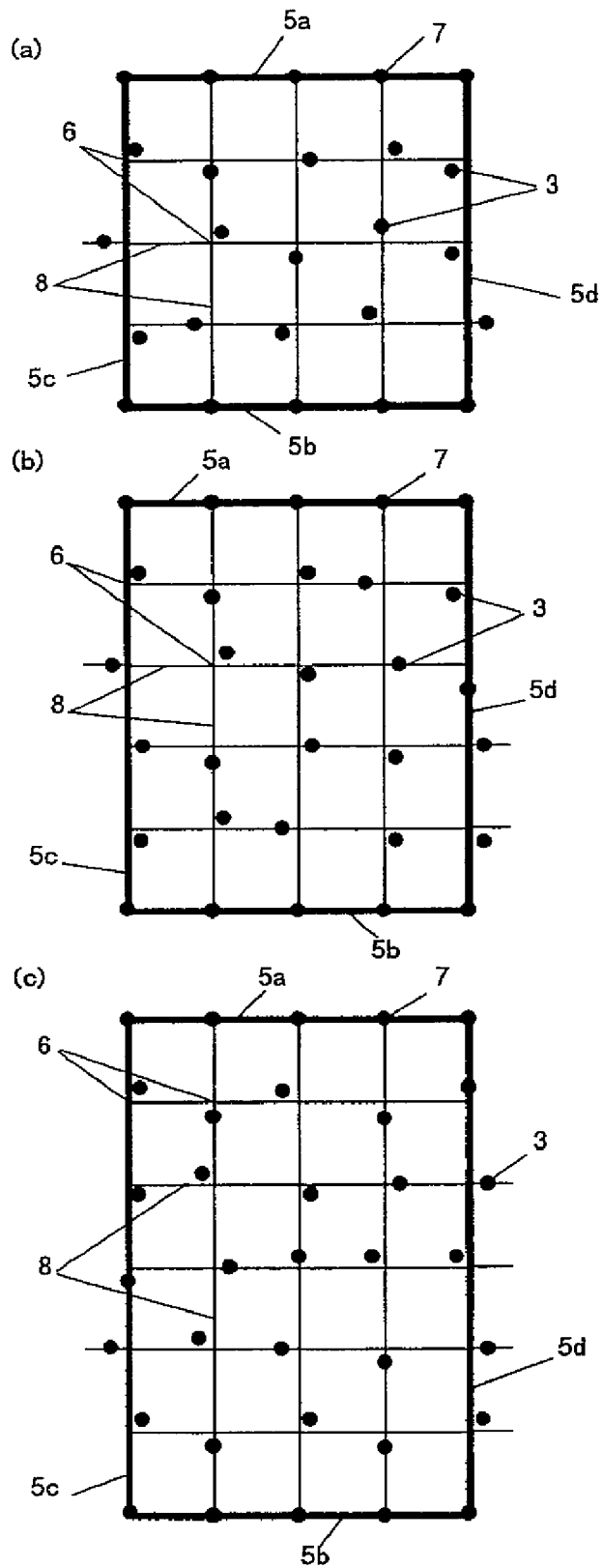
FIG. 17 is a drawing (1) for describing GRID4.
Figure 18:
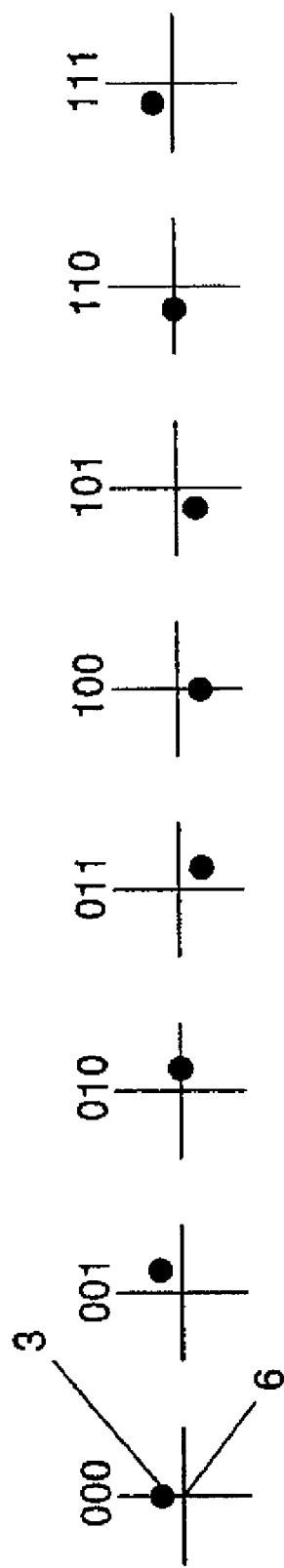
FIG. 18 is a drawing (2) for describing GRID4.
Figure 19:
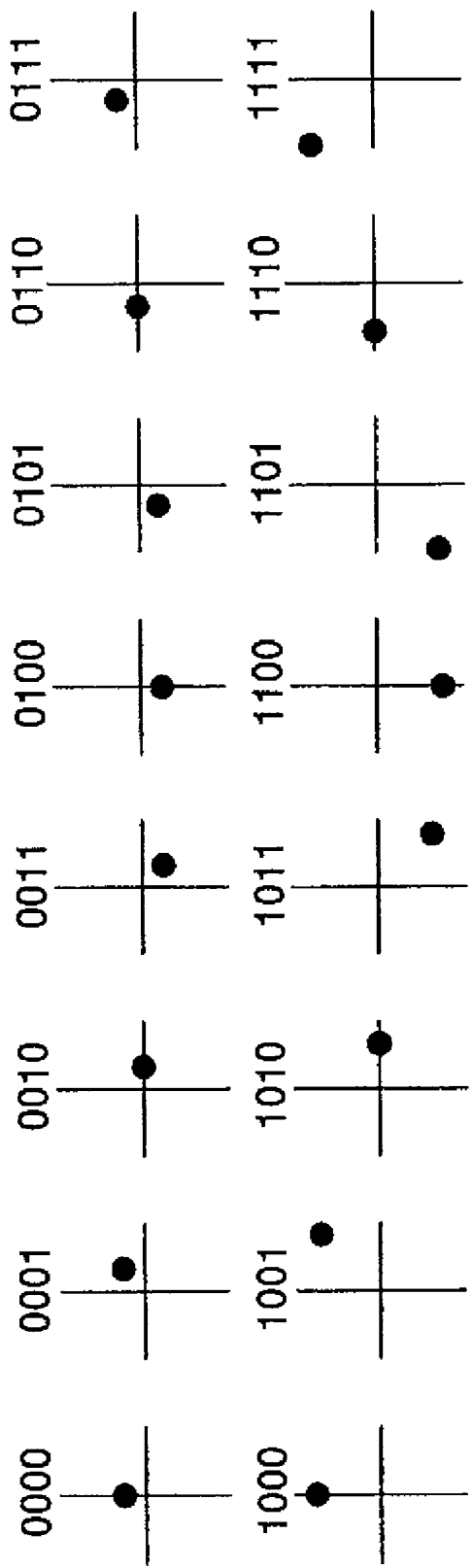
FIG. 19 is a drawing (3) for describing GRID4.
Figure 21:
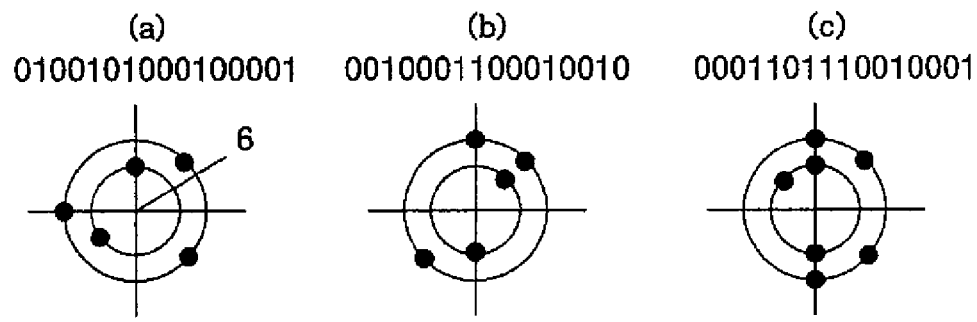
FIG. 21 is a drawing (5) for describing GRID4.
Figure 22:
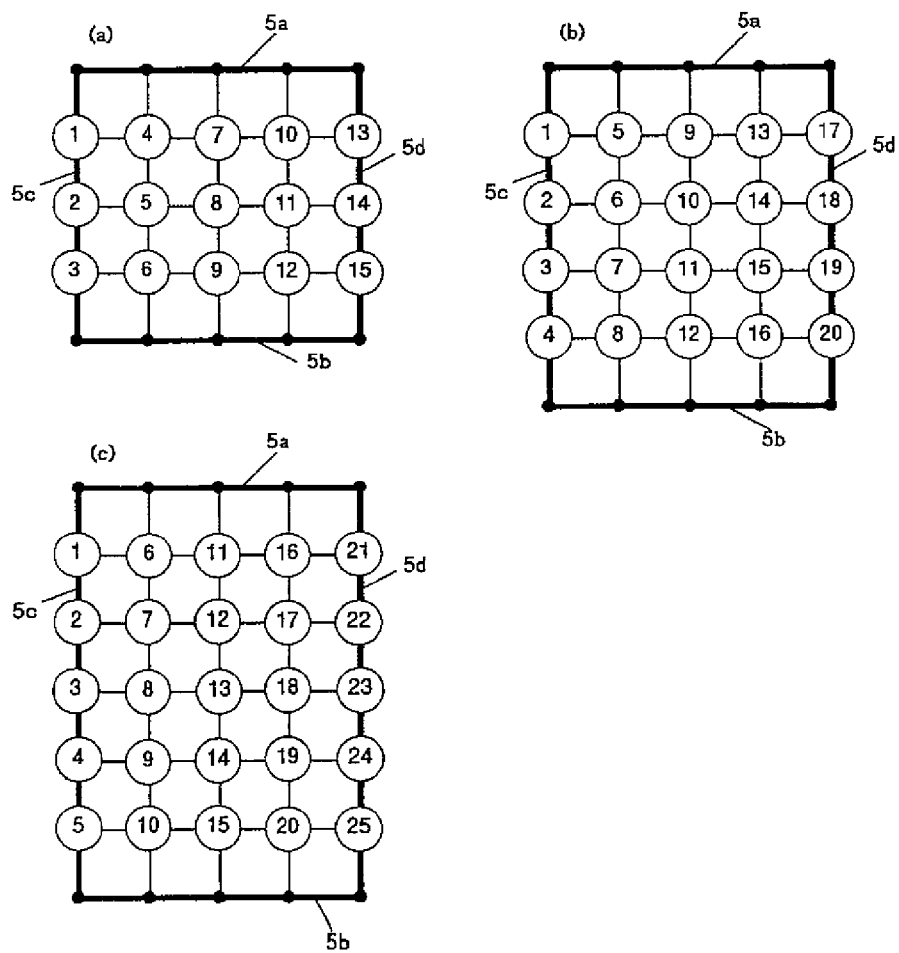
FIG. 22 is a drawing (6) for describing GRID4.
Figure 23:
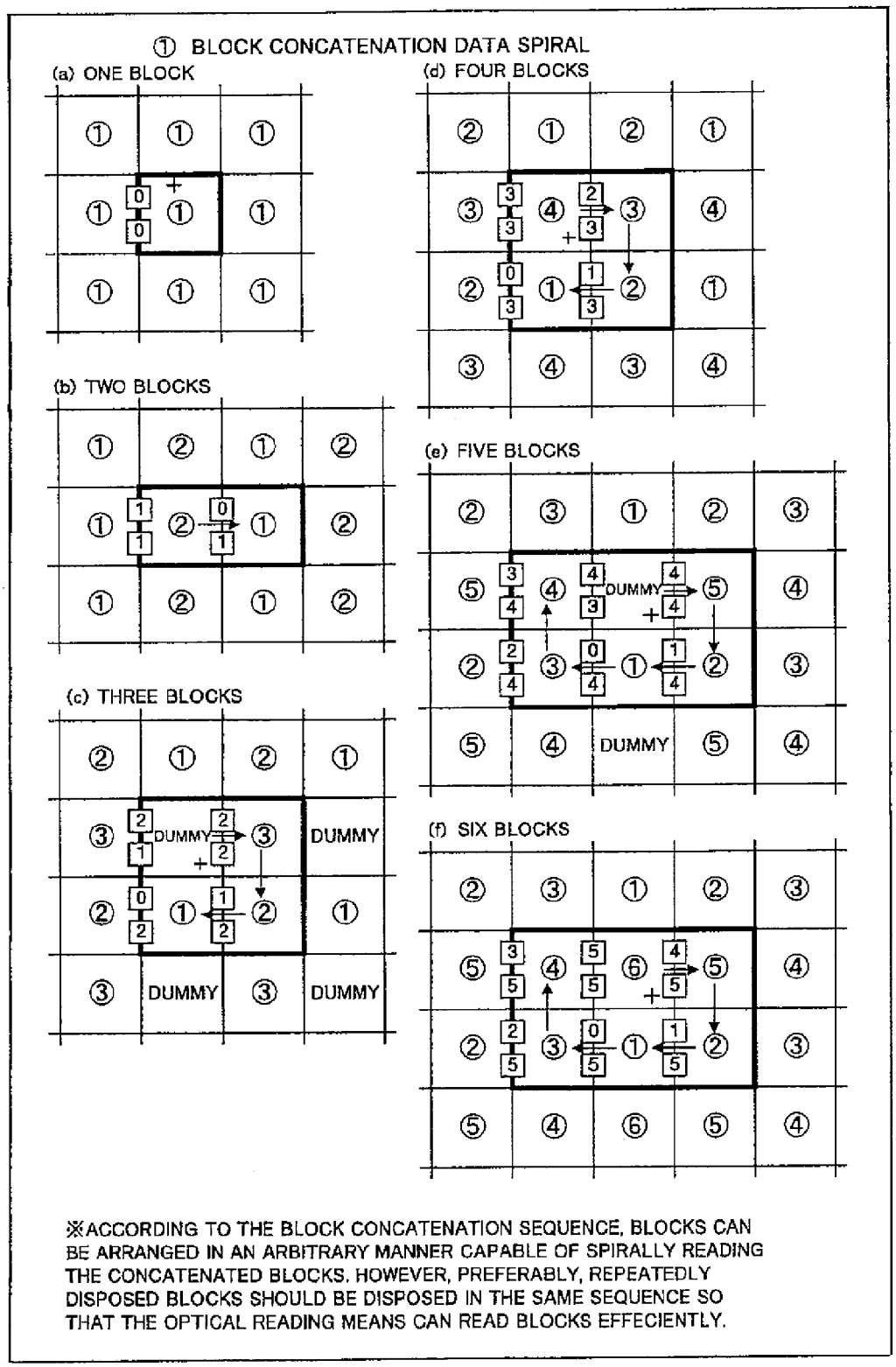
FIG. 23 is a drawing (1) for describing an aspect of a block concatenation.
Figure 24:
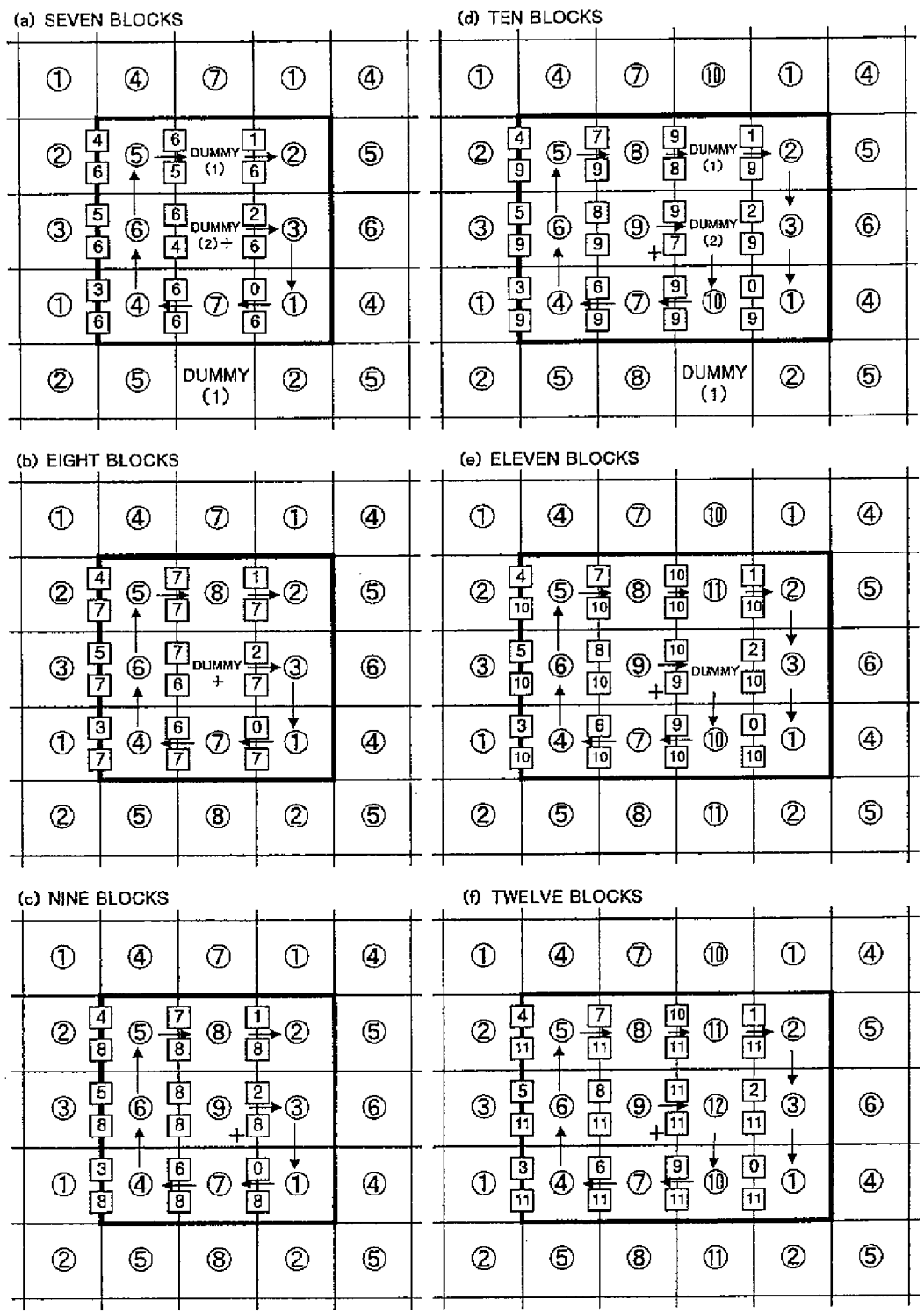
FIG. 24 is a drawing (2) for describing an aspect of a block concatenation.
Figure 25:
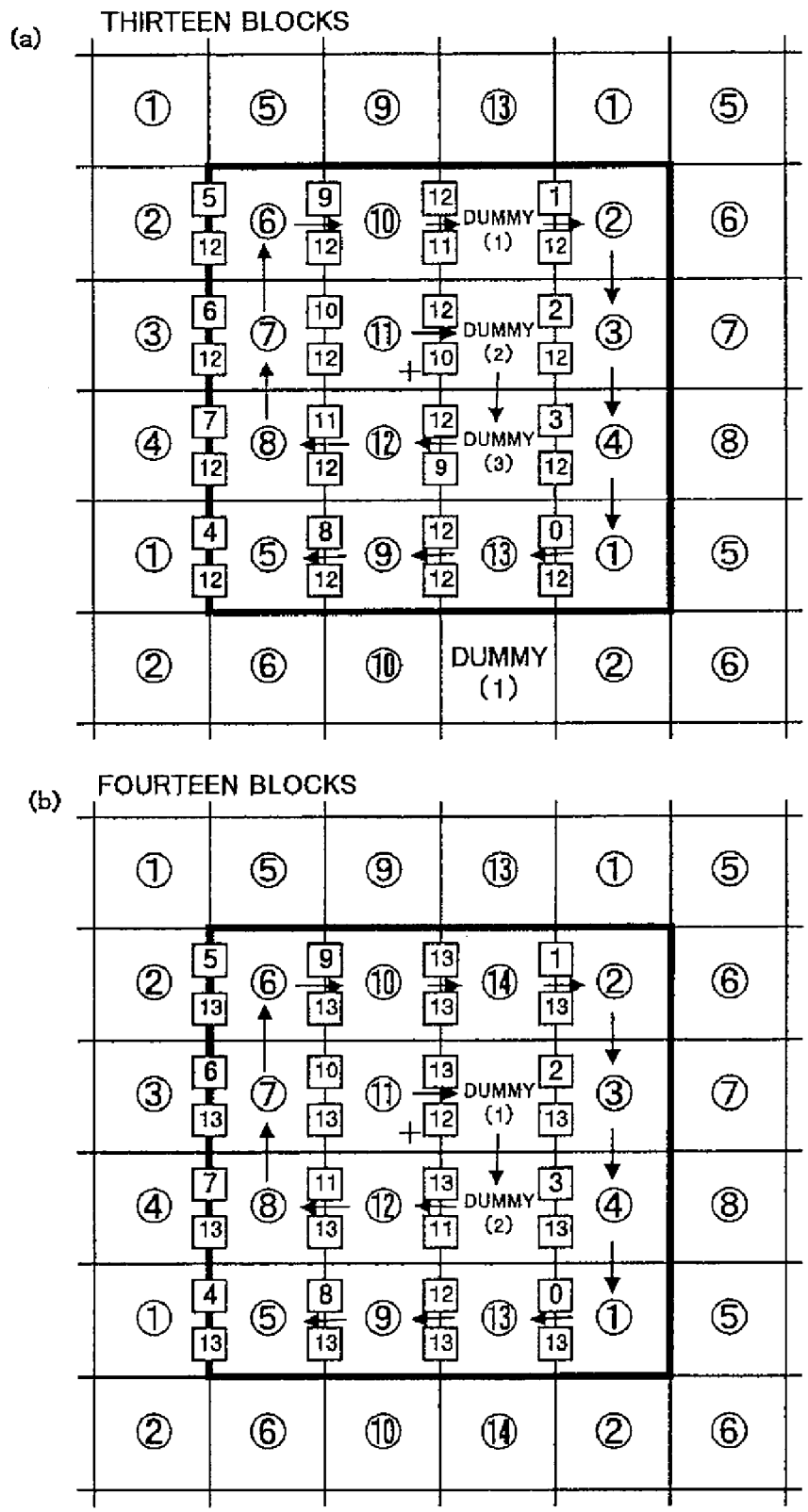
FIG. 25 is a drawing (3) for describing an aspect of a block concatenation.
Figure 26:
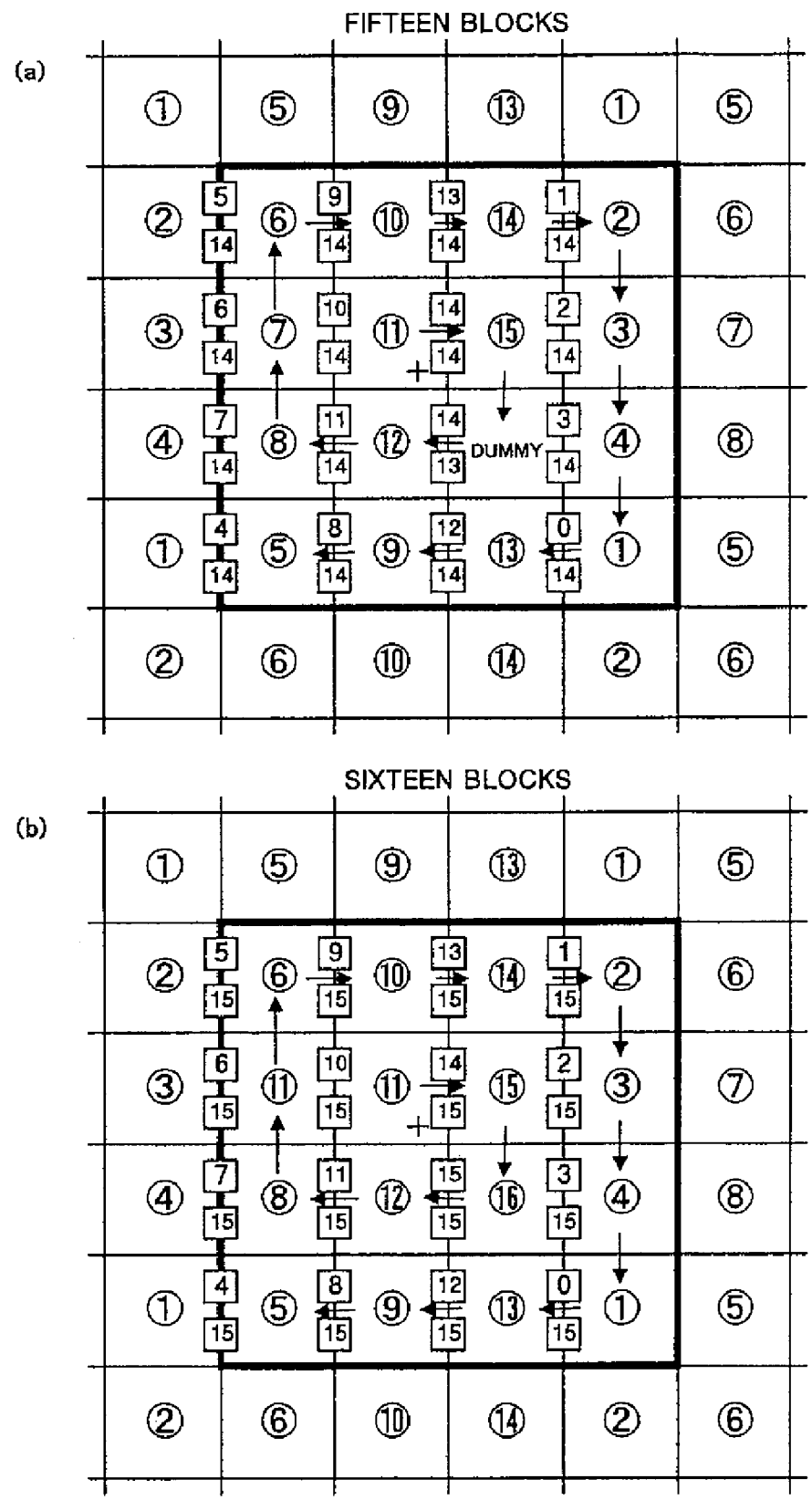
FIG. 26 is a drawing (4) for describing an aspect of a block concatenation.
Figure 29:
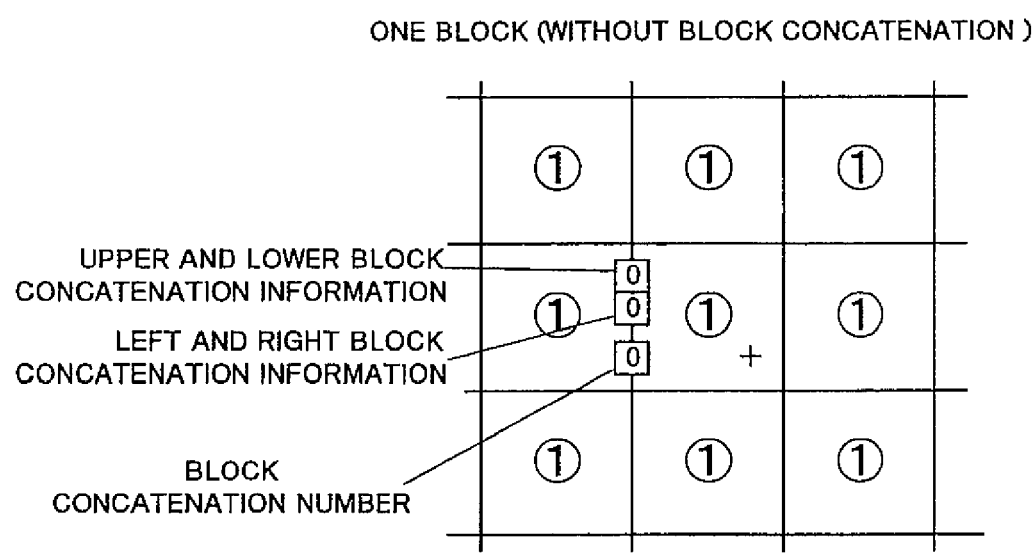
FIG. 29 is a drawing (7) for describing an aspect of a block concatenation.
Figure 35:
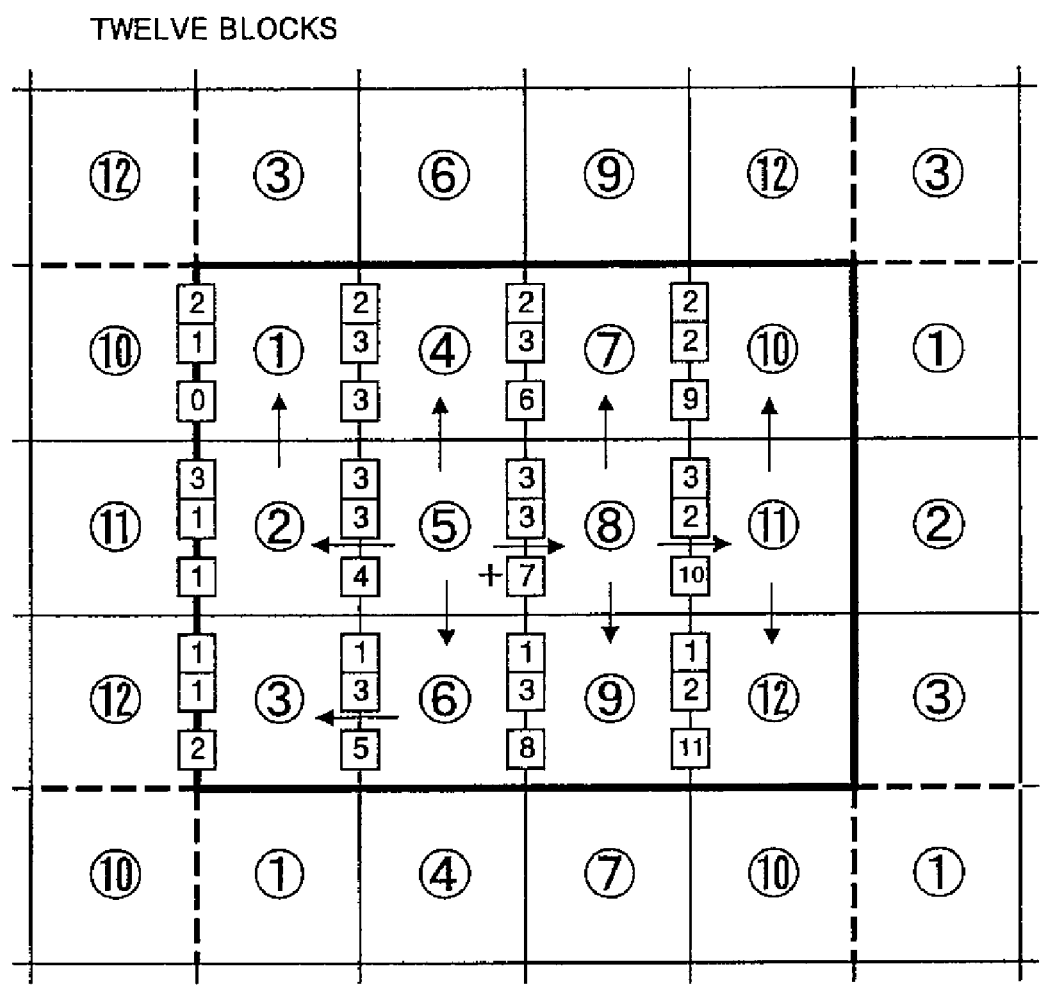
FIG. 35 is a drawing (13) for describing an aspect of a block concatenation.
Figure 36:
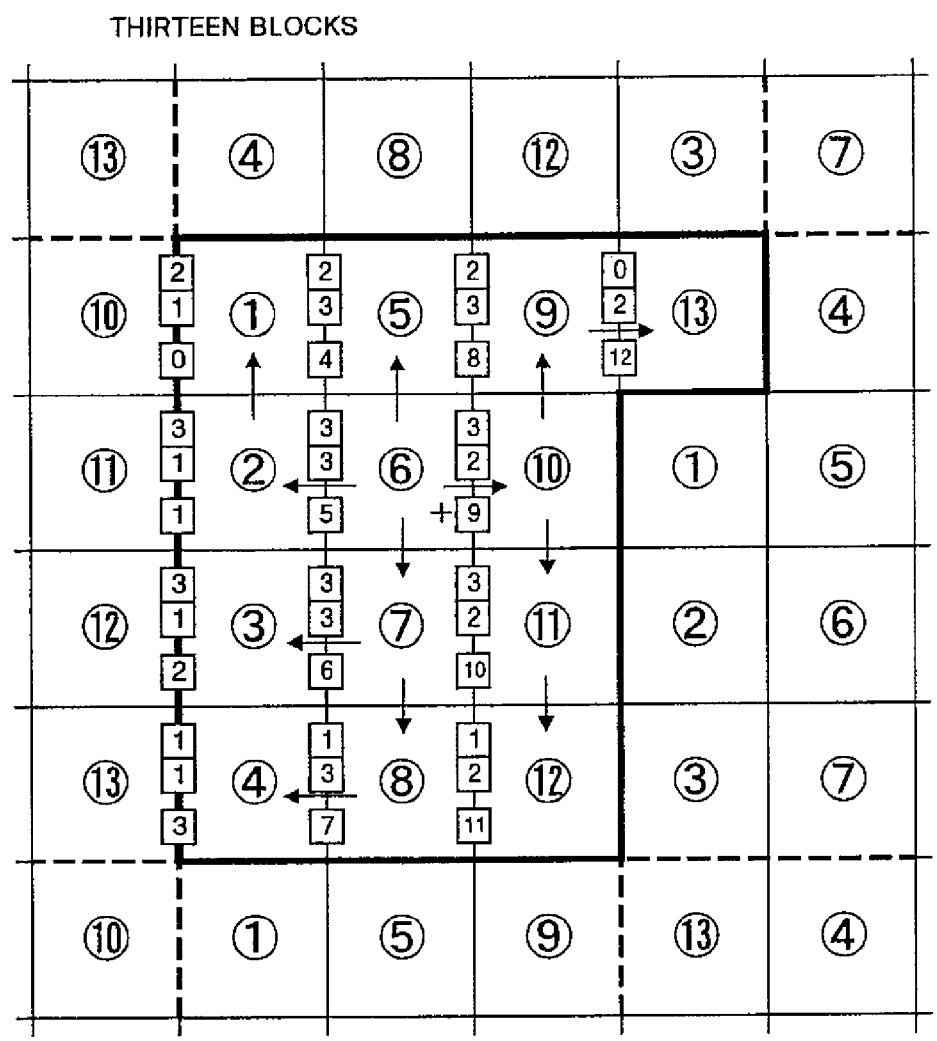
FIG. 36 is a drawing (14) for describing an aspect of a block concatenation.
Figure 37:
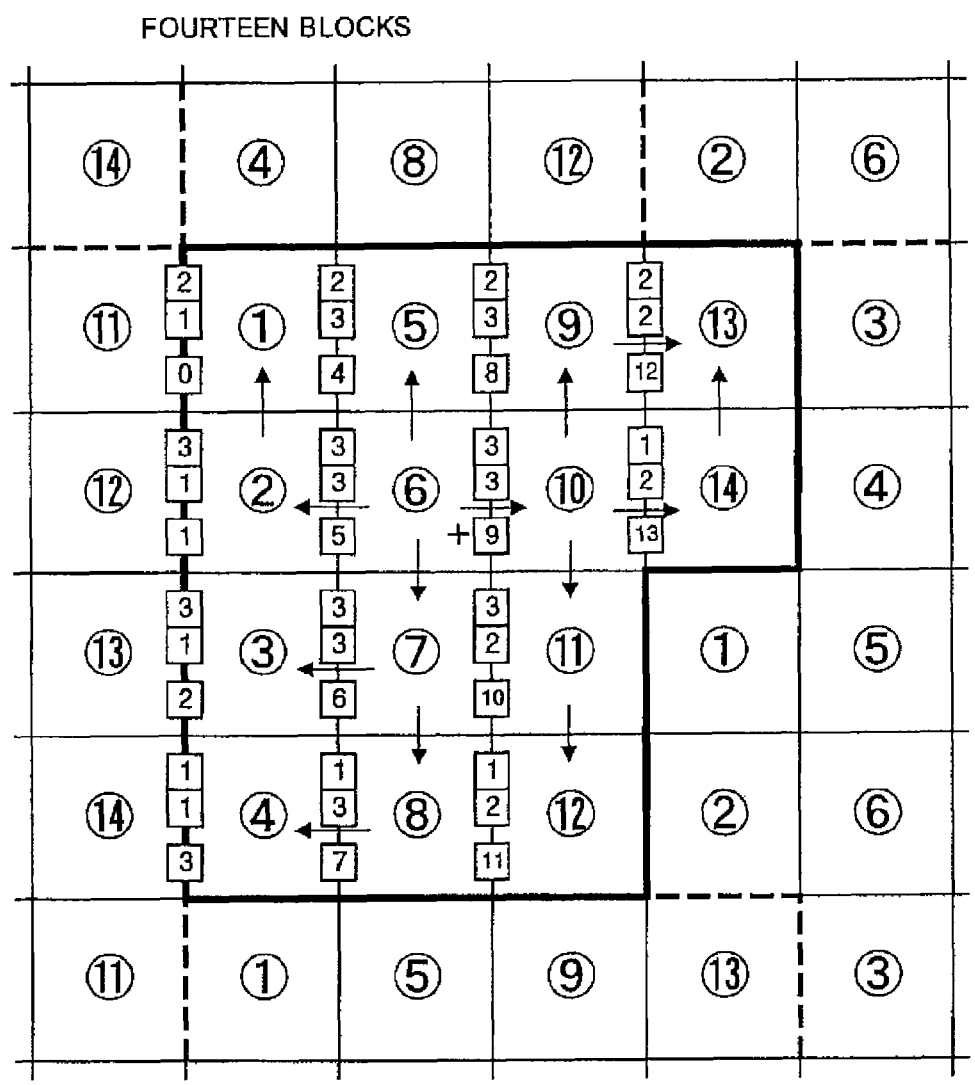
FIG. 37 is a drawing (15) for describing an aspect of a block concatenation.
Figure 38:
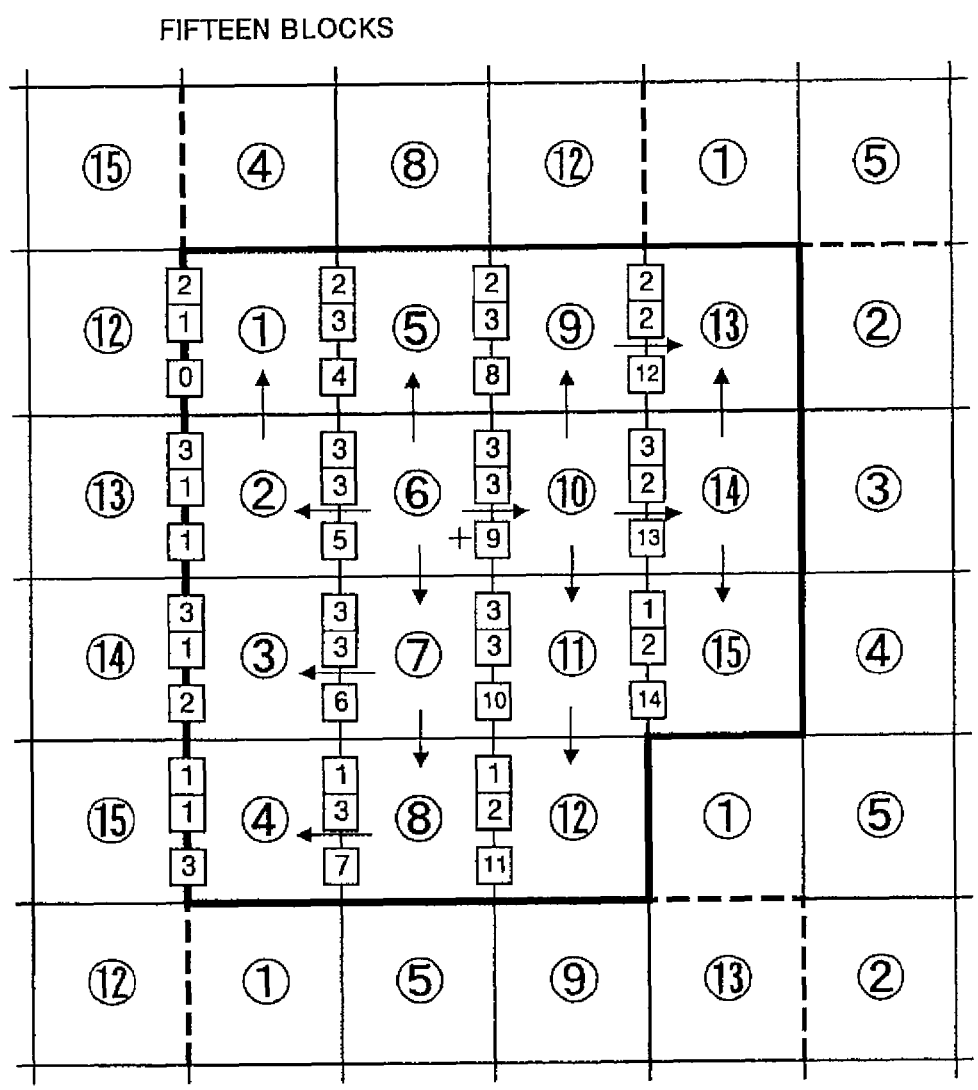
FIG. 38 is a drawing (16) for describing an aspect of a block concatenation.
Figure 39:
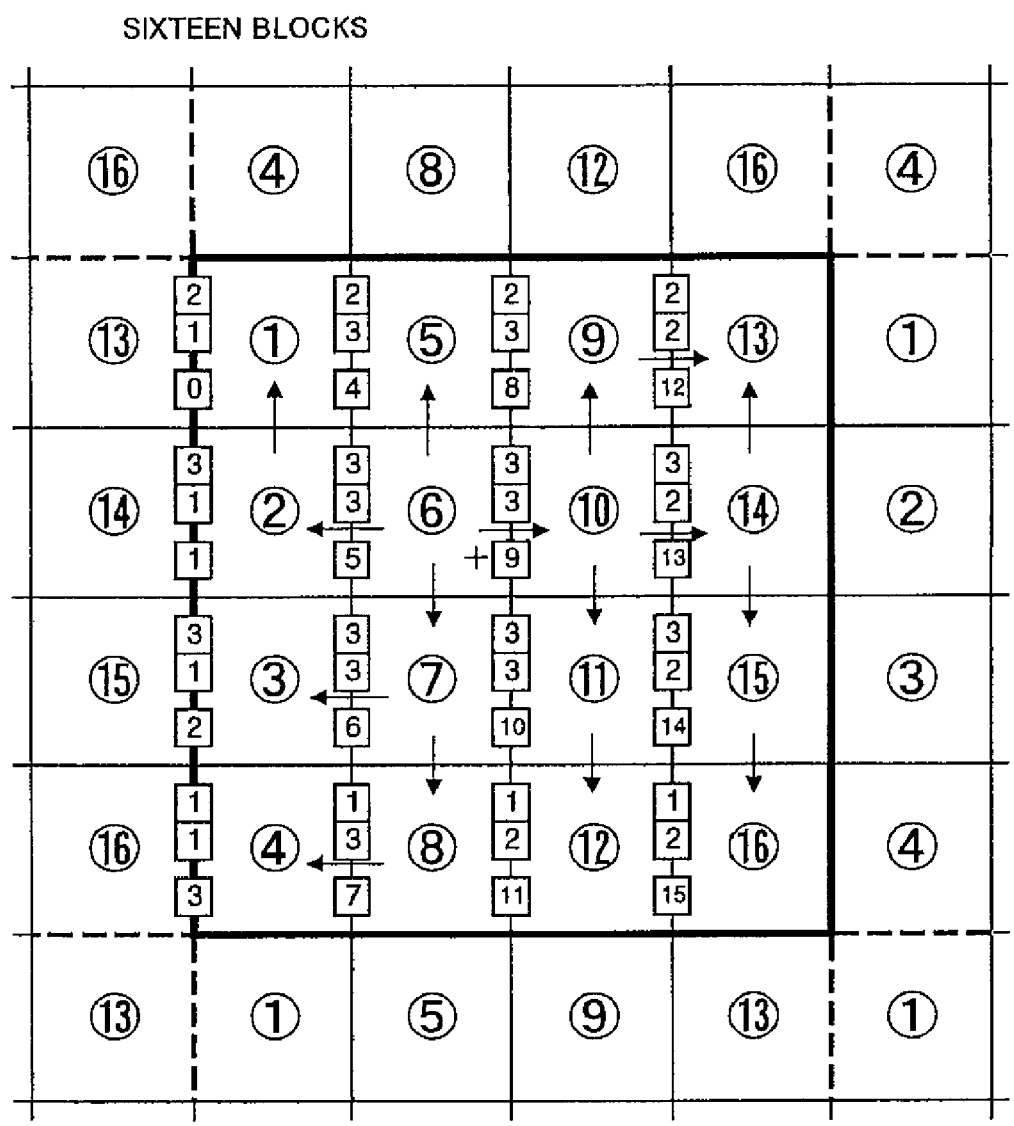
FIG. 39 is a drawing (17) for describing an aspect of a block concatenation.
Figure 40:
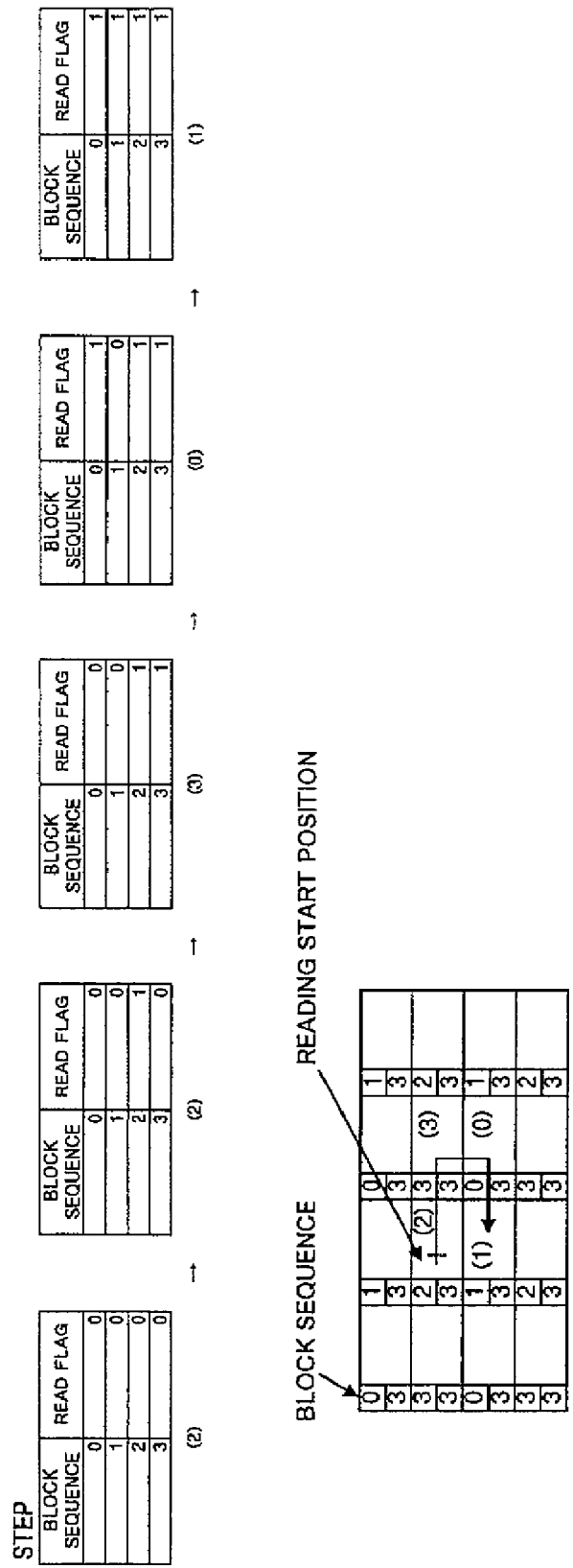
FIG. 40 is a drawing for showing the content of a block sequence table.
Figure 43:
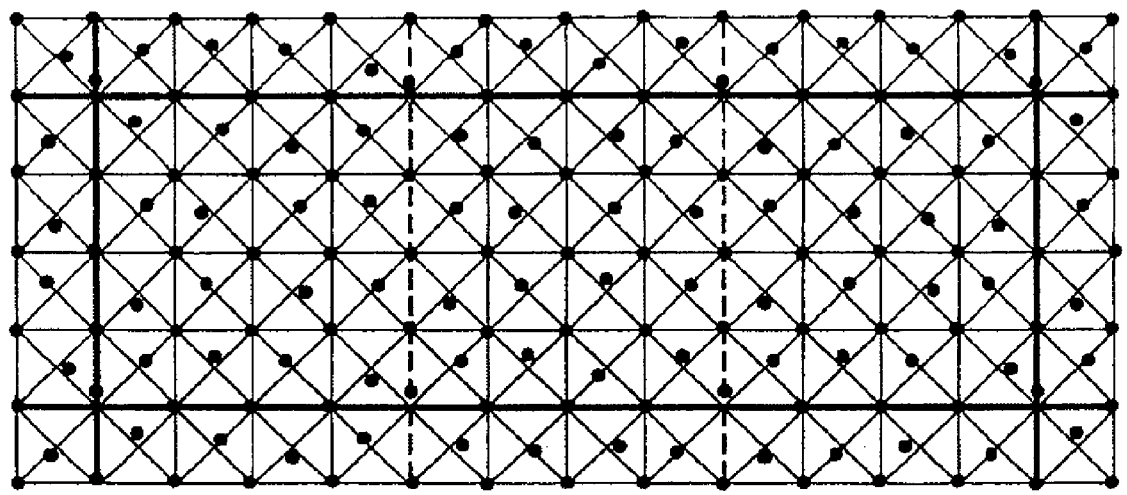
FIG. 43 is a drawing (3) for describing a block concatenation by a direct scanning method for GRID1.
Figure 46:
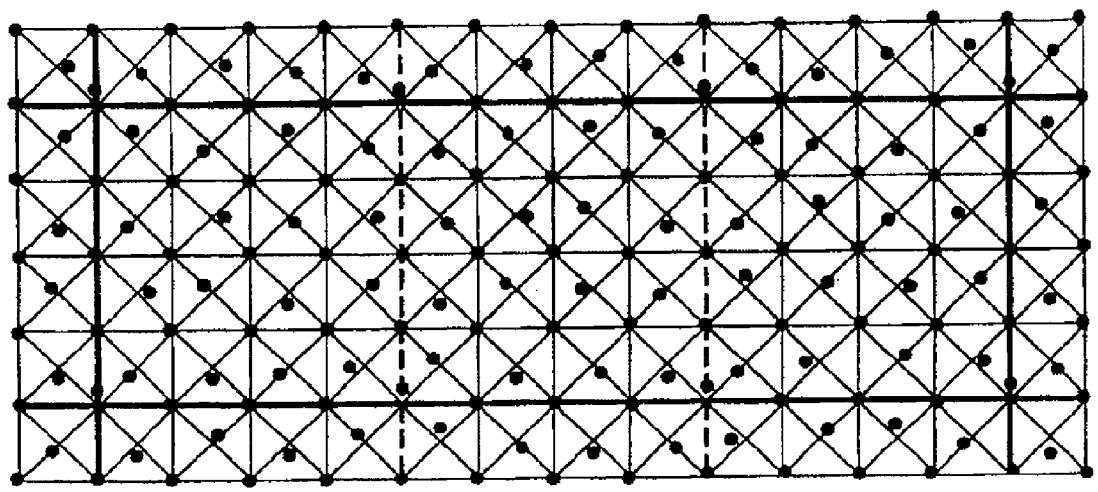
FIG. 46 is a drawing (3) for describing a block concatenation by a difference scanning method for GRID1.
Figure 49:
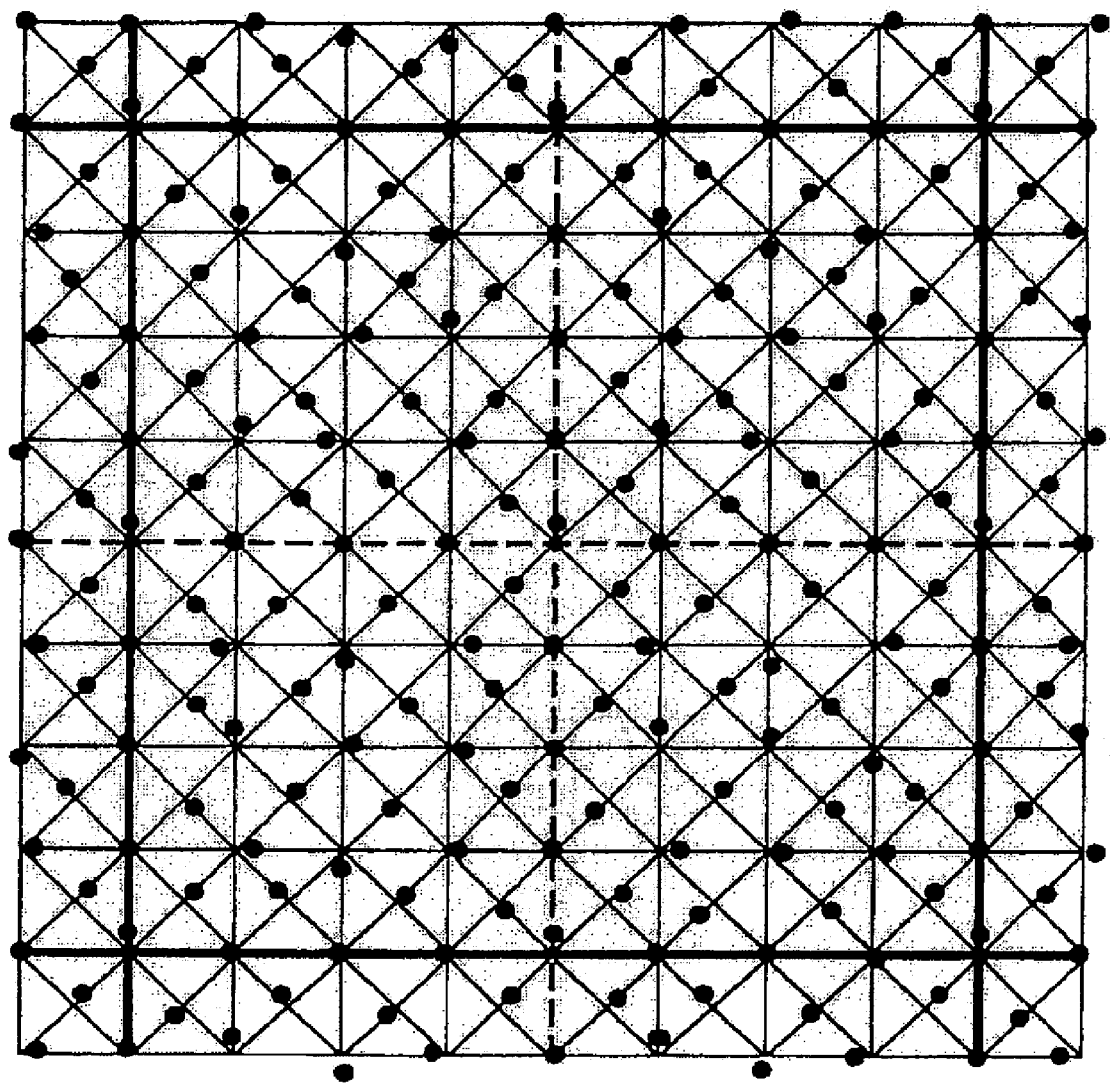
FIG. 49 is a drawing (3) for describing a block concatenation by a direct spiral method for GRID1.
Figure 50:
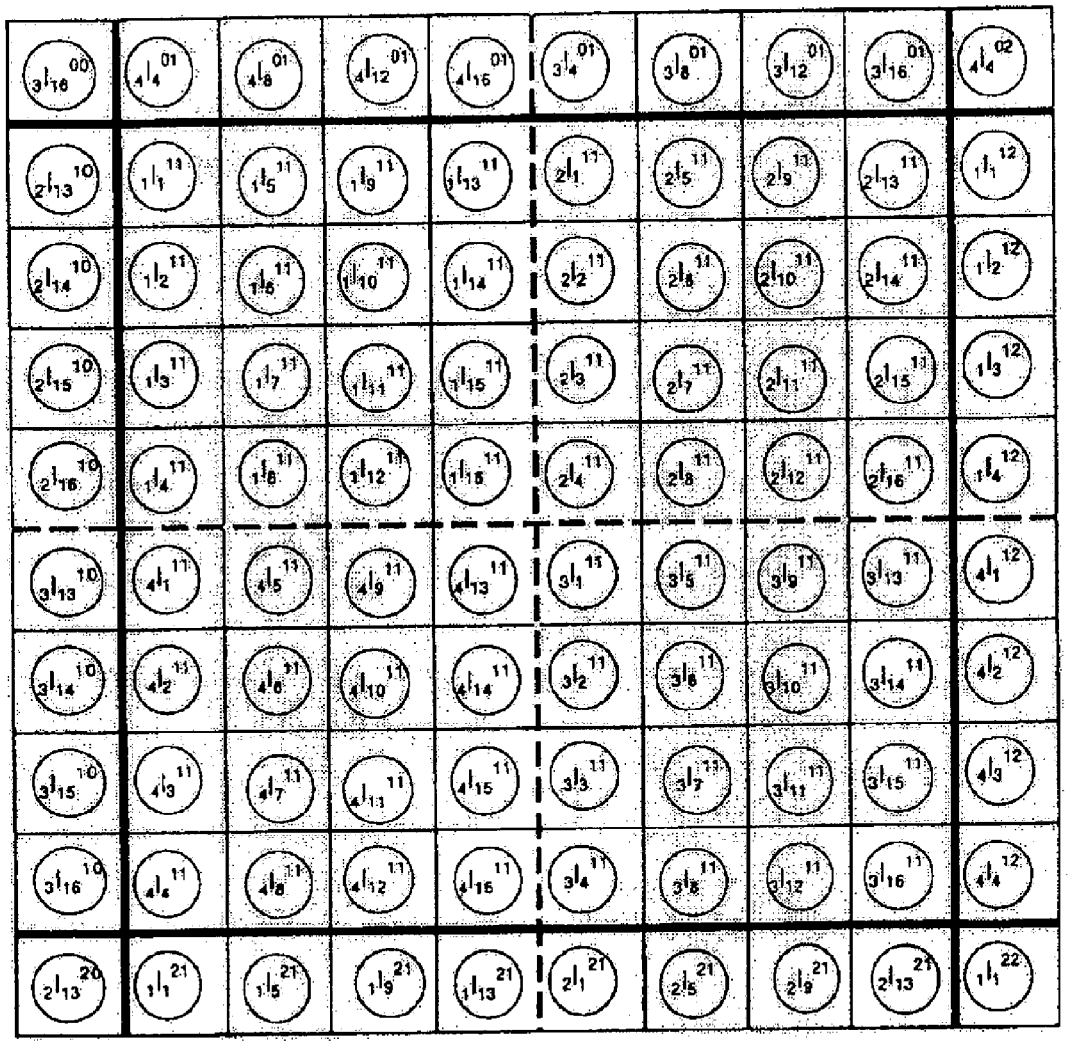
FIG. 50 is a drawing (1) for describing a block concatenation by a difference spiral method for GRID1.
Figure 52:
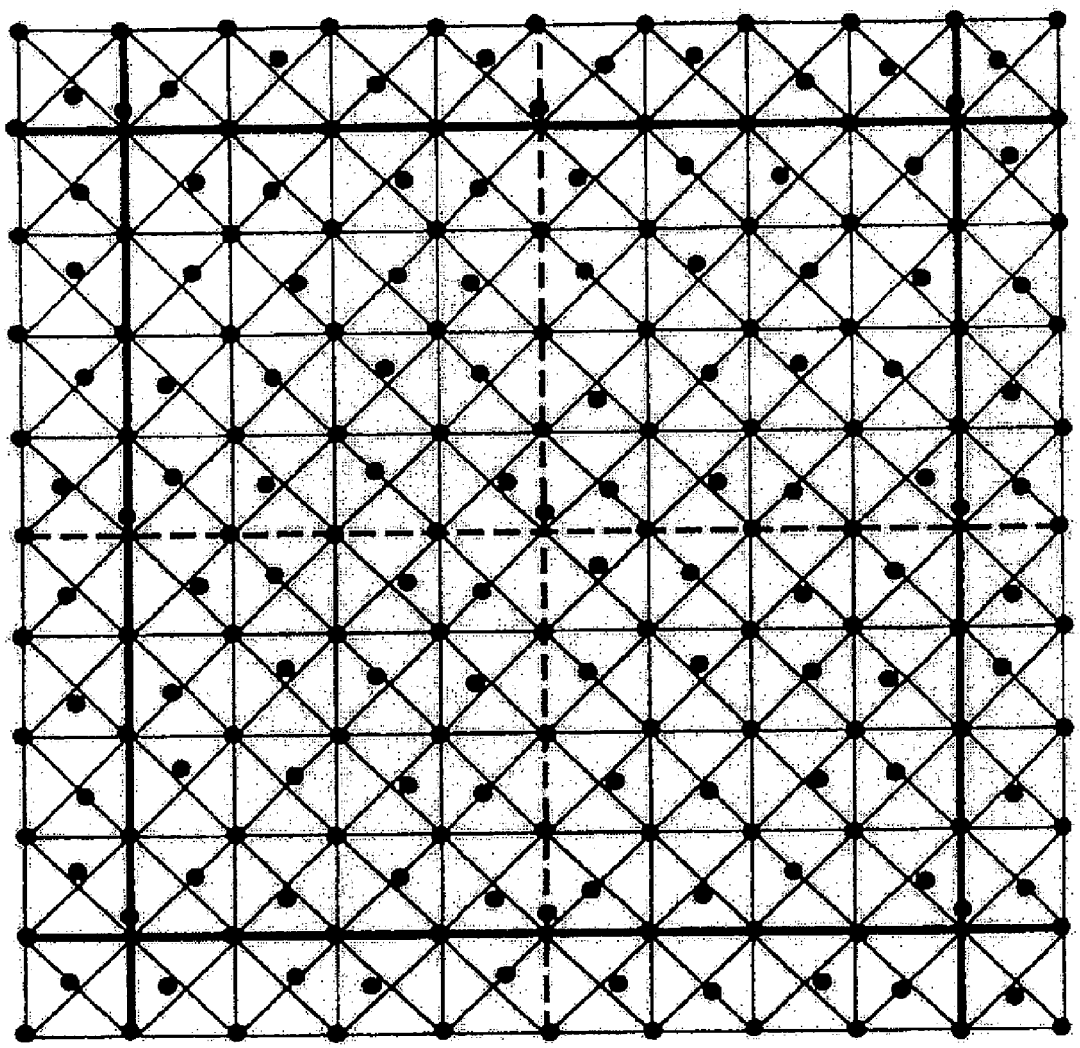
FIG. 52 is a drawing (3) for describing a block concatenation by a difference spiral method for GRID1.
Figure 55:
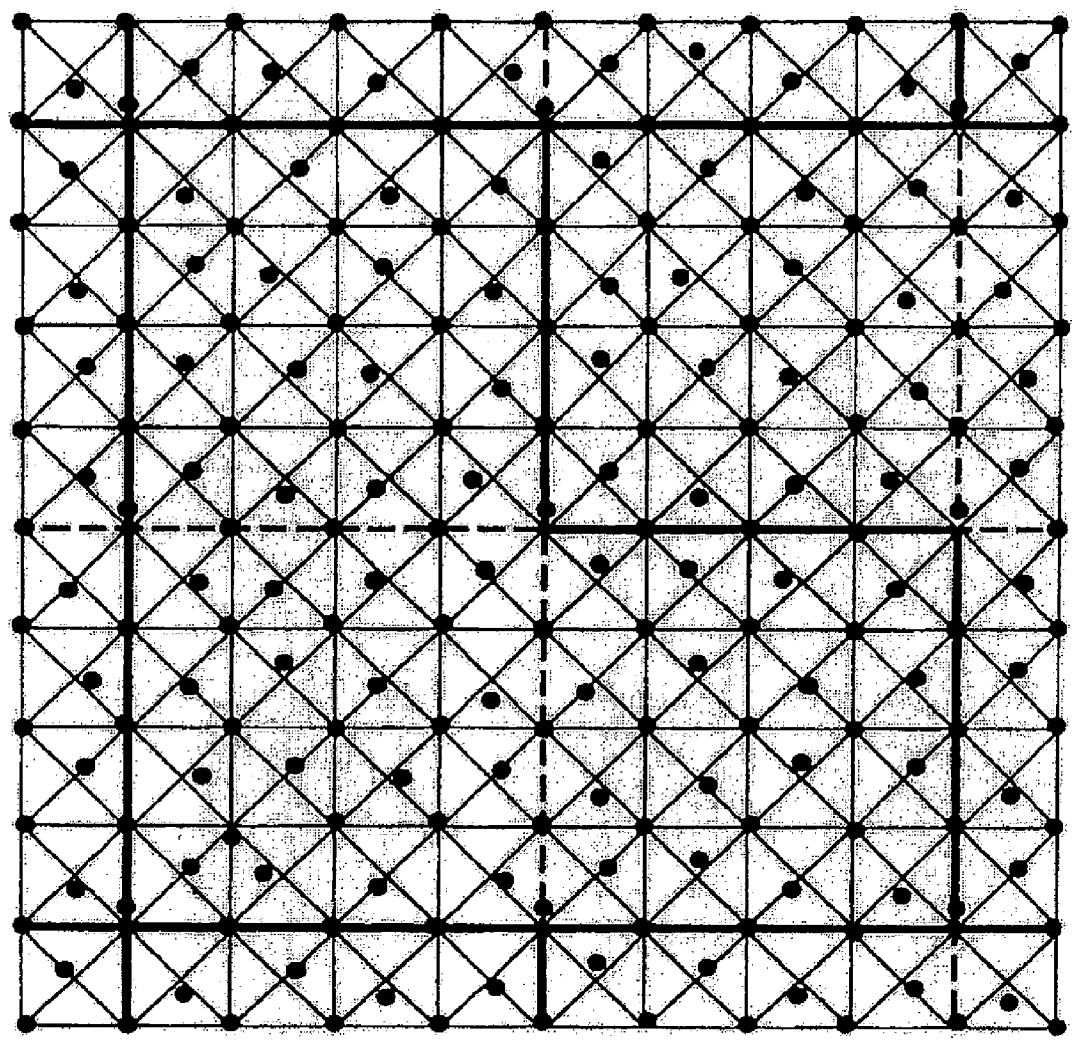
FIG. 55 is a drawing (3) for describing a block concatenation by a direct search method for GRID1.
Figure 58:
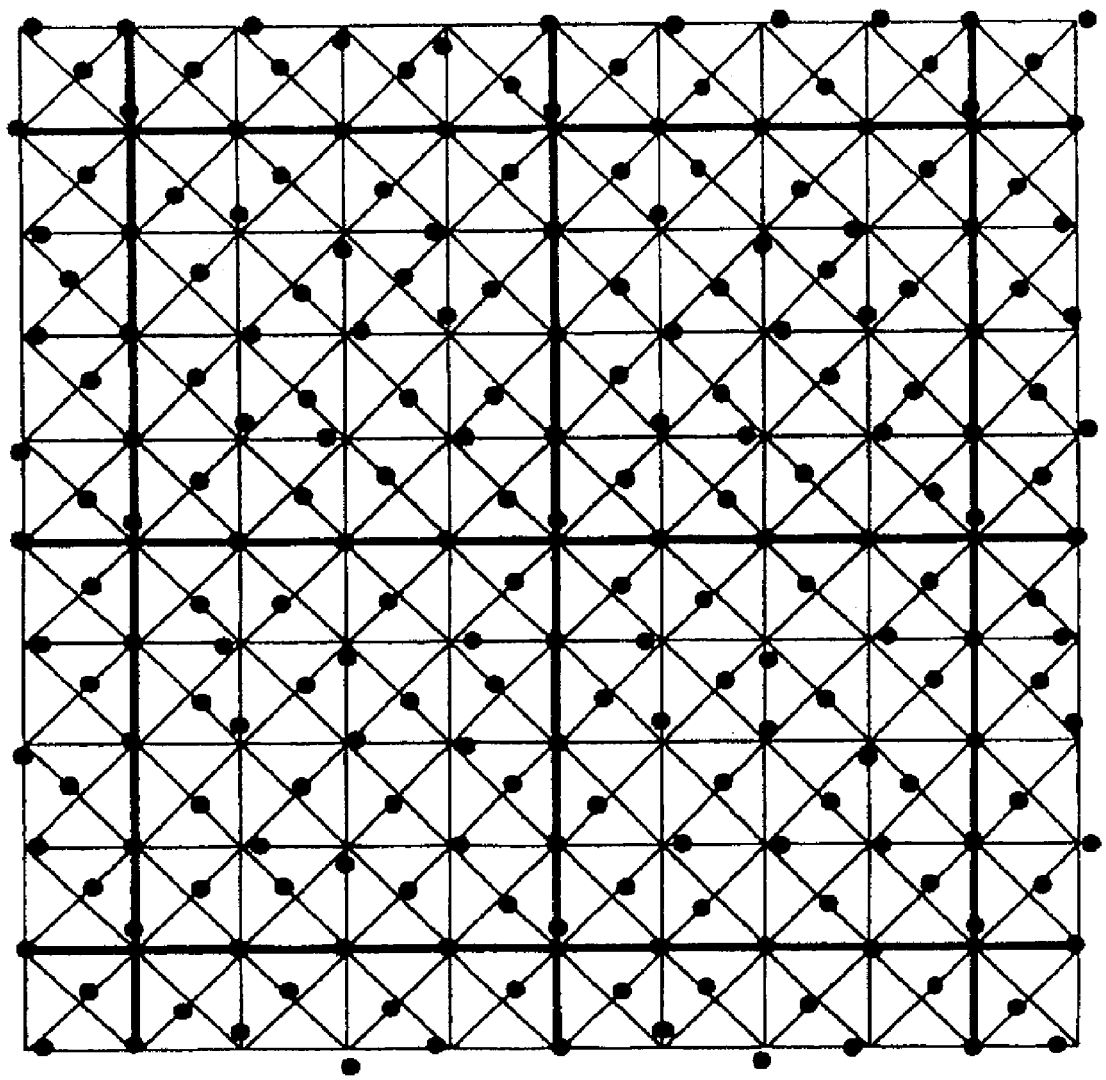
FIG. 58 is a drawing (3) for describing a block concatenation by a difference search method for GRID1.
Figure 61:
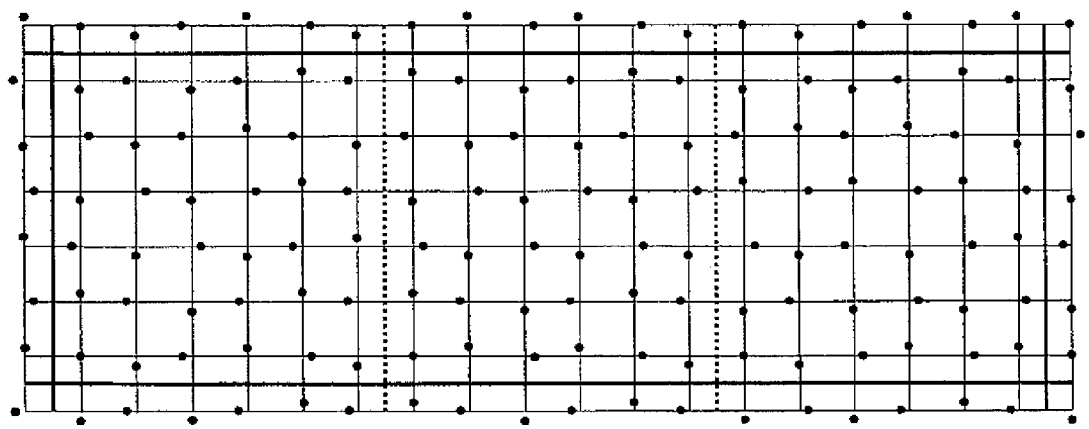
FIG. 61 is a drawing (3) for describing a block concatenation by a direct scanning method for GRID2.
Figure 64:
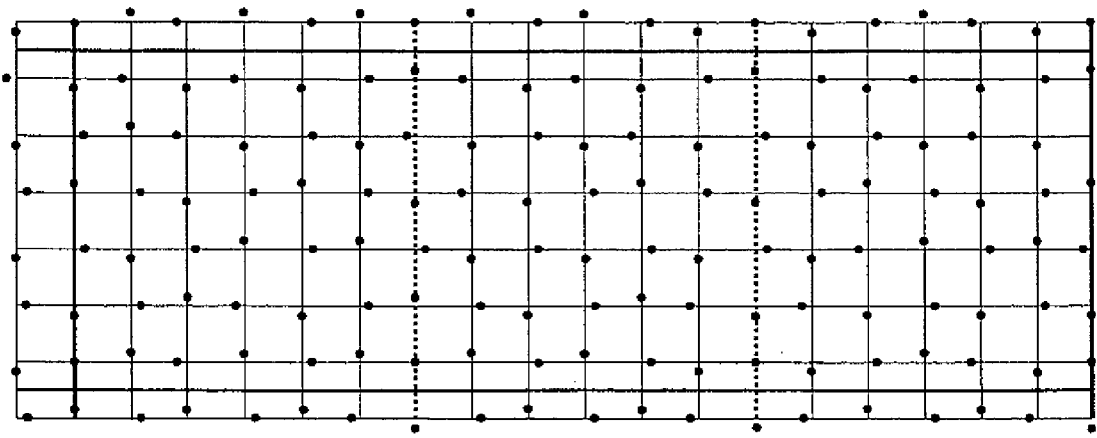
FIG. 64 is a drawing (4) for describing a block concatenation by a difference scanning method for GRID2.
Figure 67:
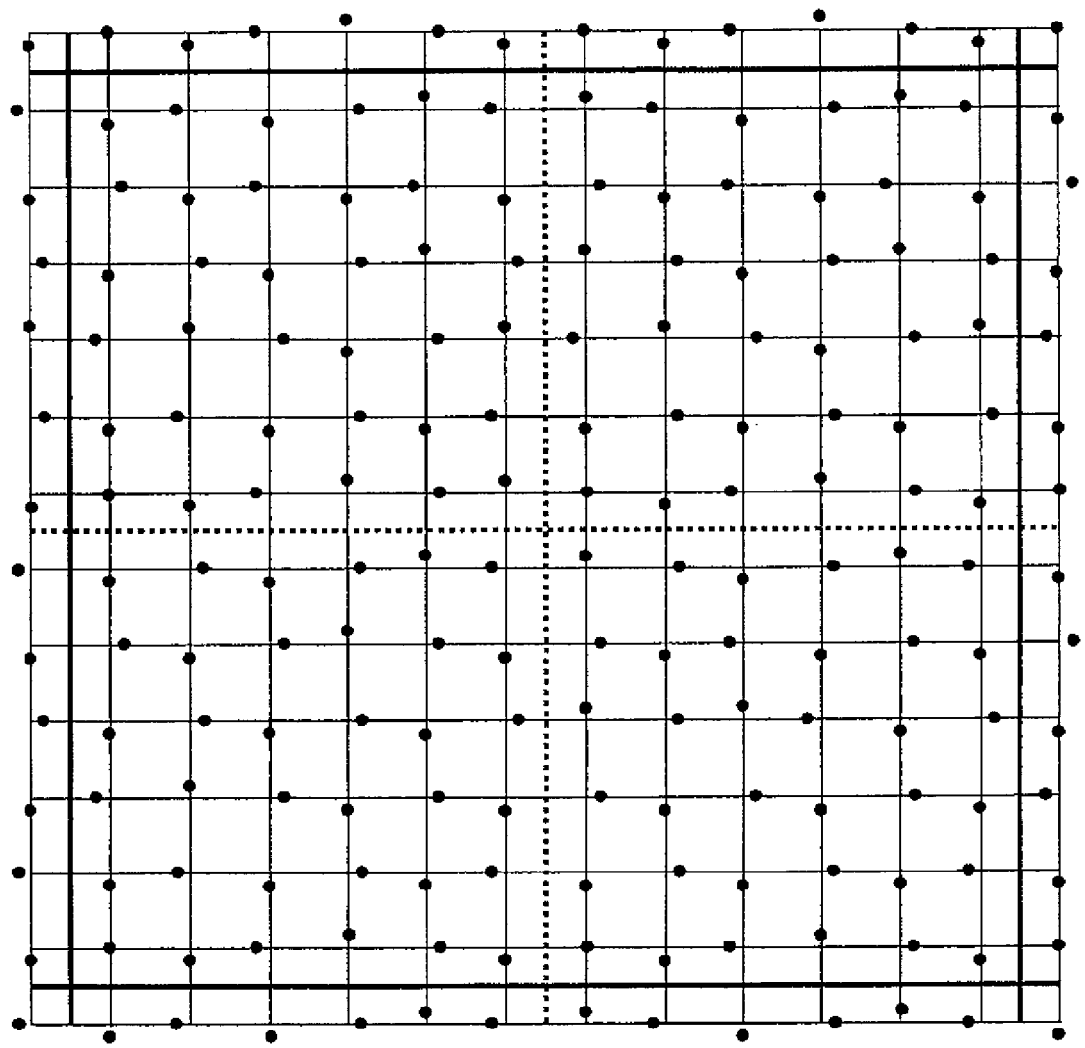
FIG. 67 is a drawing (3) for describing a block concatenation by a direct spiral method for GRID2.
Figure 68:
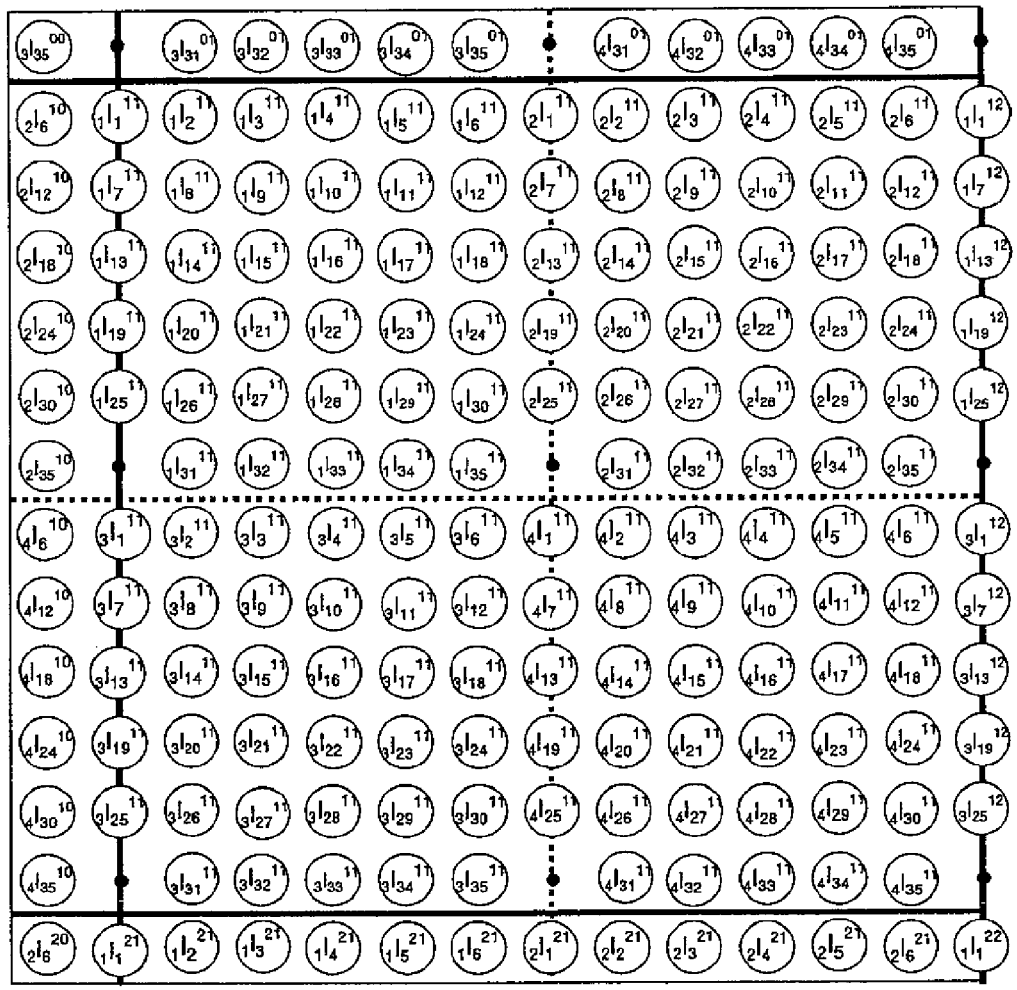
FIG. 68 is a drawing (1) for describing a block concatenation by a difference spiral method for GRID2.
Figure 70:
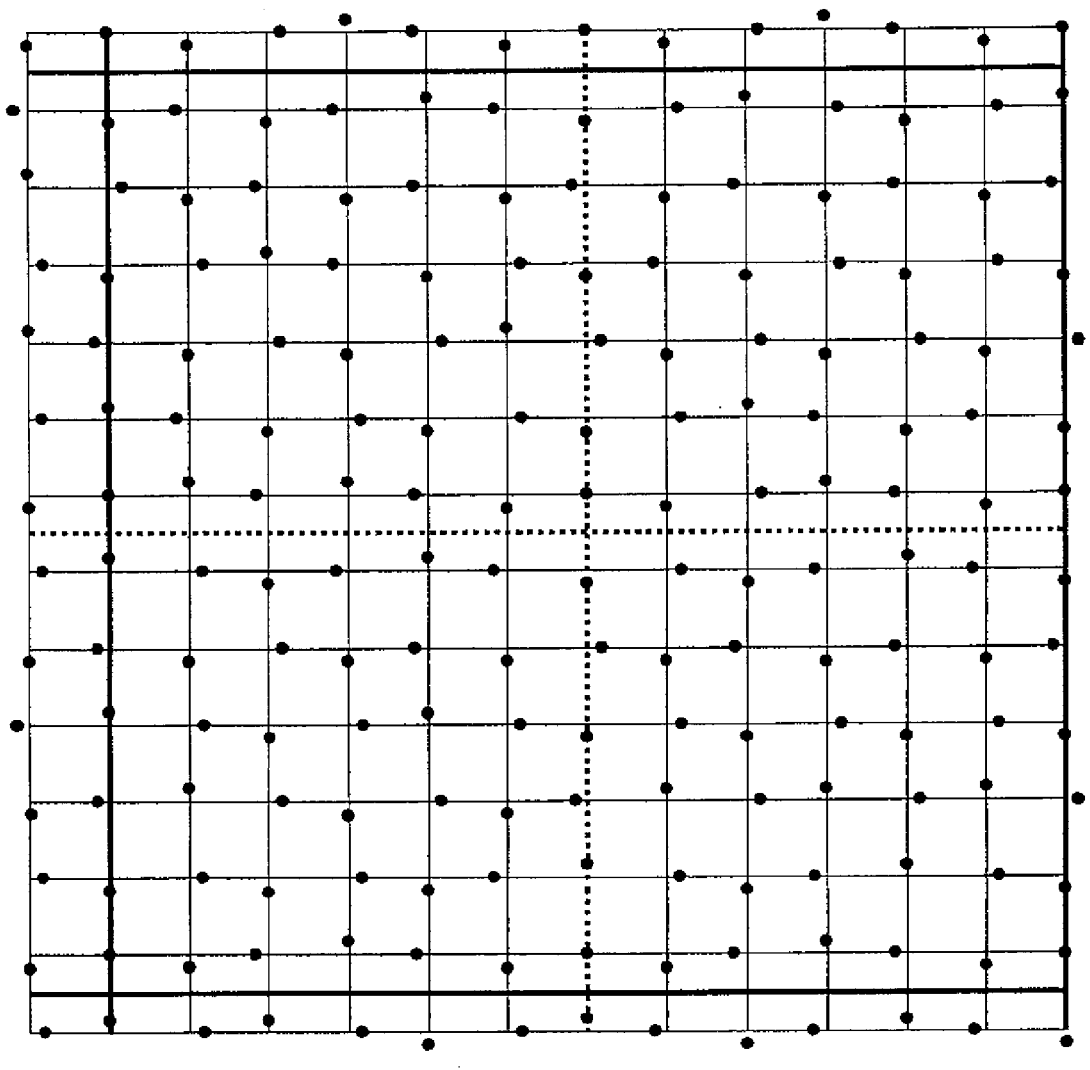
FIG. 70 is a drawing (3) for describing a block concatenation by a difference spiral method for GRID2.
Figure 73:
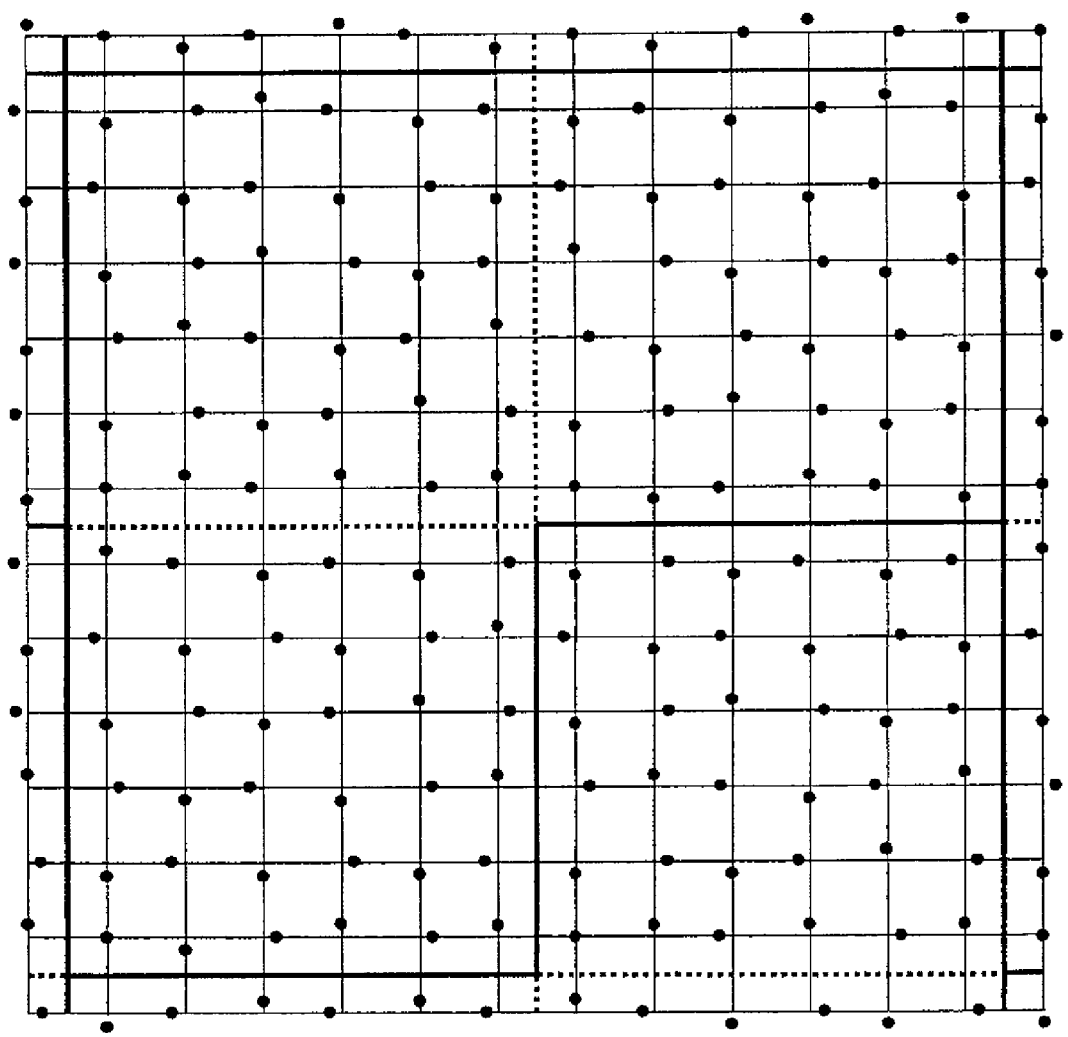
FIG. 73 is a drawing (3) for describing a block concatenation by a direct search method for GRID2.
Figure 74:
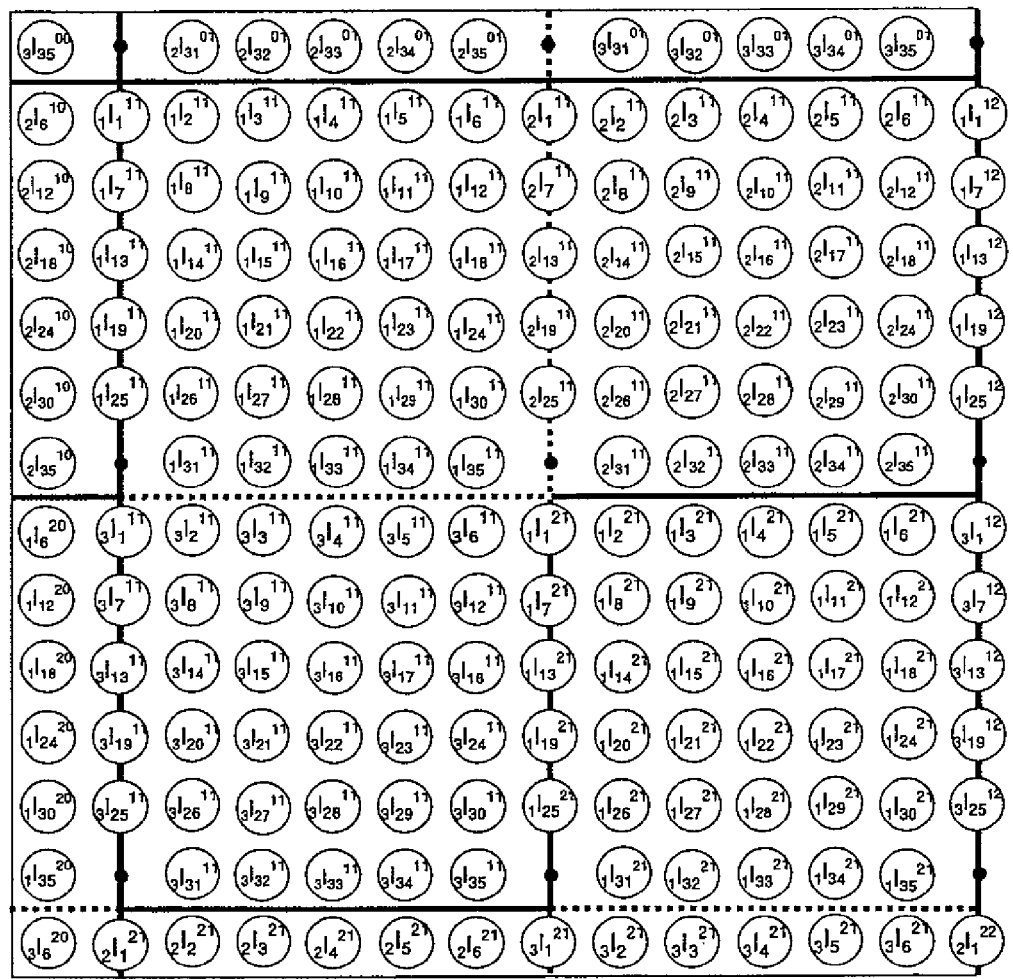
FIG. 74 is a drawing (1) for describing a block concatenation by a difference search method for GRID2.
Figure 76:
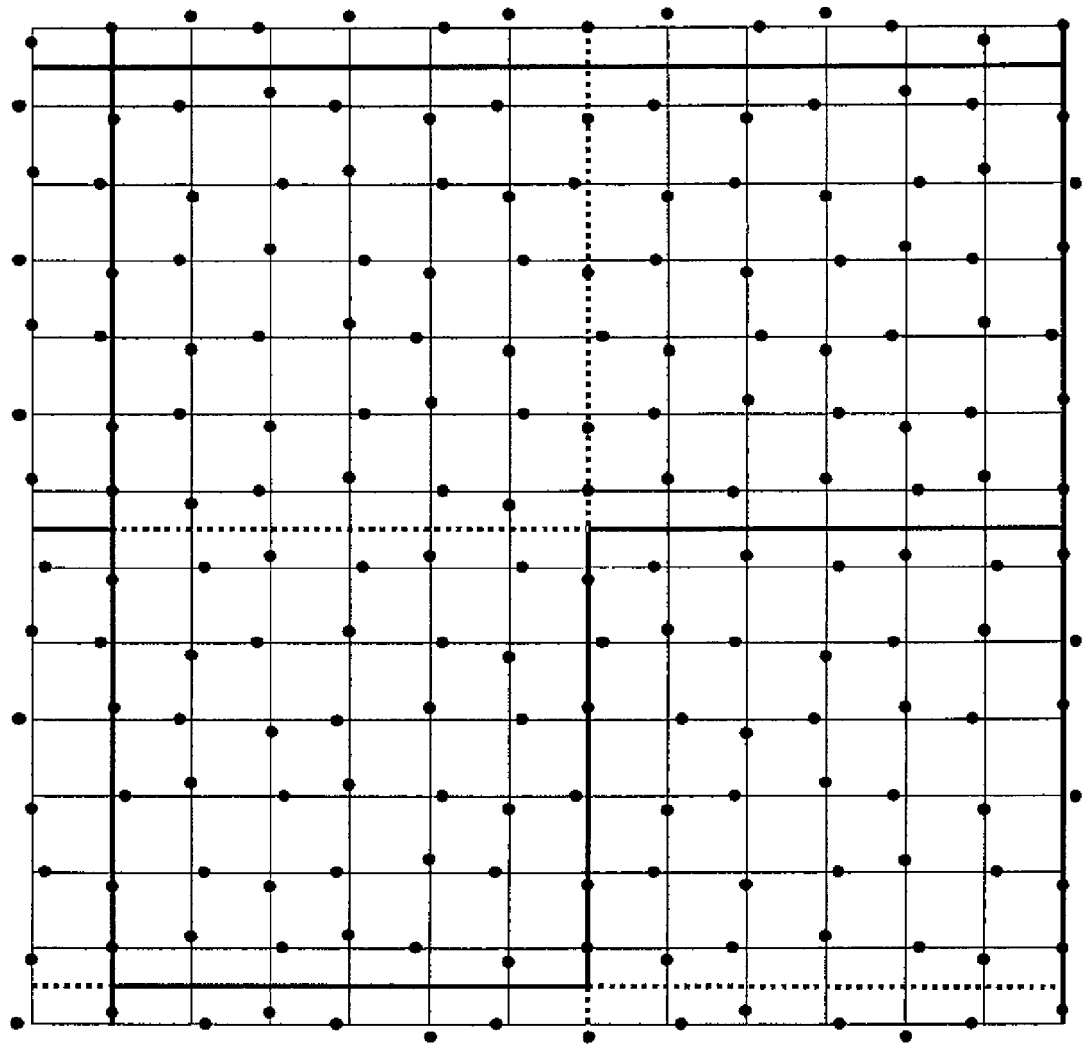
FIG. 76 is a drawing (3) for describing a block concatenation by a difference search method for GRID2.
Figures 78, 79:
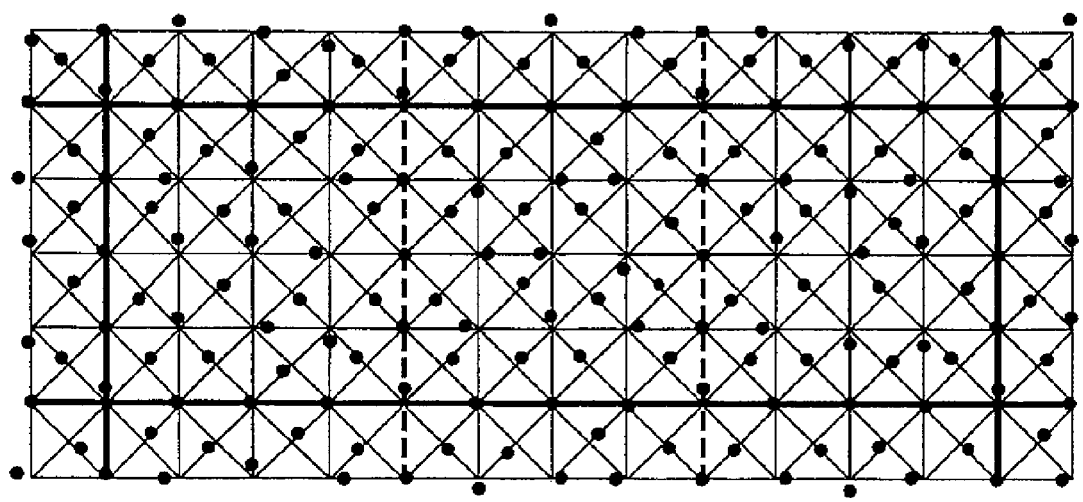
FIG. 78 is a drawing (2) for describing a block concatenation by a direct scanning method for GRID3.
FIG. 79 is a drawing (3) for describing a block concatenation by a direct scanning method for GRID3.
Figure 81:
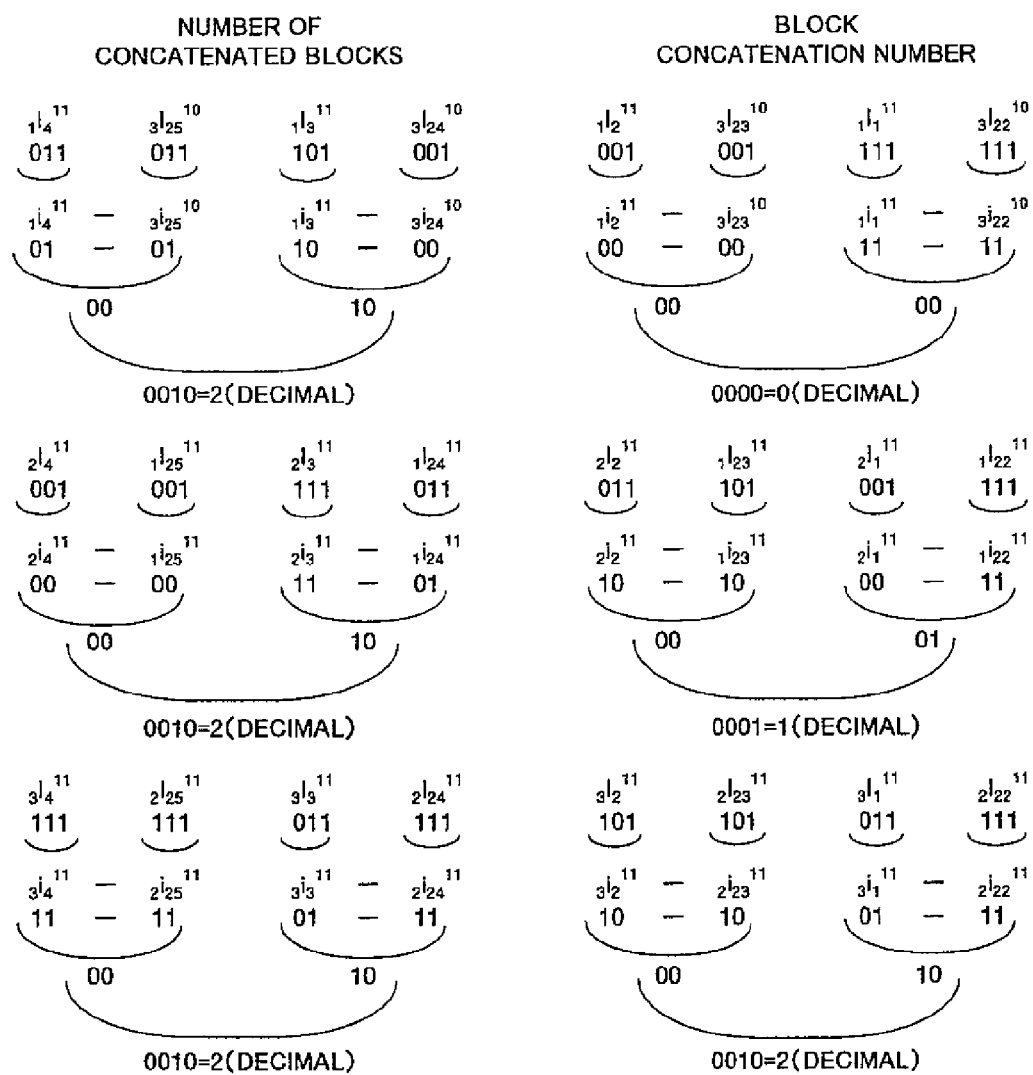
FIG. 81 is a drawing (2) for describing a block concatenation by a difference scanning method for GRID3.
Figure 82:
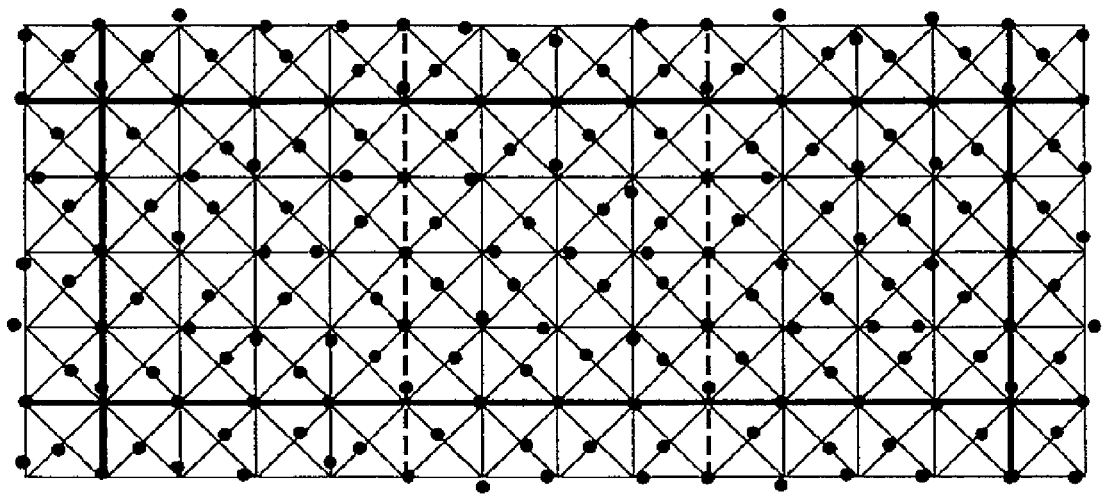
FIG. 82 is a drawing (3) for describing a block concatenation by a difference scanning method for GRID3.
Figure 83:
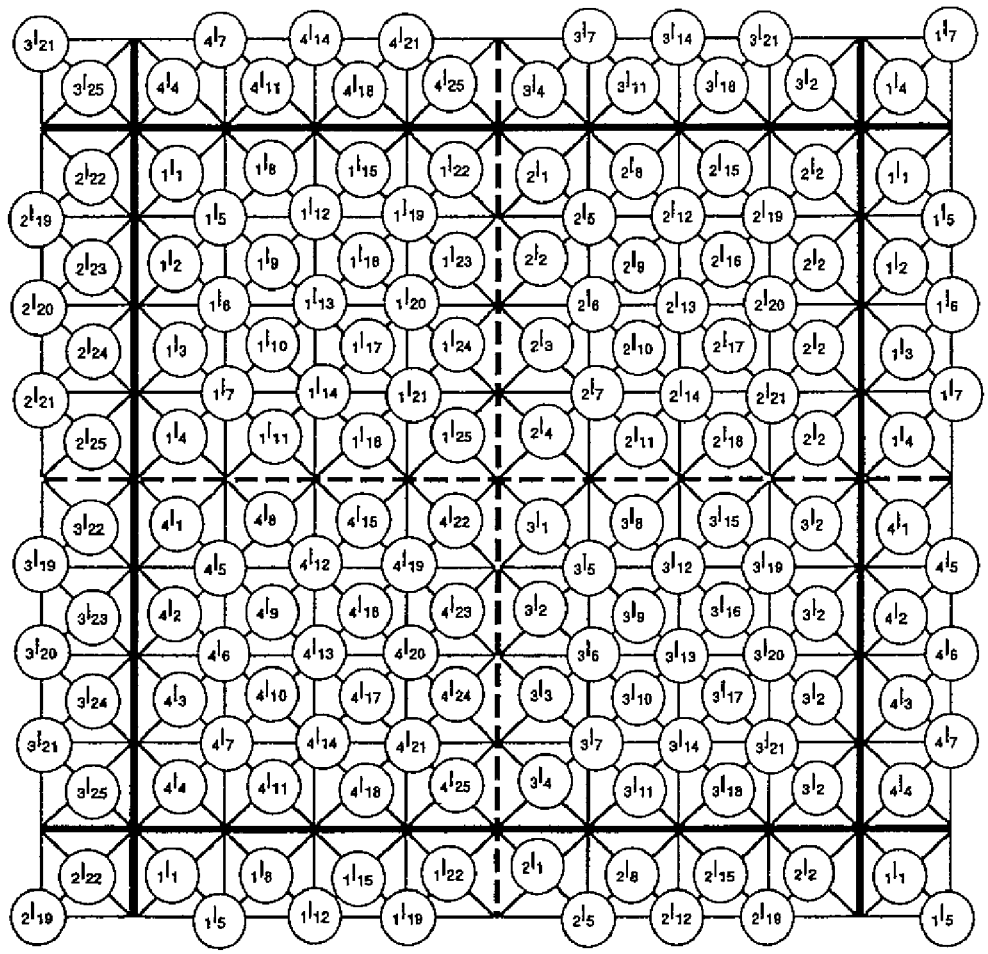
FIG. 83 is a drawing (1) for describing a block concatenation by a direct spiral method for GRID3.
Figure 85:
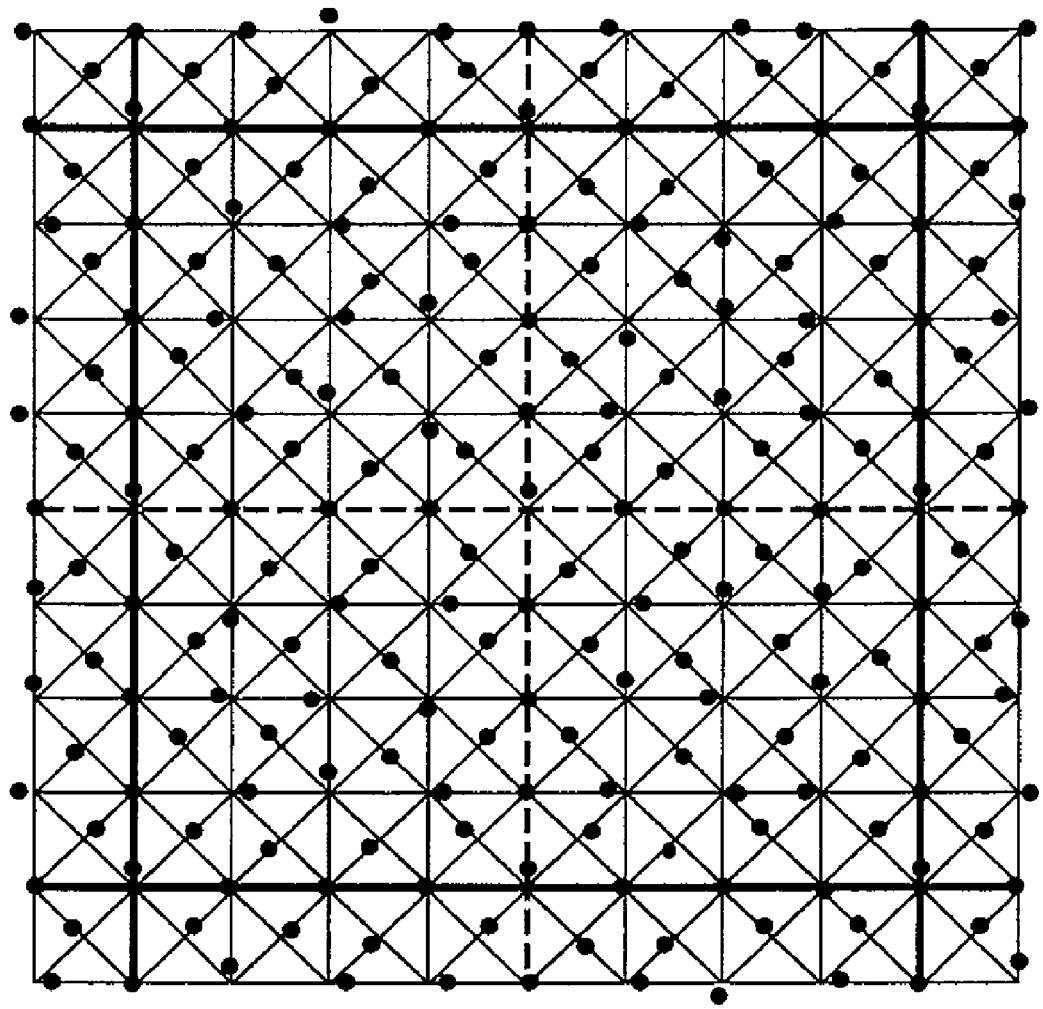
FIG. 85 is a drawing (3) for describing a block concatenation by a direct spiral method for GRID3.
Figure 86:
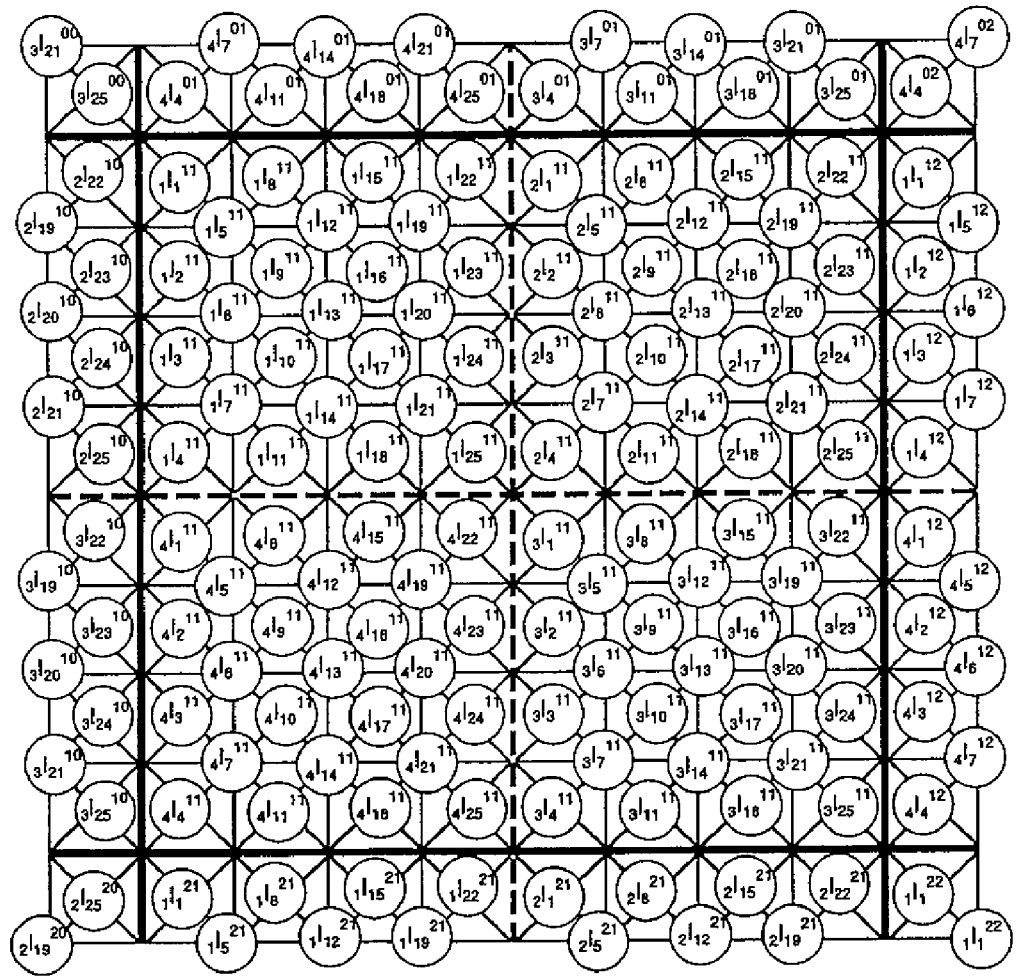
FIG. 86 is a drawing (1) for describing a block concatenation by a difference spiral method for GRID3.
Figure 87:
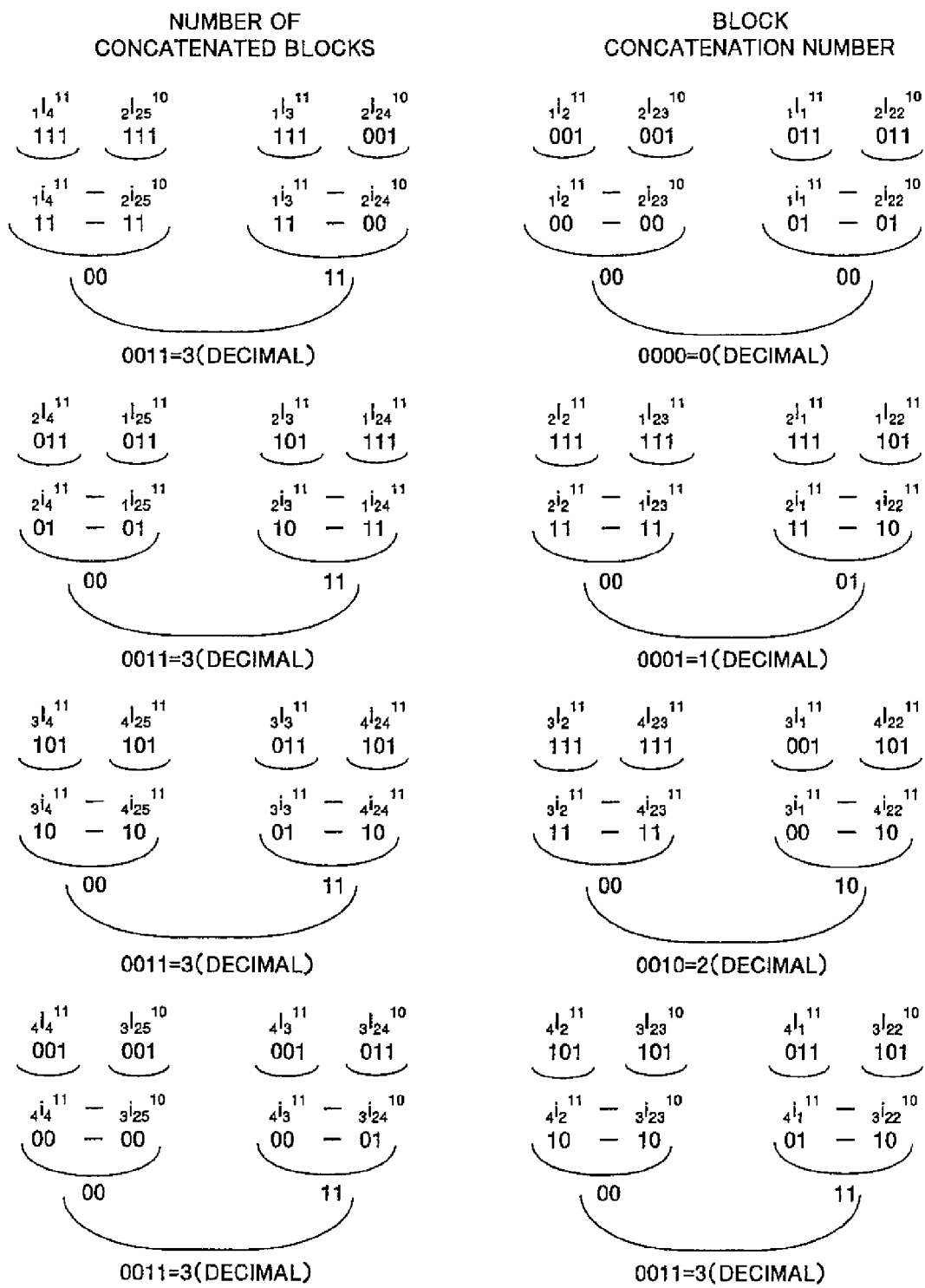
FIG. 87 is a drawing (2) for describing a block concatenation by a difference spiral method for GRID3.
Figure 88:
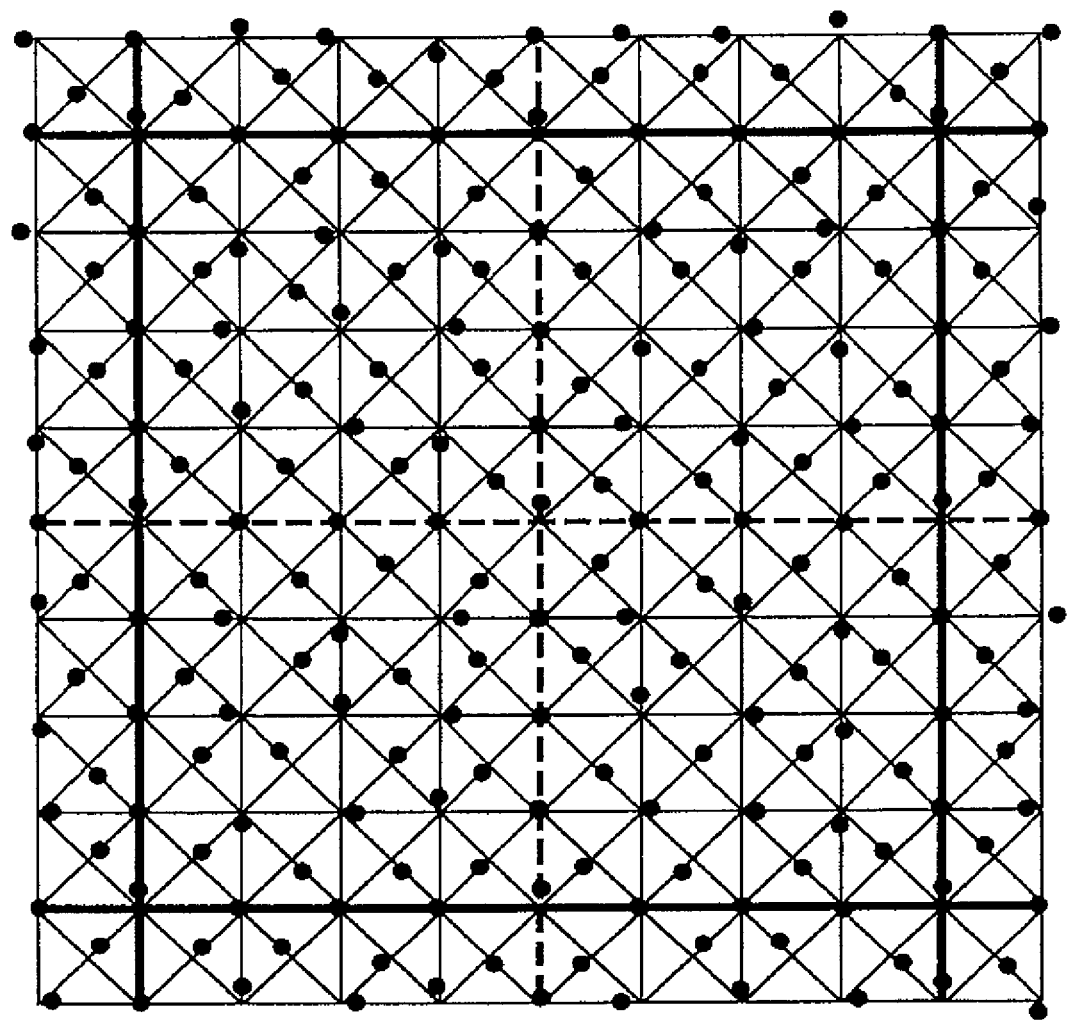
FIG. 88 is a drawing (3) for describing a block concatenation by a difference spiral method for GRID3.
Figure 89:
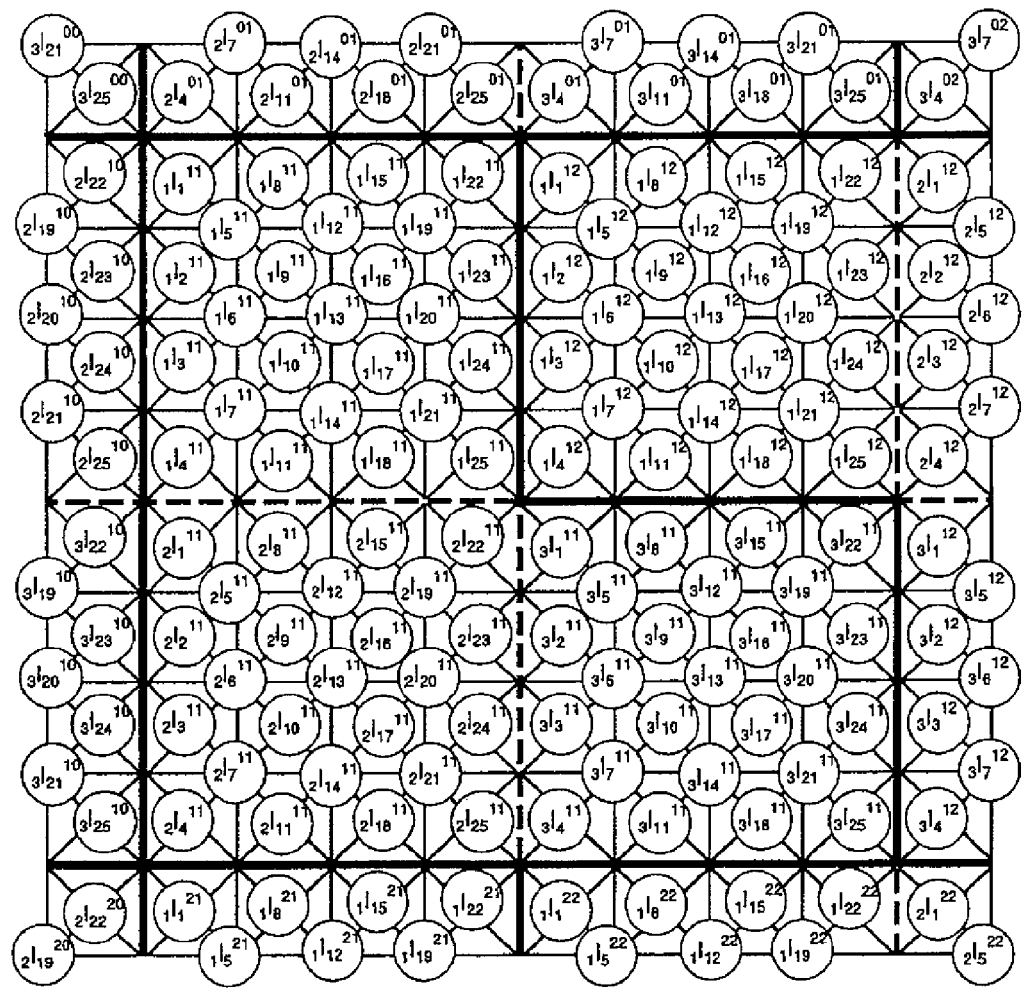
FIG. 89 is a drawing (1) for describing a block concatenation by a direct search method for GRID3.
Figure 90:
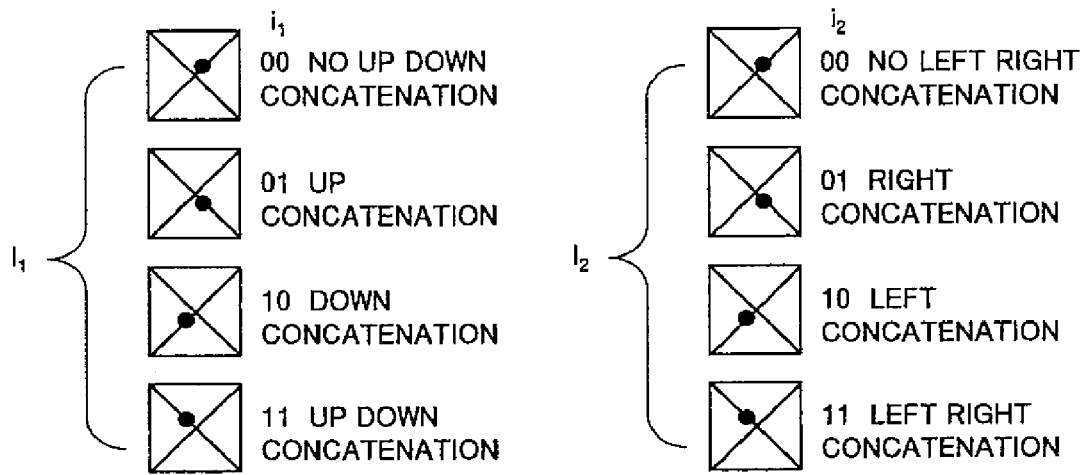
FIG. 90 is a drawing (2) for describing a block concatenation by a direct search method for GRID3.
Figure 91:
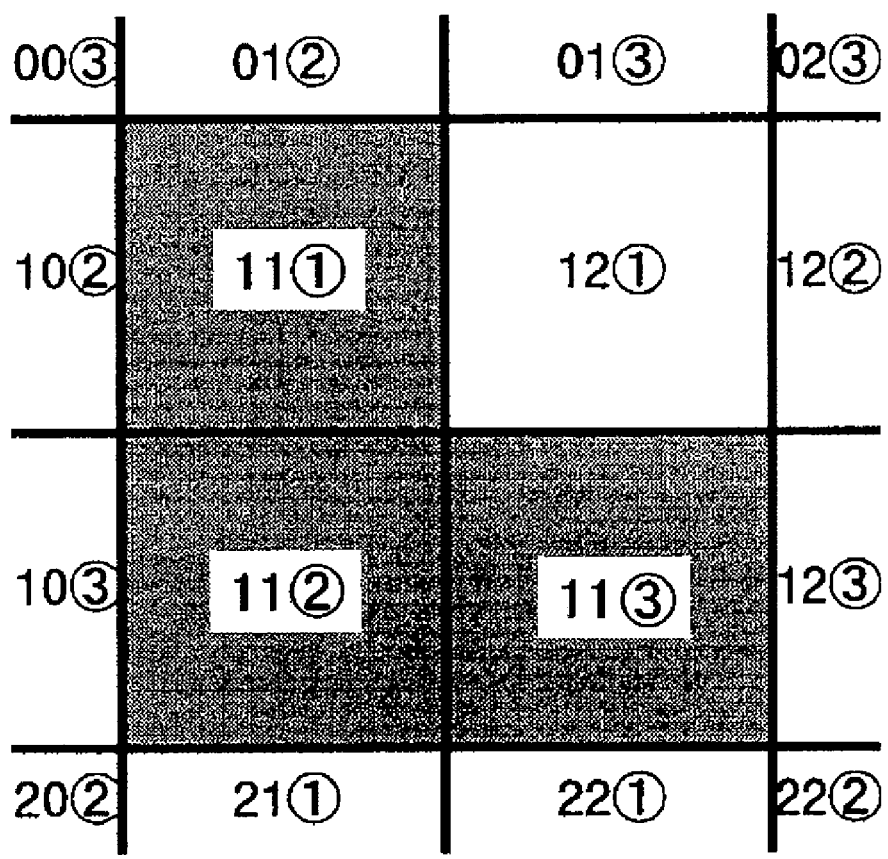
FIG. 91 is a drawing (3) for describing a block concatenation by a direct search method for GRID3.
Figure 93:
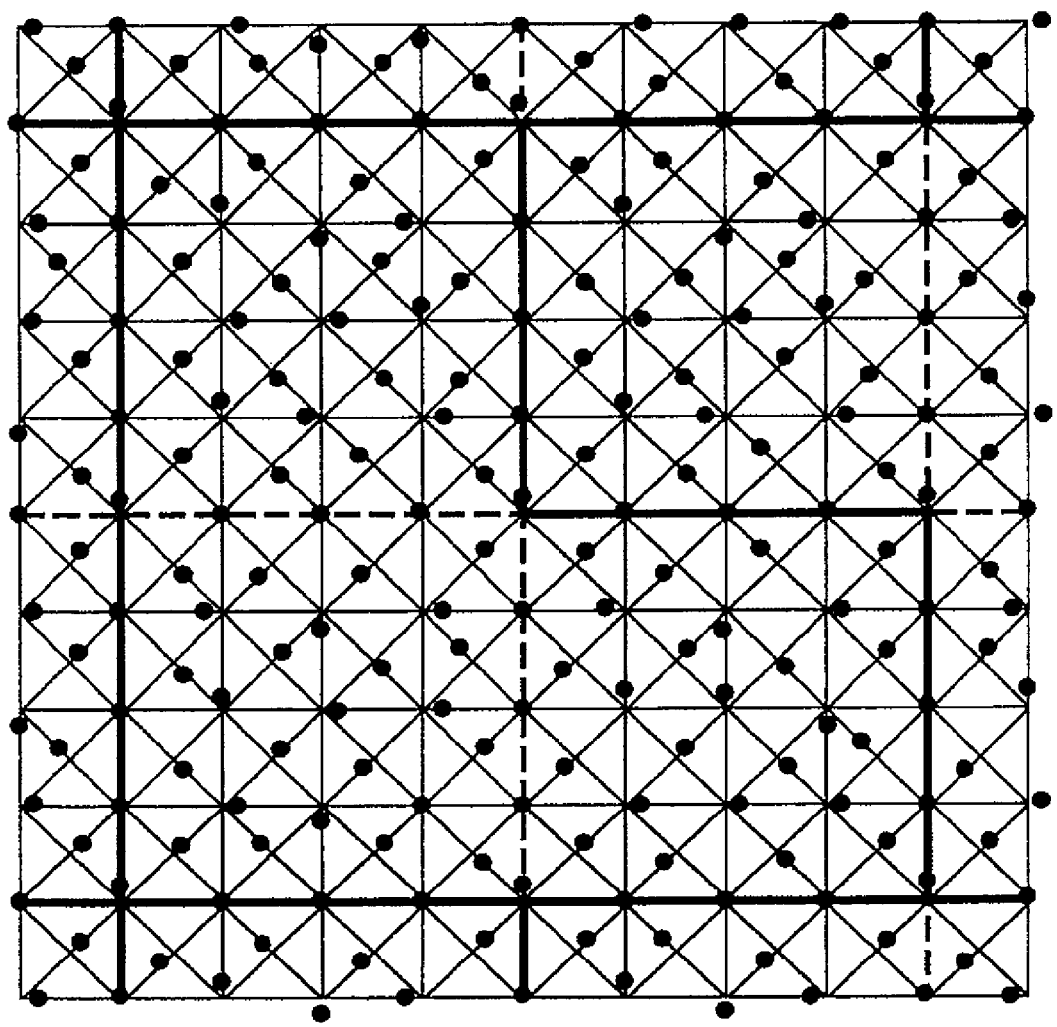
FIG. 93 is a drawing (5) for describing a block concatenation by a direct search method for GRID3.
Figure 94:
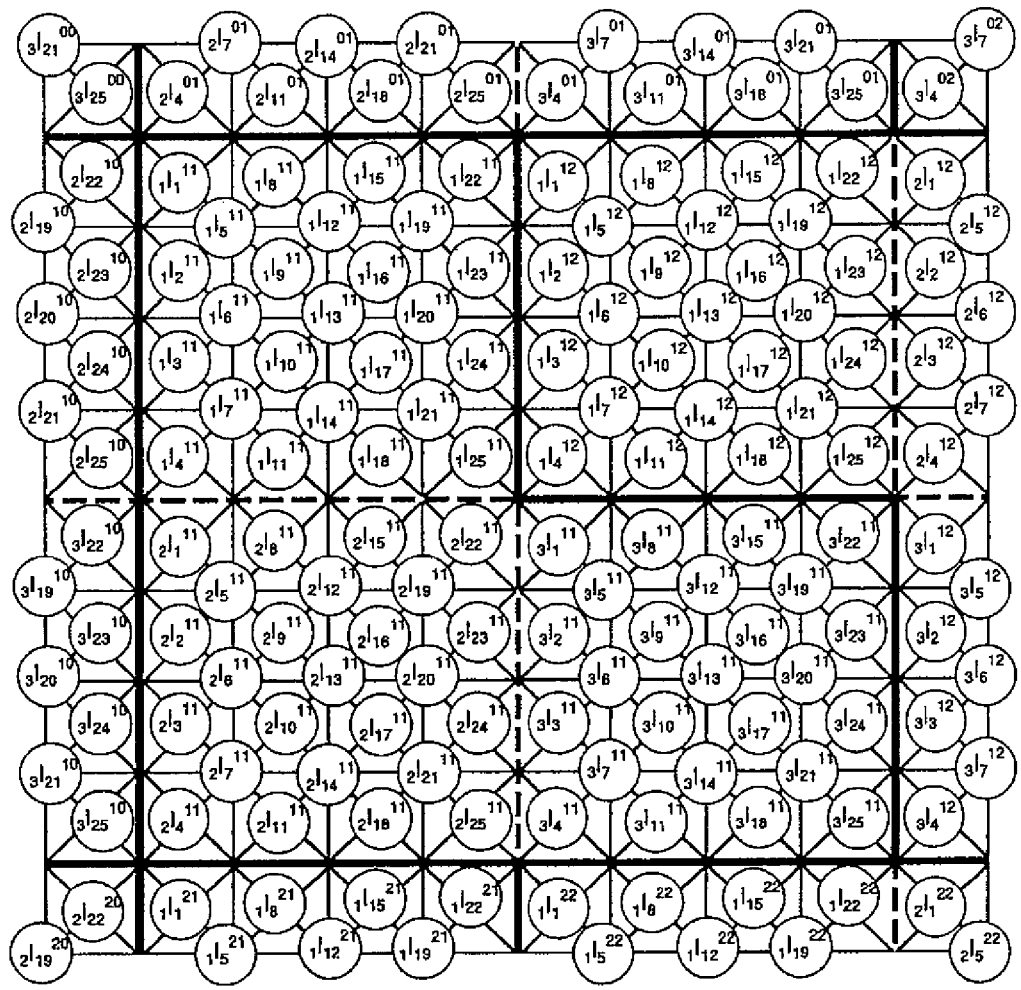
FIG. 94 is a drawing (1) for describing a block concatenation by a difference search method for GRID3.
Figure 95:
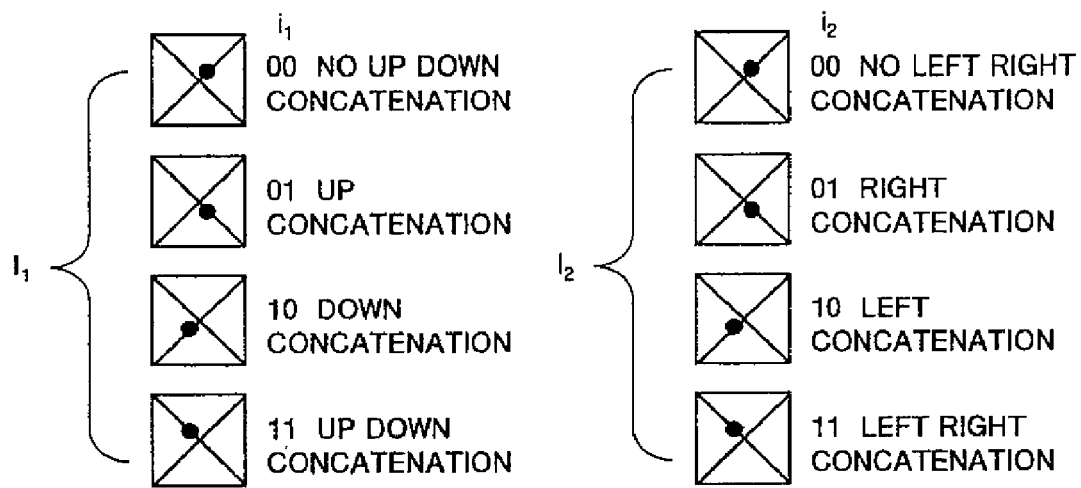
FIG. 95 is a drawing (2) for describing a block concatenation by a difference search method for GRID3.
Figure 96:
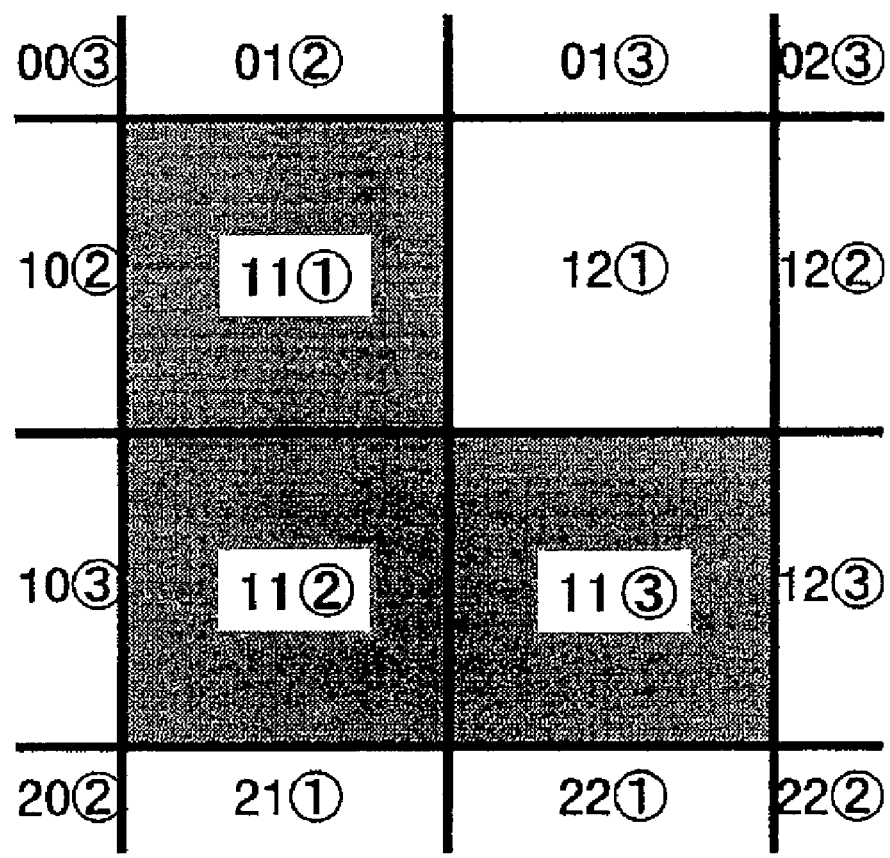
FIG. 96 is a drawing (3) for describing a block concatenation by a difference search method for GRID3.
Figure 97:
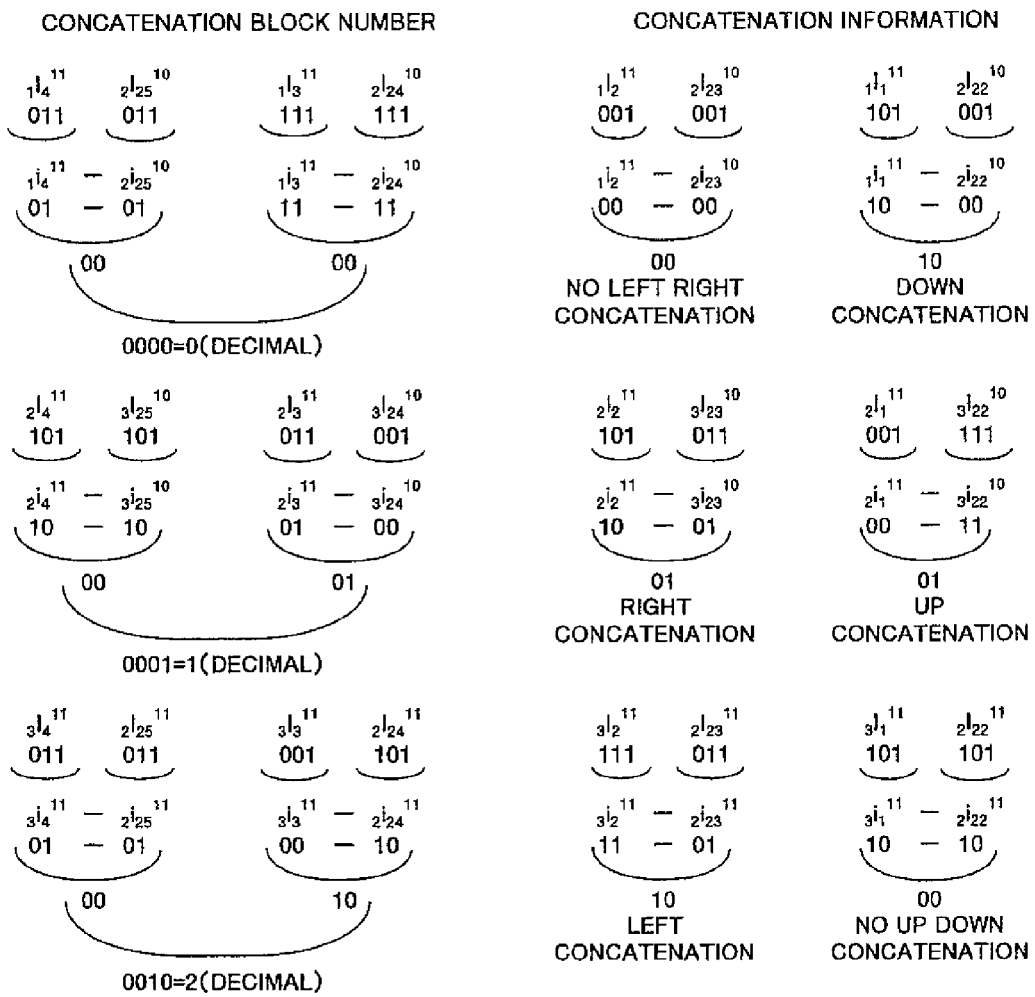
FIG. 97 is a drawing (4) for describing a block concatenation by a difference search method for GRID3.
Figure 98:
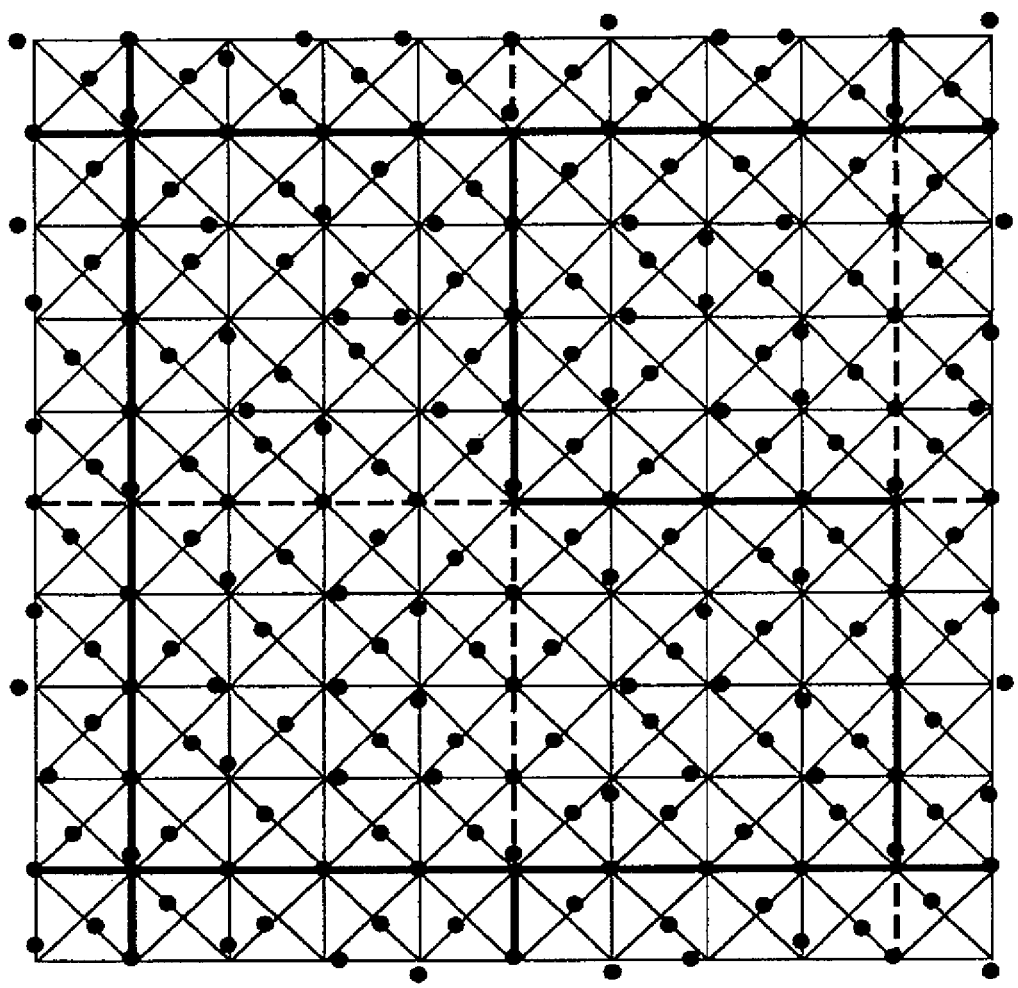
FIG. 98 is a drawing (5) for describing a block concatenation by a difference search method for GRID3.
Figure 99:
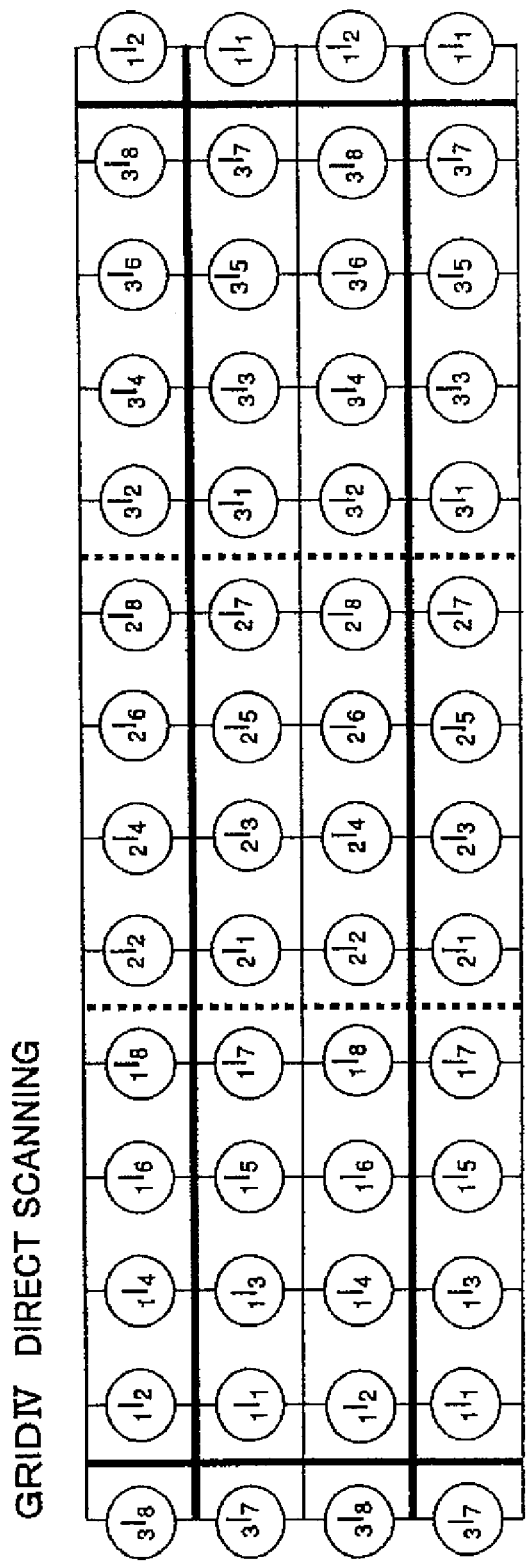
FIG. 99 is a drawing (1) for describing a block concatenation by a direct scanning method for GRID4.
Figures 100, 101:
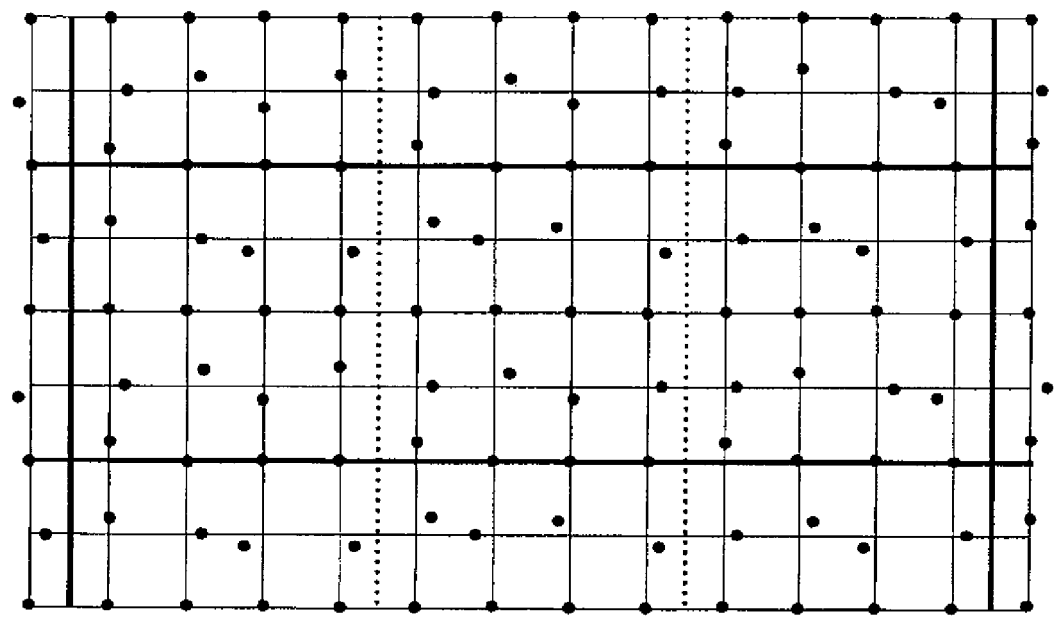
FIG. 100 is a drawing (2) for describing a block concatenation by a direct scanning method for GRID4.
FIG. 101 is a drawing (3) for describing a block concatenation by a direct scanning method for GRID3.
Figure 102:
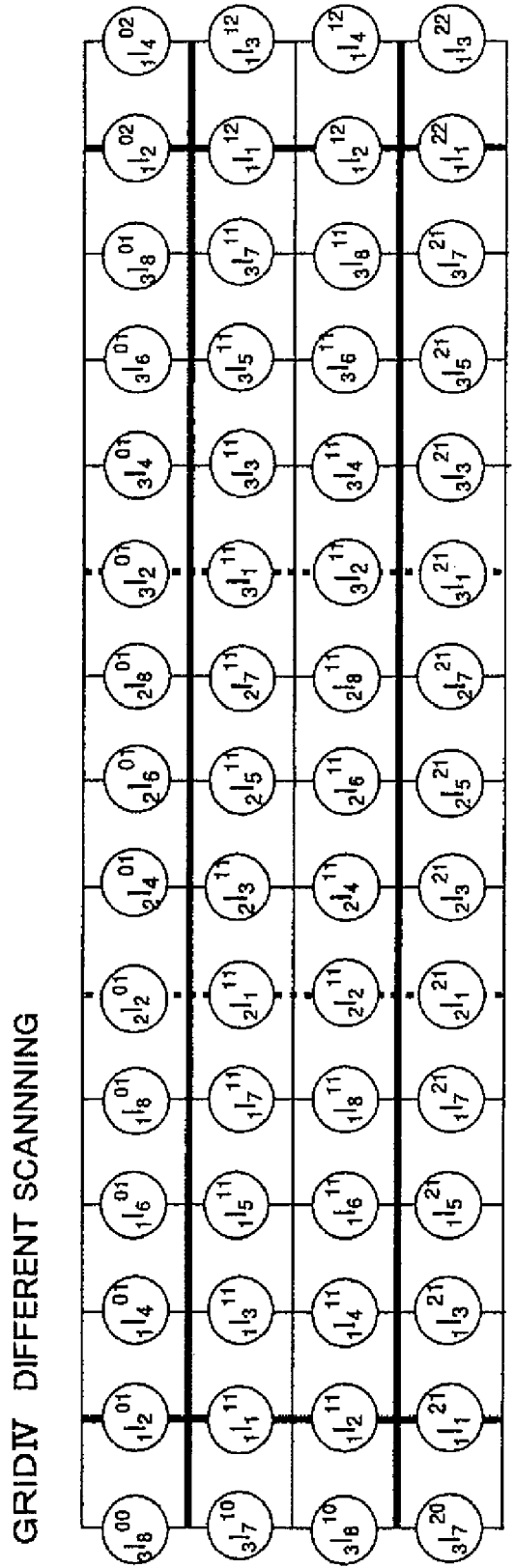
FIG. 102 is a drawing (1) for describing a block concatenation by a difference scanning method for GRID4.
Figures 103, 104:
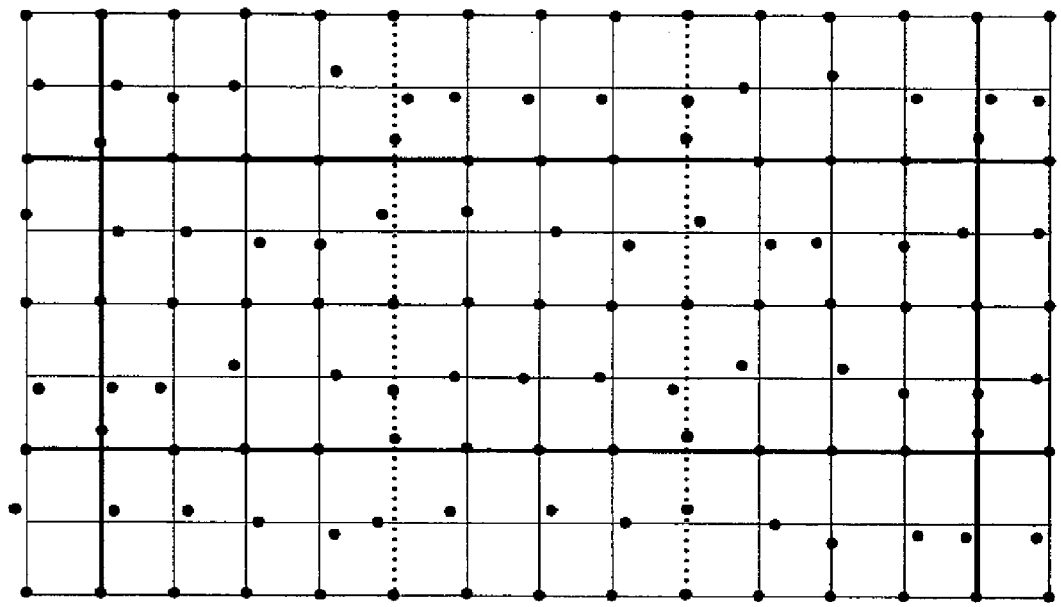
FIG. 103 is a drawing (2) for describing a block concatenation by a difference scanning method for GRID4.
FIG. 104 is a drawing (3) for describing a block concatenation by a difference scanning method for GRID4.
Figure 105:
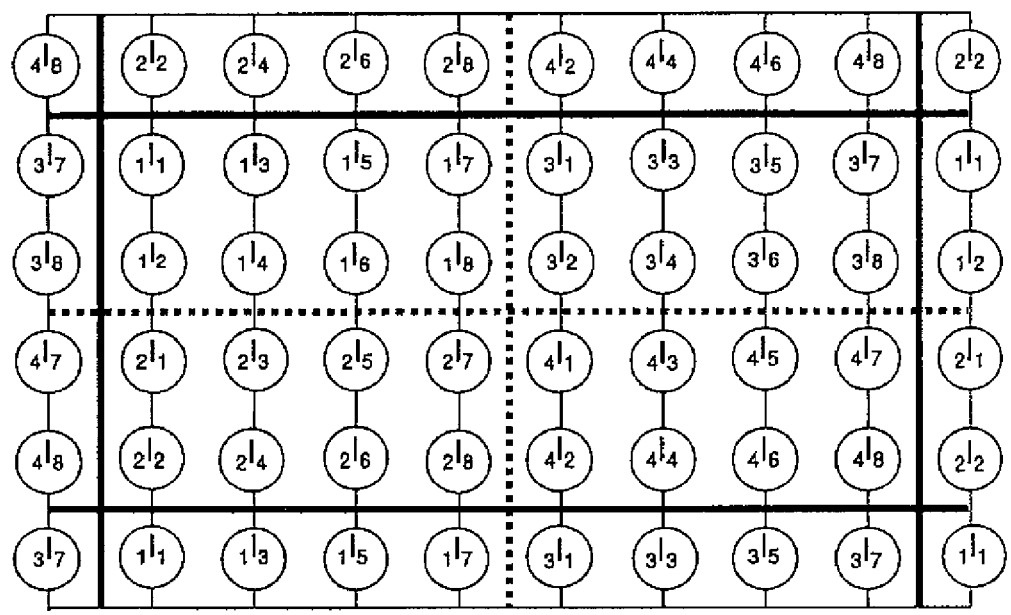
FIG. 105 is a drawing (1) for describing a block concatenation by a direct spiral method for GRID4.
Figure 107:
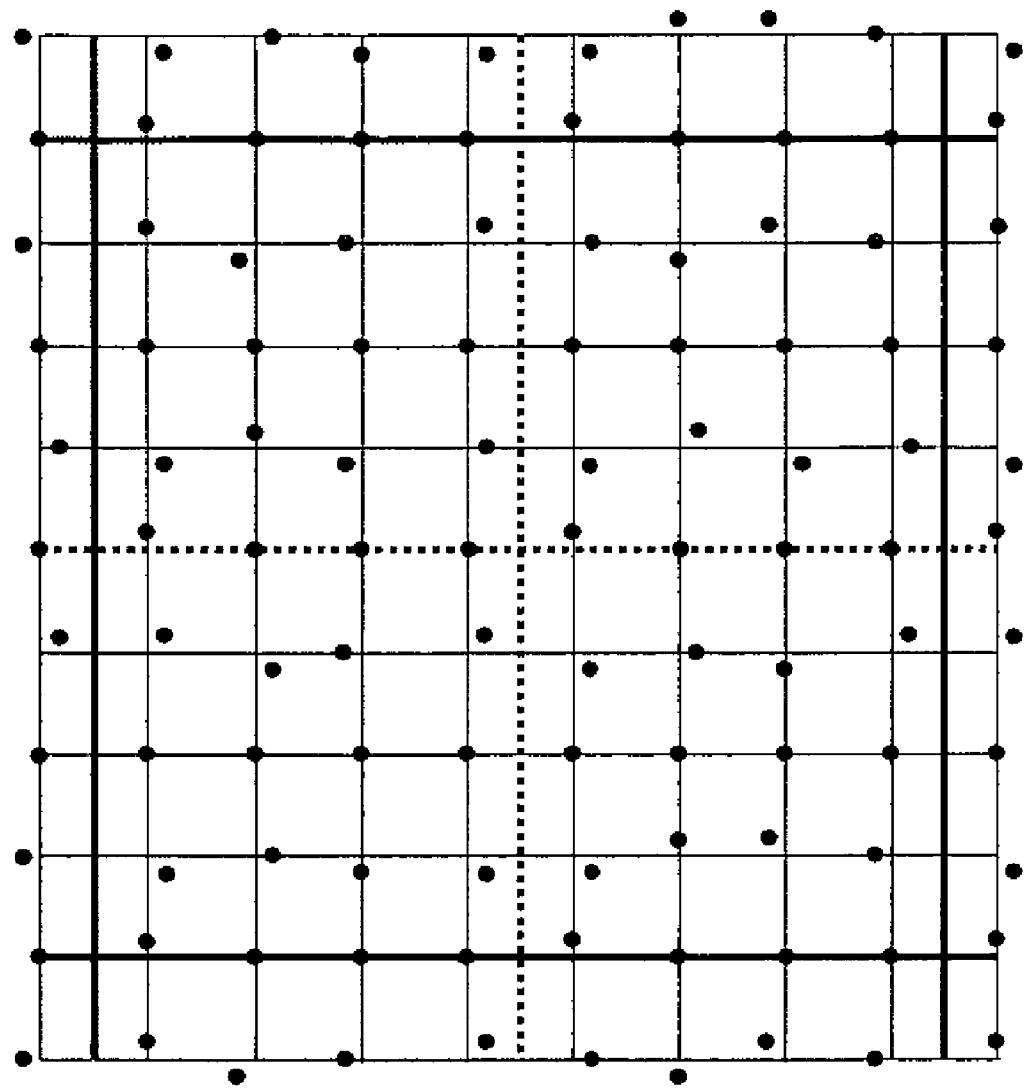
FIG. 107 is a drawing (3) for describing a block concatenation by a direct spiral method for GRID4.
Figure 108:
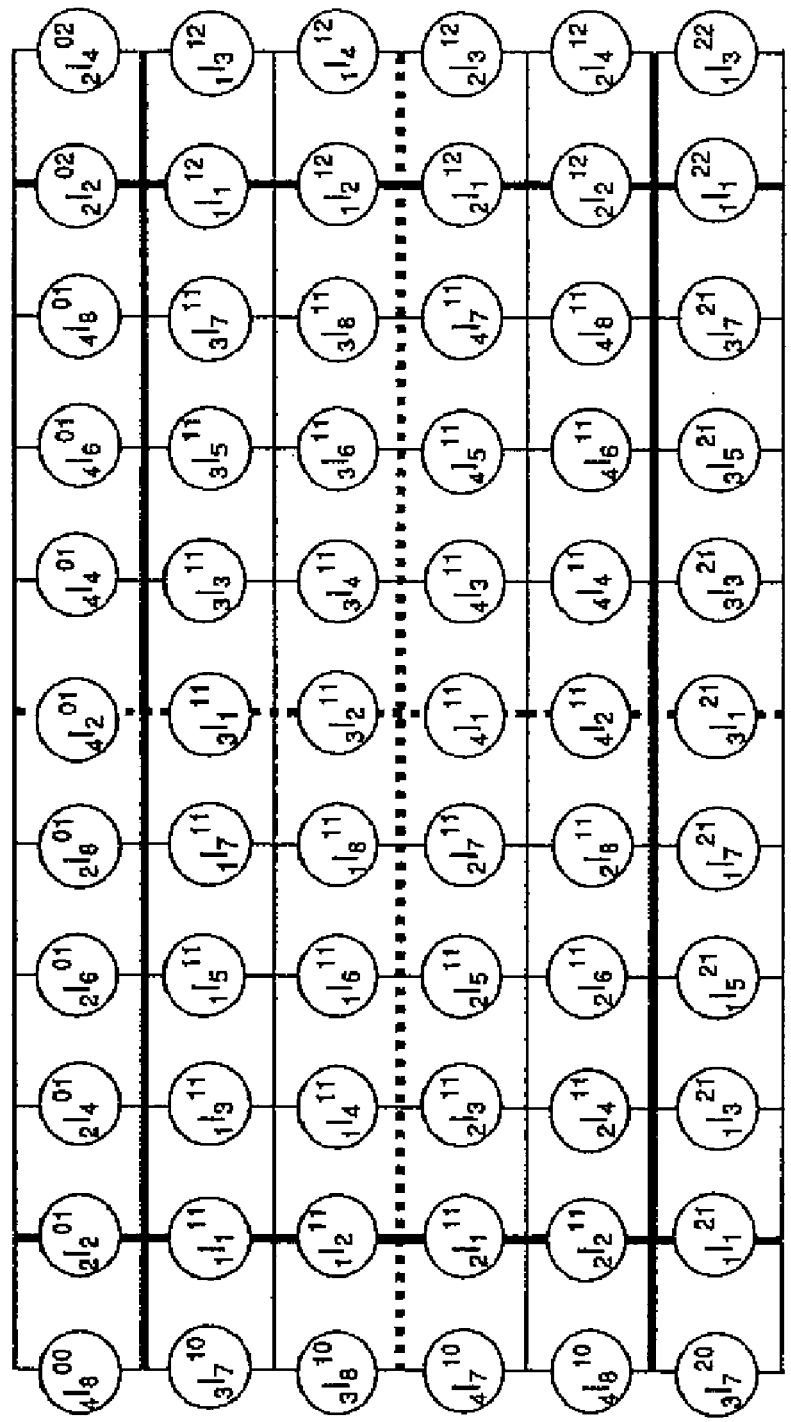
FIG. 108 is a drawing (1) for describing a block concatenation by a difference spiral method for GRID4.
Figure 110:
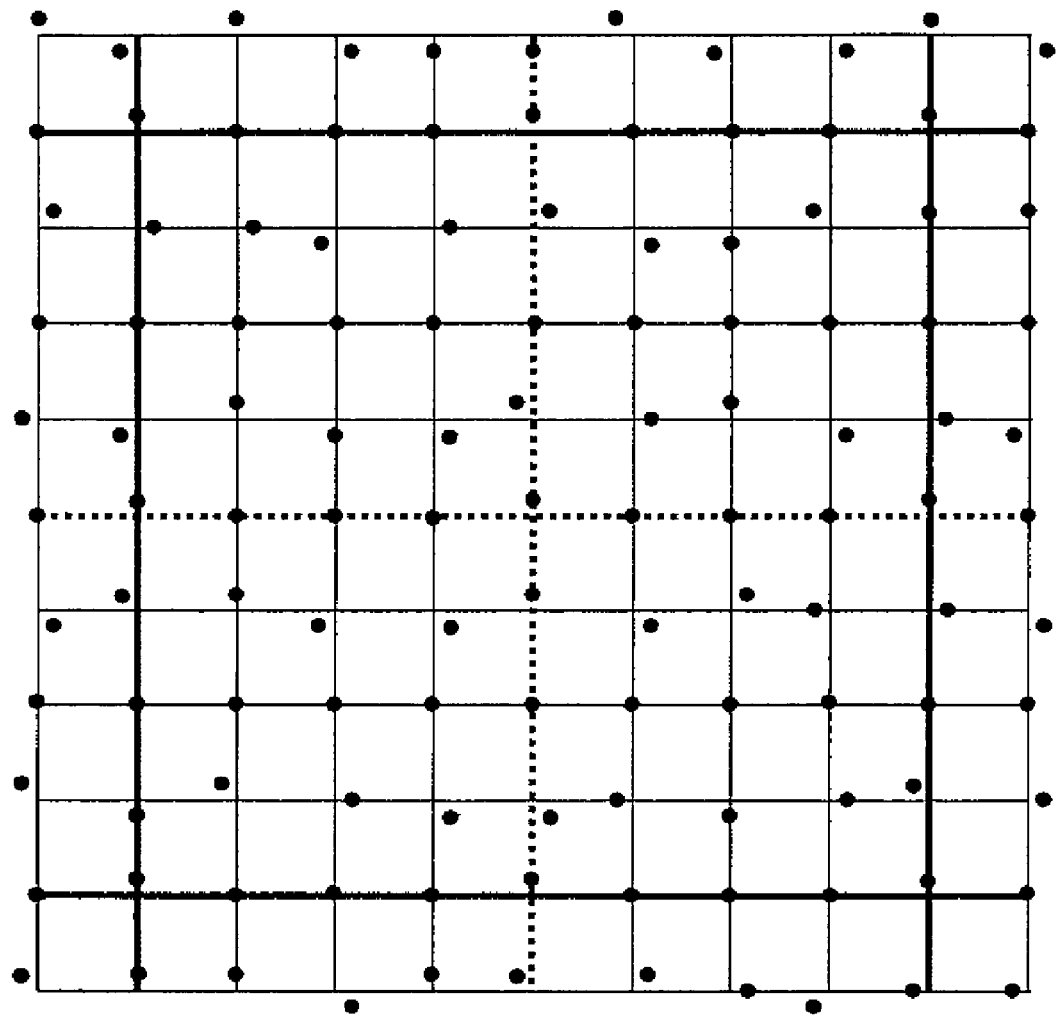
FIG. 110 is a drawing (3) for describing a block concatenation by a difference spiral method for GRID4.
Figure 111:
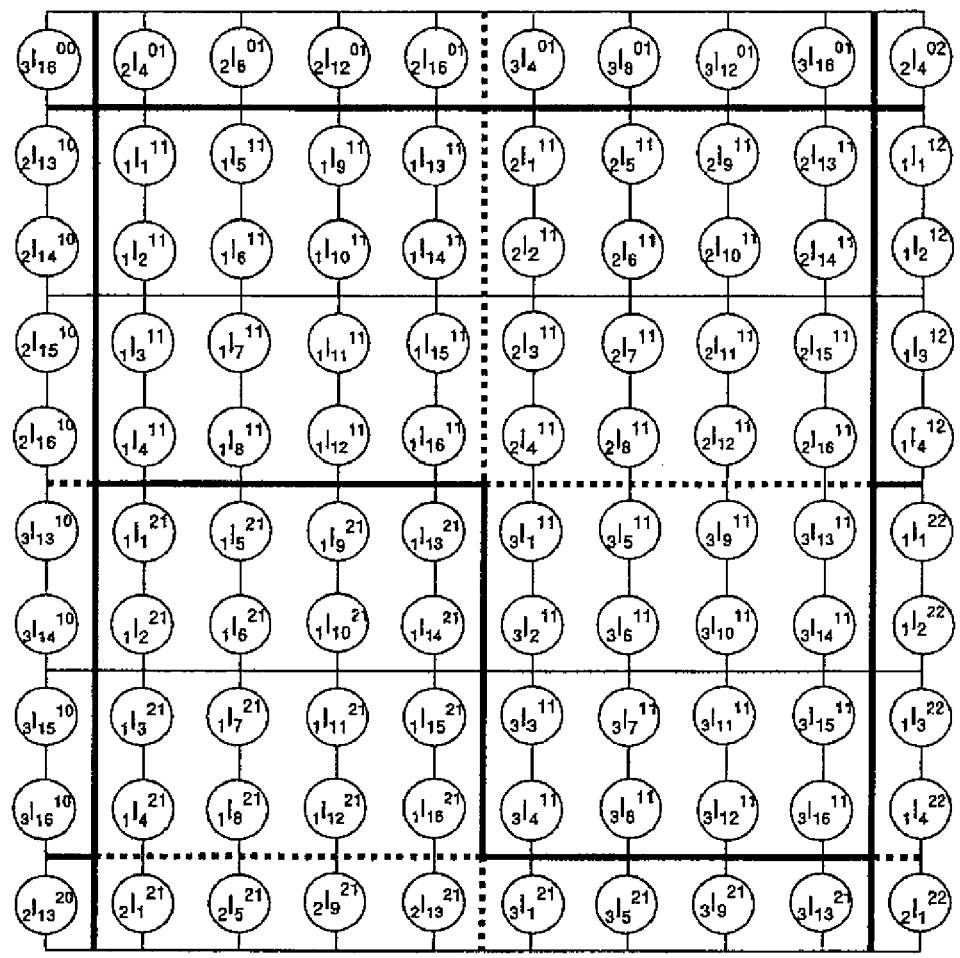
FIG. 111 is a drawing (1) for describing a block concatenation by a direct search method for GRID4.
Figure 113:
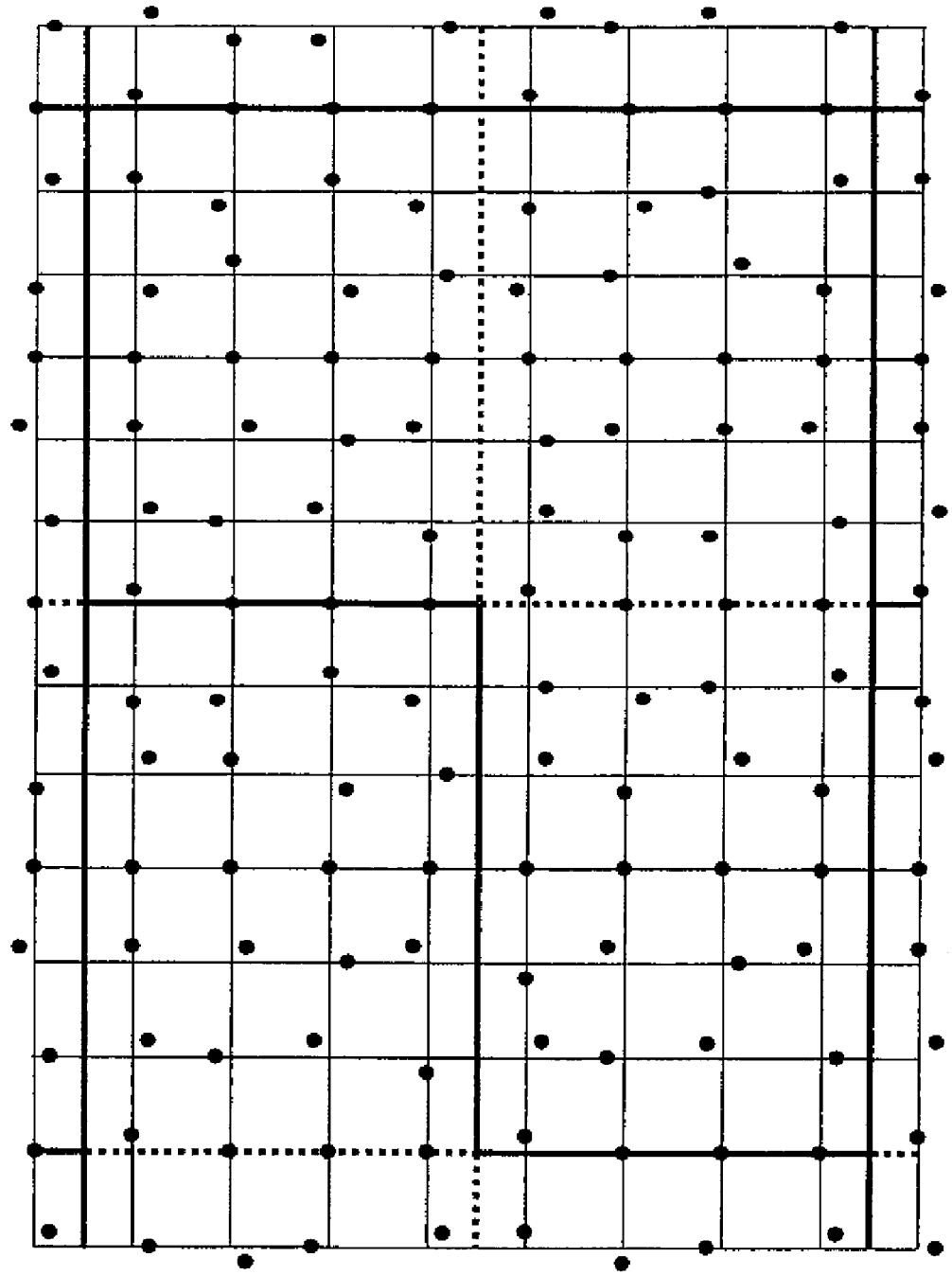
FIG. 113 is a drawing (3) for describing a block concatenation by a direct search method for GRID4.
Figure 114:
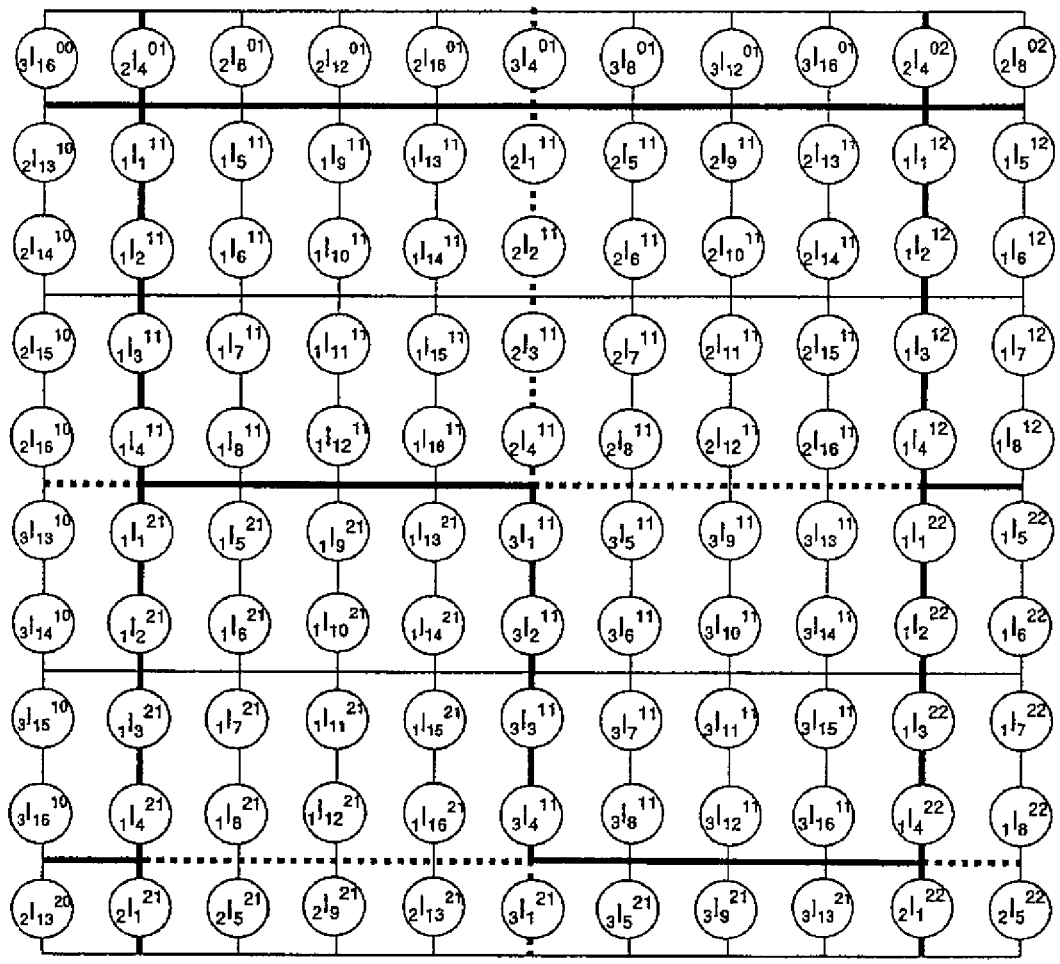
FIG. 114 is a drawing (1) for describing a block concatenation by a difference search method for GRID4.
Figure 115:
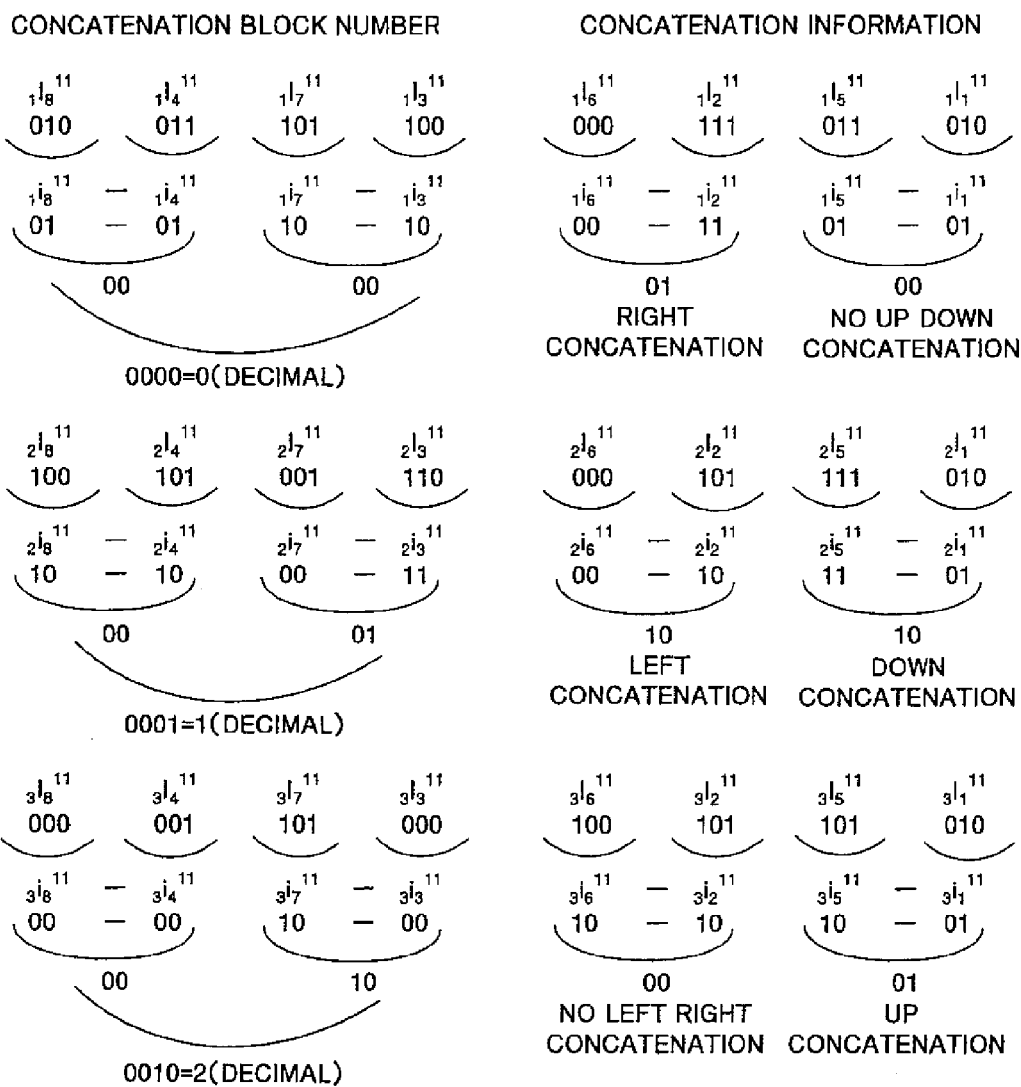
FIG. 115 is a drawing (2) for describing a block concatenation by a difference search method for GRID4.
Figure 116:
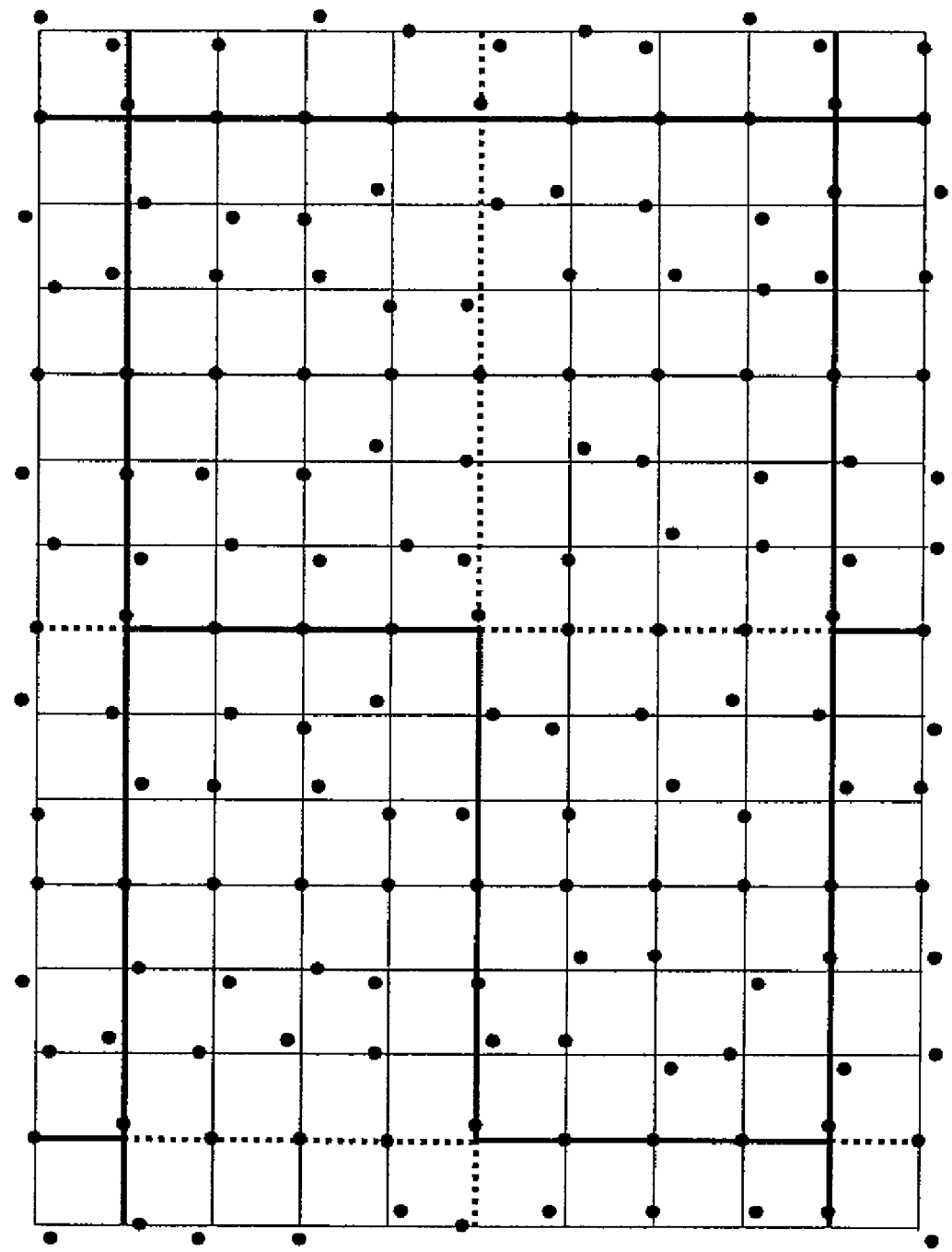
FIG. 116 is a drawing (3) for describing a block concatenation by a difference search method for GRID4.

The present invention can be applicable to a dot pattern capable of recording variable length information.

What is claimed is:

1. An information input output method using a dot pattern, wherein an arbitrary rectangular area is defined as a block for defining information by a dot on a medium surface of a printed material, and said blocks are concatenated consecutively in an arbitrary direction from top to bottom and from left to right into a series of information chunks, the method comprising:

generating a dot pattern in which concatenation information for concatenating the plurality of blocks is defined in a predetermined area inside the block by a dot;

imaging said block groups constituting said dot pattern by an optical reading means; and reproducing information from said imaged data, wherein said optical reading means reads a predetermined block containing concatenation information consisting at least of a total number of blocks and a block sequence;

generating a read table in which a read flag corresponding to said block sequence is set for the total number of blocks in a storage means of said optical reading means; and recognizing that a block group meaning a series of information chunks have been read when said optical reading means read surrounding blocks centered on said predetermined block and changed a flag of said read table.

2. The information input output method using a dot pattern according to claim 1, wherein said concatenation information defines at least a concatenation sequence of blocks.

3. The information input output method using a dot pattern according to claim 2, wherein said concatenation information contains a total number of concatenated blocks.

4. The information input output method using a dot pattern according to claim 2, wherein said concatenation information contains a direction of concatenating blocks.

5. The information input output method using a dot pattern according to claim 1, wherein a block group meaning said series of information chunks is disposed on the basis of said concatenation information and two or more same block groups are disposed side by side vertically or horizontally.

6. The information input output method using a dot pattern according to claim 1, wherein a block group meaning said series of information chunks is disposed by being concatenated horizontally in a longitudinal direction on the basis of said concatenation information.

7. The information input output method using a dot pattern according to claim 6, wherein said block groups are disposed by being concatenated also in a width direction on the basis of said concatenation information.

8. The information input output method using a dot pattern according to claim 7, wherein said block groups which are concatenated in said width direction as well as horizontally in a longitudinal direction are disposed in parallel on the basis of said concatenation information.

9. The information input output method using a dot pattern according to claim 1, wherein said blocks are concatenated irregularly in an arbitrary direction from top to bottom or from left to right into a series of information chunks;

the concatenation direction and the concatenation sequence for each block are defined as concatenation information in a predetermined area inside the block, and when said optical reading means reads said concatenation information, said optical reading means instruct the instruction means on the read scan direction.

10. The information input output method using a dot pattern according to claim 1, wherein at least one of said blocks is a dummy block having no meaning as a dot pattern.

11. The information input output method using a dot pattern according to claim 1, wherein said optical reading means outputs a scanning end signal when the block group meaning a series of information chunks has been read.

12. An information input output method using a dot pattern, wherein an arbitrary rectangular area is defined as a block for defining information by a dot on a medium surface of a printed material, and said blocks are concatenated consecutively in an arbitrary direction from top to bottom and from left to right into a series of information chunks, the method comprising:

generating a dot pattern in which concatenation information for concatenating the plurality of blocks is defined in a predetermined area inside the block by a dot;

imaging said block groups constituting said dot pattern by an optical reading means: and reproducing information from said imaged data, wherein said optical reading means reads concatenation information of at least a predetermined block;

generating a read table in which a read flag corresponding to said block sequence is set for the total number of blocks in a storage means of said optical reading means; and instructing an instruction means of said optical reading means to scan in a horizontal direction until said optical reading means completes reading of a block group meaning a series of information chunks after said optical reading means horizontally read blocks starting with said predetermined block and changed a flag of said read table.

13. The information input output method using a dot pattern according to claim 12, wherein said concatenation information defines at least a concatenation sequence of blocks.

14. The information input output method using a dot pattern according to claim 12, wherein a block group meaning said series of information chunks is disposed on the basis of said concatenation information and two or more same block groups are disposed side by side vertically or horizontally.

15. The information input output method using a dot pattern according to claim 12, wherein a block group meaning said series of information chunks is disposed by being concatenated horizontally in a longitudinal direction on the basis of said concatenation information.

16. The information input output method using a dot pattern according to claim 12, wherein said blocks are concatenated irregularly in an arbitrary direction from top to bottom or from left to right into a series of information chunks;

the concatenation direction and the concatenation sequence for each block are defined as concatenation information in a predetermined area inside the block, and when said optical reading means reads said concatenation information, said optical reading means instruct the instruction means on the read scan direction.

17. The information input output method using a dot pattern according to claim 12, wherein at least one of said blocks is a dummy block having no meaning as a dot pattern.

* * * * *